United States Patent
Richoux

(10) Patent No.: US 7,433,931 B2
(45) Date of Patent: Oct. 7, 2008

(54) SCHEDULING IN A HIGH-PERFORMANCE COMPUTING (HPC) SYSTEM

(75) Inventor: Anthony N. Richoux, Richardson, TX (US)

(73) Assignee: Raytheon Company, Waltham, MA (US)

(*) Notice: Subject to any disclaimer, the term of this patent is extended or adjusted under 35 U.S.C. 154(b) by 610 days.

(21) Appl. No.: 10/991,598

(22) Filed: Nov. 17, 2004

(65) Prior Publication Data

US 2006/0106931 A1    May 18, 2006

(51) Int. Cl.
   G06F 15/16       (2006.01)
(52) U.S. Cl. ........................................ 709/217; 709/226
(58) Field of Classification Search ................. 709/217, 709/226–227
   See application file for complete search history.

(56) References Cited

U.S. PATENT DOCUMENTS

| | | | |
|---|---|---|---|
| 4,868,818 A | 9/1989 | Madan et al. |
| 5,020,059 A | 5/1991 | Gorin et al. |
| 5,280,607 A | 1/1994 | Bruck et al. |
| 5,301,104 A | 4/1994 | Yalamanchili |
| 5,450,578 A | 9/1995 | Mackenthun |
| 5,513,313 A | 4/1996 | Bruck et al. |
| 5,603,044 A | 2/1997 | Annapareddy et al. |
| 5,682,491 A | 10/1997 | Pechanek et al. |
| 5,748,872 A | 5/1998 | Norman |
| 5,748,882 A | 5/1998 | Huang |
| 5,781,715 A | 7/1998 | Sheu |
| 5,805,785 A | 9/1998 | Dias et al. |
| 5,926,619 A | 7/1999 | Badovinatz et al. |
| 6,088,330 A | 7/2000 | Bruck et al. |
| 6,167,502 A | 12/2000 | Pechanek et al. |
| 6,230,252 B1 | 5/2001 | Passint et al. |

(Continued)

FOREIGN PATENT DOCUMENTS

EP          0 981 089 A2     2/2000

(Continued)

OTHER PUBLICATIONS

Commuinication from the European Patent Office; European Search Report for Application No. PCT/US2005/012500, 6 pages, Aug. 1, 2005 and Written Opinion of the International Search Authority, 5 pages.

(Continued)

Primary Examiner—Firmin Backer
Assistant Examiner—Phuongchau Ba Nguyen
(74) Attorney, Agent, or Firm—Baker Botts L.L.P.

(57) ABSTRACT

In one embodiment, a method for scheduling in a high-performance computing (HPC) system includes receiving a call from a management engine that manages a cluster of nodes in the HPC system. The call specifies a request including a job for scheduling. The method further includes determining whether the request is spatial, compact, or nonspatial and noncompact. The method further includes, if the request is spatial, generating one or more spatial combinations of nodes in the cluster and selecting one of the spatial combinations that is schedulable. The method further includes, if the request is compact, generating one or more compact combinations of nodes in the cluster and selecting one of the compact combinations that is schedulable. The method further includes, if the request is nonspatial and noncompact, identifying one or more schedulable nodes and generating a nonspatial and noncompact combination of nodes in the cluster.

35 Claims, 11 Drawing Sheets

U.S. PATENT DOCUMENTS

| | | |
|---|---|---|
| 6,393,581 B1 | 5/2002 | Friedman |
| 6,415,323 B1 | 7/2002 | McCanne et al. |
| 6,453,426 B1 | 9/2002 | Gamache et al. |
| 6,460,149 B1 | 10/2002 | Rowlands et al. |
| 6,477,663 B1 | 11/2002 | Laranjeira et al. |
| 6,480,972 B1 | 11/2002 | Bauman |
| 6,496,941 B1 | 12/2002 | Segal et al. |
| 6,629,266 B1 | 9/2003 | Harper et al. |
| 6,658,504 B1 | 12/2003 | Lieber |
| 6,718,486 B1 | 4/2004 | Roselli et al. |
| 6,735,660 B1 | 5/2004 | Osten et al. |
| 6,748,437 B1 | 6/2004 | Mankude et al. |
| 6,820,221 B2 | 11/2004 | Fleming |
| 6,918,051 B2 | 7/2005 | Block et al. |
| 6,918,063 B2 | 7/2005 | Ho et al. |
| 6,922,791 B2 | 7/2005 | Mashayekhi et al. |
| 6,952,766 B2 | 10/2005 | Dervin et al. |
| 7,016,299 B2 | 3/2006 | Kashyap |
| 7,028,228 B1 | 4/2006 | Lovy et al. |
| 7,093,004 B2 | 8/2006 | Bernardin et al. |
| 7,155,512 B2 | 12/2006 | Lean et al. |
| 7,287,179 B2 | 10/2007 | Doyle et al. |
| 7,299,377 B2 | 11/2007 | Norman |
| 2001/0049740 A1 | 12/2001 | Karpoff |
| 2003/0005276 A1 | 1/2003 | French et al. |
| 2003/0009551 A1 | 1/2003 | Benfield et al. |
| 2003/0097487 A1 | 5/2003 | Rietze et al. |
| 2003/0135621 A1 | 7/2003 | Romagnoli |
| 2003/0154112 A1 | 8/2003 | Neiman et al. |
| 2003/0188071 A1 | 10/2003 | Kunjan et al. |
| 2003/0191795 A1* | 10/2003 | Bernardin et al. ........... 709/105 |
| 2003/0217105 A1 | 11/2003 | Zircher et al. |
| 2004/0024949 A1 | 2/2004 | Winkler et al. |
| 2004/0103218 A1 | 5/2004 | Blumrich et al. |
| 2004/0186920 A1* | 9/2004 | Birdwell et al. ................ 710/1 |
| 2004/0268000 A1 | 12/2004 | Barker et al. |
| 2005/0071843 A1 | 3/2005 | Guo et al. |
| 2005/0234846 A1 | 10/2005 | Davidson et al. |
| 2005/0235055 A1* | 10/2005 | Davidson .................... 709/223 |
| 2005/0235092 A1* | 10/2005 | Ballew et al. ............... 710/316 |
| 2005/0235286 A1* | 10/2005 | Ballew et al. ............... 718/100 |
| 2005/0246569 A1* | 11/2005 | Ballew et al. .................... 714/4 |
| 2005/0251567 A1* | 11/2005 | Ballew et al. ............... 709/223 |
| 2005/0256942 A1 | 11/2005 | McCardle et al. |
| 2006/0106931 A1 | 5/2006 | Davidson |
| 2006/0112297 A1* | 5/2006 | Davidson ....................... 714/2 |
| 2006/0117208 A1* | 6/2006 | Davidson ....................... 714/4 |
| 2006/0195508 A1* | 8/2006 | Bernardin et al. ........... 709/203 |

FOREIGN PATENT DOCUMENTS

| | | |
|---|---|---|
| JP | 8227356 | 9/1996 |
| WO | WO 02/084509 | 10/2002 |
| WO | WO 03/005192 A1 | 1/2003 |
| WO | WO 03/005292 A1 | 1/2003 |

OTHER PUBLICATIONS

Anonymous, "HP AlphaServer SC User Guide," Internet Article, Online!, Jul. 12, 2004, XP002336777, retrieved from the internet: URL:http://web1.quadrics.com/onlinedocs/AlphaServer/Eagle/html/AlphaServerUserGuide/ retrieved on Jul. 19, 2005.

Krevat et al., Job Scheduling for the BlueGene/L System, Lecture Notes in Computer Science, vol. 2537, Jul. 24, 2002, pp. 38/54, XP002336423.

Hyunseung et al., "An Efficient Submesh Allocation Scheme for 3D Torus Multicolor Systems," Parallel Algorithms/Architecture Synthesis, 1997, Proceedings, Second Aizu International Symposium Aizu-Wakamatsu, Japan, Mar. 17-21, 1997.

Anonymous, "Message Passing Interface (MPI)," Internet Article, Online!, Dec. 23, 2003, pp. 1-33, XP002336778, retrieved from the internet: URL:http//web.archive.org/web/20040102194825/http://www.llnl.gov/computing/tutorial s/mpi/>, retreived on Jul. 18, 2005, pp. 1-3, 25, and 26.

Communication from the European Patent Office, European Search Report for Application No. PCT/US2005/012314 6 pages, mailed Sep. 20, 2005, 7 pages.

Communication from the European Patent Office, European Search Report for Application No. PCT/US2005/012313 and Written Opinion of the International Search Authority, mailed Sep. 20, 2005, 14 pages.

Communication from the European Patent Office, European Search Report for Application No. PCT/US2005/012316 and Written Opinion of the International Search Authority, mailed Sep. 14, 2005, 11 pages.

Communication from the European Patent Office, European Search Report for Application No. PCT/US2005/012242 and Written Opinion of the International Search Authority, mailed Sep. 19, 2005, 16 pages.

Communication from the European Patent Office, European Search Report for Application No. PCT/US2005/012031 and Written Opinion of the International Search Authority, mailed Aug. 1, 2005, 11 pages.

Communication from the European Patent Office, European Search Report for Application No. EP 05 25 2235, mailed Jul. 22, 2005, 3 pages.

Communication from the European Patent Office, European Search Report for Application No. PCT/US2005/012643 and Written Opinion of the International Search Authority, mailed Apr. 19, 2006, 11 pages.

Communication from the European Patent Office, European Search Report for Application No. PCT/US2005/012489 and Written Opinion of the International Search Authority, mailed Nov. 18, 2005, 14 pages.

Haynes et al., "A Visualization Tool for Analyzing Cluster Performance Data," 42 Annual Symposium on Foundations of Computer Science, (FOCS 2001), Las Vegas, Oct. 14-17, 2001, 8 pages.

Patel et al., "Sage An Application Development Tool Suite for High Performance Computing Systems," Aerospace Conference Proceedings, 2000, IEEE Mar. 18-25, 2000, pp. 491-500.

Baraglia et al., RsdEditor: A Graphical User Interface for Specifying Metacomputer Components, Heterogeneous Computing Workshop, 2000, pp. 336-345.

Chang et al., "Performance Improvement of Allocation Schemes for Mesh-Connected Computers," Journal of Parallel and Distributerd Computing, Academic Press, Duluth, MN, vol. 52, No. 1, Jul. 10, 1998, pp. 40-68.

Liu, et al. "Non-Contiguous Processor Allocation Algorithms for Distributed Memory Multicomputers," Supercomputing '94, Proceedings, Washington, D.C., Nov. 14-18, 1994, pp. 227-236.

Krevat et al., "Job Scheduling for the BlueGene/L System," Lecture Notes in Computer Science, vol. 2537, Jul. 24, 2002, 18 pages.

Rzymianowicz et al., "Clustering SMP Nodes with the ATOLL Network: A Look into the Future of System Area Networks," Proceedings of High Performance Computing, 8th International Conference, May 8, 2000, 10 pages.

Bhanot et al., "The BlueGene/L Supercomputer," 20th International Symposium on Lattice Field Theory, vol. 119, Jun. 2002, 8 pages.

Advanced Micro Devices et al., "Hypertransport Technology I/O Link—A High-Bandwidth I/O Architecture," Jul. 20, 2001, pp. 1-25.

Pinkston et al., "InfiniBand: The "De Facto" Future Standard for System and Local Area Networks or Just a Scalable Replacement for PCI Buses?," Cluster Computing-Kluwer Academic Publishers, vol. 6, No. 2, 2003, pp. 95-104.

Culler et al., "Parallel Computer Architecture—A Hardware/Software Approach, Interconnection Network Design," Morgan Kaufmann, 1999, 30 pages.

Feitelson, "Job Scheduling in Multiprogrammed Parallel Systems", IBM Research Report, Aug. 1997, pp. 1-172.

Kandlur et al., "Hypercube Management in the Presence of Node Failures", third conference on hypercube concurrent computers and applications ACM New York, 1988, pp. 328-336, vol. 1, pp. 328-336.

Wenjian et al., "Efficient Processor Allocation for 3D Tori", Parallel Processing Symposium 1995, Proceedings, 9th International, Apr. 25-28, 1995, IEEE Comput. Soc., pp. 466-471, 921.

Qiao et al., E-Kernel: An Embedding Kernel on the IBM Victor V256, Multiprocessor for Program Mapping and Network Reconfiguration, IEEE Transactions on Parallel and Distributed Systems, IEEE Service Center, vol. 5, No. 9, Sep. 5, 1994, pp. 977-994.

Wong, William, "Switch-Chip Fuels Third-Generation InfiniBand," Nov. 10, 2003, Electronic Design, 2 pages.

Panagiotis, Christias et al., "inetd—Internet Services Daemon," pp. 1-4, 1994 Man-cgi 1.15S, 1995 Modified for Solaris 2.3.

Unknown, "Cisco Local Director Configuration and Command Reference Guide," Internet Article, Online, Apr. 4, 2001.

Moore et al., "Managing Mixed-Use Clusters with Clusters-onDemand," Internet Article, Nov. 2002.

Di Santo et al., "Kernel Implementation of Locality-Aware Dispatching Techniques for Web Server Clusters," Cluster Computing, 2003 Proceedings, pp. 154-162, Dec. 1, 2003.

Ross et al., "3.3 Connectionless Transport," Feb. 22, 2001, pp. 1-4, retrieved on Nov. 1, 2005.

Davidson et al., U.S. Appl. No. 10/825,345, entitled, *System and Method for Computer Cluster Virtualization Using Dynamic Boot Images and Virtual Disk*, 47 pages of specification, 10 pages of drawings, Apr. 15, 2004.

Ballew et al., U.S. Appl. No. 10/824,874, entitled, *"High Performance Computing System and Method"*, 47 pages specification, claims and abstract, 10 pages of drawings, Apr. 15, 2004.

Ballew et al., U.S. App. No. 10/825,539, entitled, *"System and Method for Cluster Management Based on HPC Architecture"*, 49 pages specification, claims and abstract, 10 pages of drawings, Apr. 15, 2004.

Ballew et al., U.S. Appl. No. 10/826,959, entitled, *"System and Method for Detecting and Managing HPC Node Failure"*, 49 pages specification, claims and abstract, 10 pages of drawings, Apr. 15, 2004.

Davidson, U.S. Appl. No. 10/824,873, entitled, *"Graphical User Interface for Managing HPC Clusters"*, 48 pages specification, claims and abstract, 10 pages of drawings, Apr. 15, 2004.

Ballew et al., U.S. Appl. No. 10/825,021, entitled, *"System and Method for Topology-aware Job Scheduling and Backfilling in an HPC Environment"*, 49 pages specification, claims and abstract, 10 pages of drawings, Apr. 15, 2004.

Davidson, U.S. Appl. No. 10/991,994, entitled, *"On-Demand Instantiation in a High-Performance Computing (HPC) System"*, 110 pages specification, claims and abstract, 12 pages of drawings, Nov. 17, 2004.

Davidson, U.S. Appl. No. 10/991,754, entitled, *Fault Tolerance and Recovery in a High-Performance Computing (HPC) System*, 117 pages specification, claims and abstract, 12 pages of drawings, Nov. 17, 2004.

The Patent Office of the State Intellectual Property Office of the People's Republic of China, Office Action for Appl. No. 200510081719.3, 11 pages, Date of Dispatch Apr. 20, 2007.

Hovestadt et al., Scheduling in HPC Resource Management Systems: *Queuing* vs. *Planning*, Proceedings of the 9th Workshop on Job Scheduling Strategies for Parallel Processing, Seattle, WA, pp. 1-19, Jun. 2003.

Keller et al., "Anatomy of a Resource Management System for HPC Clusters," Annual Review of Scalable Computing, vol. 3, pp. 1-23, 2001.

Hans-Ulrich Heiss, "Processor Management in Two-Dimensional Grid-Architectures," Interner Bericht Nr. 20/92, XP002416087, 51 pages., Dec. 1992.

EPO Registered Letter, Appl. No. 05 252 239.8-1243, 6 pages, Mailed Feb. 2, 2007.

The Intellectual Property Bureau Ministry of Economic Affairs, Office Action for Appl. No. 94111492, received Nov. 27, 2006, 2 pages.

Jiun-Sheng et al., "Network Topology Structure on Board of Computer Cluster," Publication No. TW532011B, Data Supplied from the esp@cenet database—Worldwide, 1 page, Dec. 18, 2006.

Translated Japanese Patent Application No. 2003-531412, 4 pages, printed Jan. 4, 2008.

Translation of an Office Action, Japanese Patent Application No. 2005-117406, received Dec. 28, 2007, 6 pages.

Translation of an Office Action, Japanese Patent Application No. 2005-117403, received Dec. 28, 2007, 4 pages.

Translation of an Office Action, Japanese Patent Application No. 2005-117404, received Dec. 28, 2007, 7 pages.

Kimitaka et al., "Liquid Crystal Display Device," Abstracts of Japan for Publication No. 2005-241804, published Sep. 8, 2005, 2 pages.

Hidenori et al., "Magnetic Disk Drive," Abstracts of Japan for Publication No. 2007-141305, published Jun. 7, 2007, 2 pages.

Koichiro, "Semiconductor Storage Device and Its Test Method," Abstracts of Japan for Publication No. 2007-200496, published Sep. 9, 2007, 2 pages.

Choo et al., "Processor Scheduling and Allocation for 3D Torus Multicomputer Systems", IEEE Transactions on Parallel and Distributed Systems, vol. 11, No. 5, May 2000, pp. 475-484.

Falck et al., Swedish Patent No. 102405, Application No. 102405, Aug. 26, 1941, 4 pages.

Nikkei Solution Business,"Most Up-to-Date Storage Solutions, Powerful for Substantial Cost Reduction in IT Systems," pp. 105-110, Sep. 2003.

Translated Office Action for Korean Patent Application No. 10-2006-7023880, 8 pages.

Allen et al., "Title: The Cactus Worm: Experiments with Dynamic Resource Discovery and Allocation in a Grid Environment," 16 pages, Jan. 8, 2001.

Translated Office Action for Korean Patent Application No. 94111492, 6 pages.

Choo et al., "Processor Scheduling and Allocation for 3D Torus Multicomputer Systems", IEEE Transactions on Parallel and Distributed Systems, vol. 11, No. 5, May 2000, pp. 475-484.

Translated of an Office Action of Japanese Patent Office, Application No. 2005/117402, 6 pages, Mailed Jan. 15, 2008, received Mar. 21, 2008.

Masaaki et al., Abstract of JP8227356, 1 page, Published Sep. 3, 1996.

* cited by examiner

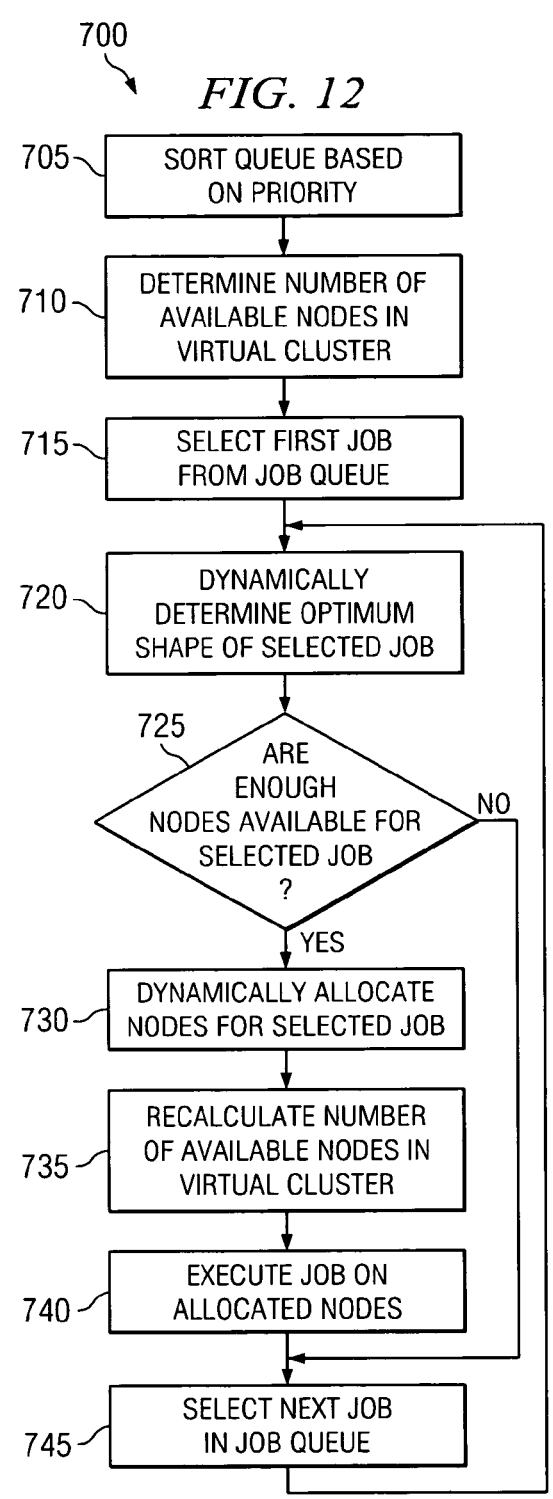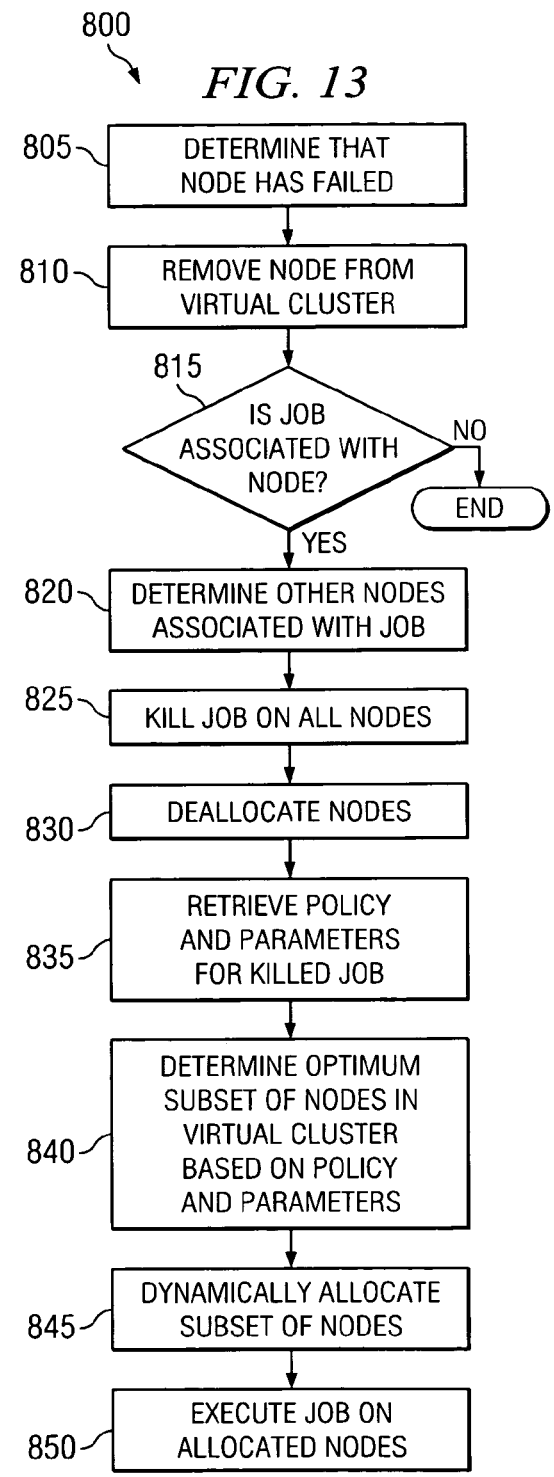

SCHEDULING IN A HIGH-PERFORMANCE COMPUTING (HPC) SYSTEM

TECHNICAL FIELD

This disclosure relates generally to data processing and more particularly to scheduling in an HPC system.

BACKGROUND

High Performance Computing (HPC) is often characterized by the computing systems used by scientists and engineers for modeling, simulating, and analyzing complex physical or algorithmic phenomena. Currently, HPC machines are typically designed using Numerous HPC clusters of one or more processors referred to as nodes. For most large scientific and engineering applications, performance is chiefly determined by parallel scalability and not the speed of individual nodes; therefore, scalability is often a limiting factor in building or purchasing such high performance clusters. Scalability is generally considered to be based on i) hardware, ii) memory, input/output (I/O), and communication bandwidth; iii) software; iv) architecture; and v) applications. The processing, memory, and I/O bandwidth in most conventional HPC environments are normally not well balanced and, therefore, do not scale well. Many HPC environments do not have the I/O bandwidth to satisfy high-end data processing requirements or are built with blades that have too many unneeded components installed, which tend to dramatically reduce the system's reliability. Accordingly, many HPC environments may not provide robust cluster management software for efficient operation in production-oriented environments.

SUMMARY

The present invention may reduce or eliminate disadvantages, problems, or both associated with scheduling in an HPC system.

In one embodiment, a method for scheduling in a high-performance computing (HPC) system includes receiving a call from a management engine that manages a cluster of nodes in the HPC system. The call specifies a request including a job for scheduling. The job includes one or more processes for execution at one or more nodes in the cluster. The call further specifies a number of nodes for executing the one or more processes in the job. The method further includes determining whether the request is spatial, compact, or nonspatial and noncompact. The request is spatial if the job assumes spatial relationships between nodes executing processes in the job. The request is compact if the job assumes proximity between nodes executing processes in the job. The request is nonspatial and noncompact if the job assumes no spatial relationships or proximity between nodes executing processes in the job. The method further includes, if the request is spatial, generating one or more spatial combinations of nodes in the cluster accommodating the number of nodes specified in the call and further accommodating the assumed spatial relationships between nodes executing processes in the job and selecting one of the spatial combinations that is schedulable according to a list of nodes in the cluster available for scheduling. The method further includes, if the request is compact, generating one or more compact combinations of nodes in the cluster accommodating the number of nodes specified in the call from the management engine and selecting one of the compact combinations that is schedulable according to the list of nodes in the cluster available for scheduling and that is more compact than other compact combinations that are schedulable according to the list of nodes in the cluster available for scheduling. The method further includes, if the request is nonspatial and noncompact, identifying one or more nodes schedulable according to the list of nodes in the cluster available for scheduling and generating a nonspatial and noncompact combination of nodes in the cluster accommodating the number of nodes specified in the call from the management engine. The nonspatial and noncompact combination includes one or more of the one or more identified nodes schedulable according to the list of nodes in the cluster available for scheduling. The method further includes communicating a return to the management engine identifying one or more nodes in the selected spatial, compact, or nonspatial and noncompact combination of nodes in the cluster for executing the one or more processes in the job.

Particular embodiments of the present invention may provide one or more technical advantages. As an example, particular embodiments may reduce time requirements typically associated with scheduling a job for execution at an HPC system. Particular embodiments may reduce computational requirements typically associated with scheduling a job for execution at an HPC system. Particular embodiments of the present invention provide all, some, or none of the above technical advantages. Particular embodiments may provide one or more other technical advantages, one or more of which may be readily apparent to a person skilled in the art from the figures, description, and claims herein.

BRIEF DESCRIPTION OF THE DRAWINGS

To provide a more complete understanding of the present invention and the features and advantages thereof, reference is made to the following description taken in conjunction with the accompanying drawings, in which:

FIG. 12 is a flowchart illustrating a method for dynamic backfilling of the grid in accordance with the high-performance computing system of FIG. 1; and FIG. 13 is a flow chart illustrating a method for dynamically managing a node failure in accordance with the high-performance computing system of FIGURE

DETAILED DESCRIPTION OF THE DRAWINGS

Figure 1:
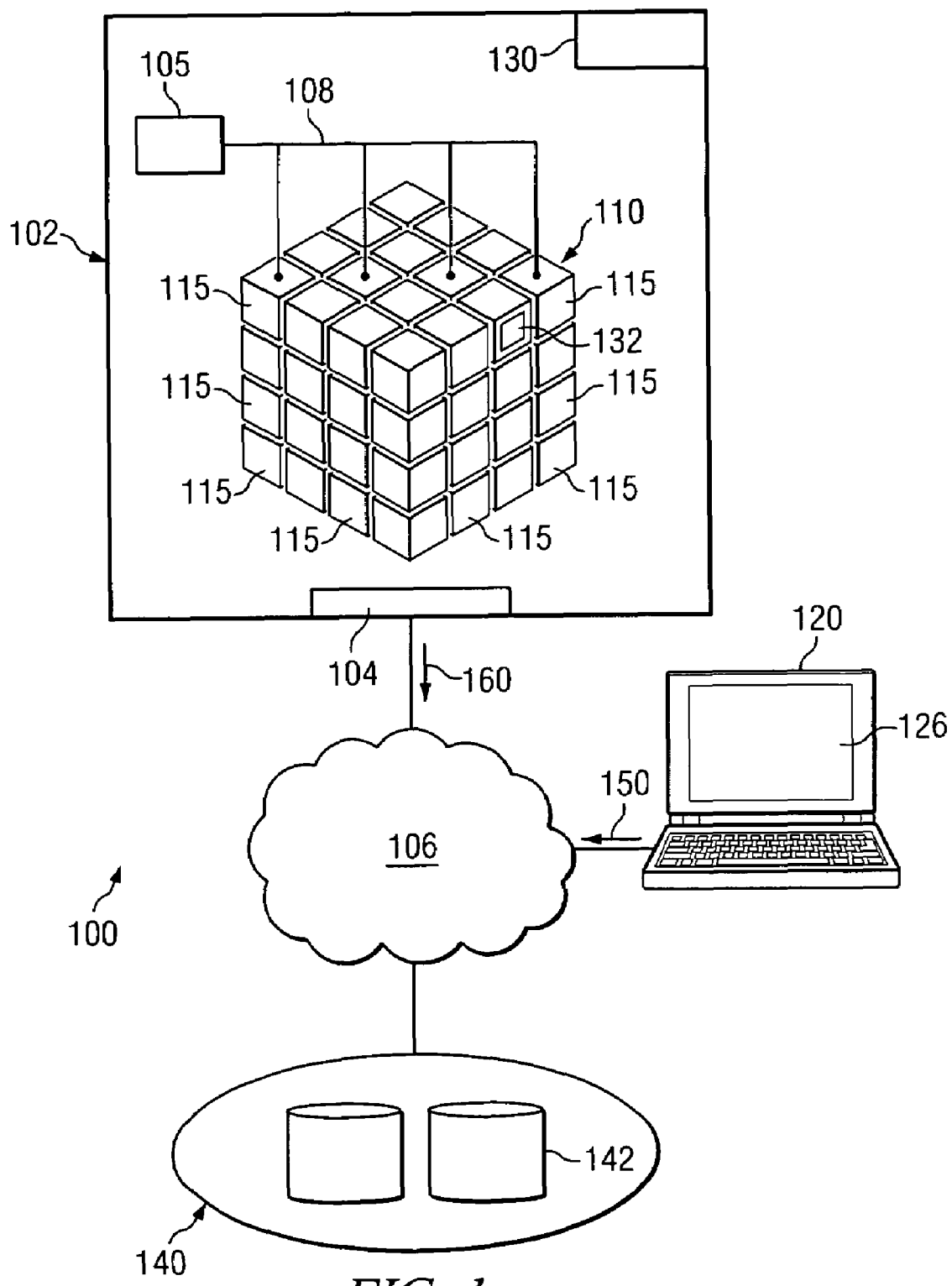
FIG. 1 illustrates an example high-performance computing system in accordance with one embodiment of the present disclosure.

FIG. 1 is a block diagram illustrating a high Performance Computing (HPC) system 100 for executing software applications and processes, for example an atmospheric, weather, or crash simulation, using HPC techniques. System 100 provides users with HPC functionality dynamically allocated among various computing nodes 115 with I/O performance substantially similar to the processing performance. Generally, these nodes 115 are easily scaleable because of, among other things, this increased I/O performance and reduced fabric latency. For example, the scalability of nodes 115 in a distributed architecture may be represented by a derivative of Amdahl's law:

$$S(N)=1/((FP/N)+FS)\times(1-Fc\times(1-RR/L))$$

where S(N)=Speedup on N processors, Fp=Fraction of Parallel Code, Fs=Fraction of Non-Parallel Code, Fc=Fraction of processing devoted to communications, and RR/L=Ratio of Remote/Local Memory Bandwidth. Therefore, by HPC system 100 providing I/O performance substantially equal to or nearing processing performance, HPC system 100 increases overall efficiency of HPC applications and allows for easier system administration.

HPC system 100 is a distributed client/server system that allows users (such as scientists and engineers) to submit jobs 150 for processing on an HPC server 102. For example, system 100 may include HPC server 102 that is connected, through network 106, to one or more administration workstations or local clients 120. But system 100 may be a standalone computing environment or any other suitable environment. In short, system 100 is any HPC computing environment that includes highly scaleable nodes 115 and allows the user to submit jobs 150, dynamically allocates scaleable nodes 115 for job 150, and automatically executes job 150 using the allocated nodes 115. Job 150 may be any batch or online job operable to be processed using HPC techniques and submitted by any apt user. For example, job 150 may be a request for a simulation, a model, or for any other high-performance requirement. Job 150 may also be a request to run a data center application, such as a clustered database, an online transaction processing system, or a clustered application server. The term "dynamically," as used herein, generally means that certain processing is determined, at least in part, at run-time based on one or more variables. The term "automatically," as used herein, generally means that the appropriate processing is substantially performed by at least part of HPC system 100. It should be understood that "automatically" further contemplates any suitable user or administrator interaction with system 100 without departing from the scope of this disclosure.

HPC server 102 comprises any local or remote computer operable to process job 150 using a plurality of balanced nodes 115 and cluster management engine 130. Generally, HPC server 102 comprises a distributed computer such as a blade server or other distributed server. However the configuration, server 102 includes a plurality of nodes 115. Nodes 115 comprise any computer or processing device such as, for example, blades, general-purpose personal computers (PC), Macintoshes, workstations, Unix-based computers, or any other suitable devices. Generally, FIG. 1 provides merely one example of computers that may be used with the disclosure. For example, although FIG. 1 illustrates one server 102 that may be used with the disclosure, system 100 can be implemented using computers other than servers, as well as a server pool. In other words, the present disclosure contemplates computers other than general purpose computers as well as computers without conventional operating systems. As used in this document, the term "computer" is intended to encompass a personal computer, workstation, network computer, or any other suitable processing device. HPC server 102, or the component nodes 115, may be adapted to execute any operating system including Linux, UNIX, Windows Server, or any other suitable operating system. According to one embodiment, HPC server 102 may also include or be communicably coupled with a remote web server. Therefore, server 102 may comprise any computer with software and/or hardware in any combination suitable to dynamically allocate nodes 115 to process HPC job 150.

At a high level, HPC server 102 includes a management node 105, a grid 110 comprising a plurality of nodes 115, and cluster management engine 130. More specifically, server 102 may be a standard 19" rack including a plurality of blades (nodes 115) with some or all of the following components: i) dual-processors; ii) large, high bandwidth memory; iii) dual host channel adapters (HCAs); iv) integrated fabric switching; v) FPGA support; and vi) redundant power inputs or N+1 power supplies. These various components allow for failures to be confined to the node level. But it will be understood that HPC server 102 and nodes 115 may not include all of these components.

Management node 105 comprises at least one blade substantially dedicated to managing or assisting an administrator. For example, management node 105 may comprise two blades, with one of the two blades being redundant (such as an active/passive configuration). In one embodiment, management node 105 may be the same type of blade or computing device as HPC nodes 115. But, management node 105 may be any node, including any Number of circuits and configured in any suitable fashion, so long as it remains operable to at least partially manage grid 110. Often, management node 105 is physically or logically separated from the plurality of HPC nodes 115, jointly represented in grid 110. In the illustrated embodiment, management node 105 may be communicably coupled to grid 110 via link 108. Reference to a "link" encompasses any appropriate communication conduit implementing any appropriate communications protocol. As an example and not by way of limitation, a link may include one or more wires in one or more circuit boards, one or more internal or external buses, one or more local area networks (LANs), one or more metropolitan area networks (MANs), one or more wide area networks (WANs), one or more portions of the Internet, or a combination of two or more such links, where appropriate. In one embodiment, link 108 provides Gigabit or 10 Gigabit Ethernet communications between management node 105 and grid 110.

Grid 110 is a group of nodes 115 interconnected for increased processing power. Typically, grid 110 is a 3D Torus, but it may be a mesh, a hypercube, or any other shape or configuration without departing from the scope of this disclosure. Reference to a "torus" may encompass all or a portion of grid 110, where appropriate, and vice versa, where appropriate. The links between nodes 115 in grid 110 may be serial or parallel analog links, digital links, or any other type of link that can convey electrical or electromagnetic signals such as, for example, fiber or copper. Each node 115 is configured with an integrated switch. This allows node 115 to more easily be the basic construct for the 3D Torus and helps minimize XYZ distances between other nodes 115. Further, this may make copper wiring work in larger systems at up to Gigabit rates with, in some embodiments, the longest cable being less than 5 meters. In short, node 115 is generally optimized for nearest-neighbor communications and increased I/O bandwidth.

Each node 115 may include a cluster agent 132 communicably coupled with cluster management engine 130. Generally, agent 132 receives requests or commands from management node 105 and/or cluster management engine 130. Agent 132 could include any hardware, software, firmware, or combination thereof operable to determine the physical status of node 115 and communicate the processed data, such as through a "heartbeat," to management node 105. In another embodiment, management node 105 may periodically poll agent 132 to determine the status of the associated node 115. Agent 132 may be written in any appropriate computer language such as, for example, C, C++, Assembler, Java, Visual Basic, and others or any combination thereof so long as it remains compatible with at least a portion of cluster management engine 130.

Cluster management engine 130 could include any hardware, software, firmware, or combination thereof operable to dynamically allocate and manage nodes 115 and execute job 150 using nodes 115. For example, cluster management engine 130 may be written or described in any appropriate computer language including C, C++, Java, Visual Basic, assembler, any suitable version of 4GL, and others or any combination thereof. It will be understood that while cluster management engine 130 is illustrated in FIG. 1 as a single multi-tasked module, the features and functionality performed by this engine may be performed by multiple modules such as, for example, a physical layer module, a virtual layer module, a job scheduler, and a presentation engine (as shown in more detail in FIG. 7). Further, while illustrated as external to management node 105, management node 105 typically executes one or more processes associated with cluster management engine 130 and may store cluster management engine 130. Moreover, cluster management engine 130 may be a child or sub-module of another software module without departing from the scope of this disclosure. Therefore, cluster management engine 130 comprises one or more software modules operable to intelligently manage nodes 115 and jobs 150. In particular embodiments, cluster management engine includes a scheduler 515 for allocating nodes 115 to jobs 150, as described below. Scheduler 515 may use a scheduling algorithm to allocate nodes 115 to jobs 150, as further described below.

Server 102 may include interface 104 for communicating with other computer systems, such as client 120, over network 106 in a client-server or other distributed environment. In certain embodiments, server 102 receives jobs 150 or job policies from network 106 for storage in disk farm 140. Disk farm 140 may also be attached directly to the computational array using the same wideband interfaces that interconnects the nodes. Generally, interface 104 comprises logic encoded in software and/or hardware in a suitable combination and operable to communicate with network 106. More specifically, interface 104 may comprise software supporting one or more communications protocols associated with communications network 106 or hardware operable to communicate physical signals.

Network 106 facilitates wireless or wireline communication between computer server 102 and any other computer, such as clients 120. Indeed, while illustrated as residing between server 102 and client 120, network 106 may also reside between various nodes 115 without departing from the scope of the disclosure. In other words, network 106 encompasses any network, networks, or sub-network operable to facilitate communications between various computing components. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations.

In general, disk farm 140 is any memory, database or storage area network (SAN) for storing jobs 150, profiles, boot images, or other HPC information. According to the illustrated embodiment, disk farm 140 includes one or more storage clients 142. Disk farm 140 may process and route data packets according to any of a Number of communication protocols, for example, InfiniBand (IB), Gigabit Ethernet (GE), or FibreChannel (FC). Data packets are typically used to transport data within disk farm 140. A data packet may include a header that has a source identifier and a destination identifier. The source identifier, for example, a source address, identifies the transmitter of information, and the destination identifier, for example, a destination address, identifies the recipient of the information.

Client 120 is any device operable to present the user with a job submission screen or administration via a graphical user interface (GUI) 126. At a high level, illustrated client 120 includes at least GUI 126 and comprises an electronic computing device operable to receive, transmit, process and store any appropriate data associated with system 100. It will be understood that there may be any Number of clients 120 communicably coupled to server 102. Further, "client 120" and "user of client 120" may be used interchangeably as appropriate without departing from the scope of this disclosure. Moreover, for ease of illustration, each client is described in terms of being used by one user. But this disclosure contemplates that many users may use one computer to communicate jobs 150 using the same GUI 126.

As used in this disclosure, client 120 is intended to encompass a personal computer, touch screen terminal, workstation, network computer, kiosk, wireless data port, cell phone, personal data assistant (PDA), one or more processors within these or other devices, or any other suitable processing device. For example, client 120 may comprise a computer that includes an input device, such as a keypad, touch screen, mouse, or other device that can accept information, and an output device that conveys information associated with the operation of server 102 or clients 120, including digital data, visual information, or GUI 126. Both the input device and output device may include fixed or removable storage media such as a magnetic computer disk, CD-ROM, or other suitable media to both receive input from and provide output to users of clients 120 through the administration and job submission display, namely GUI 126.

Figure 6A:
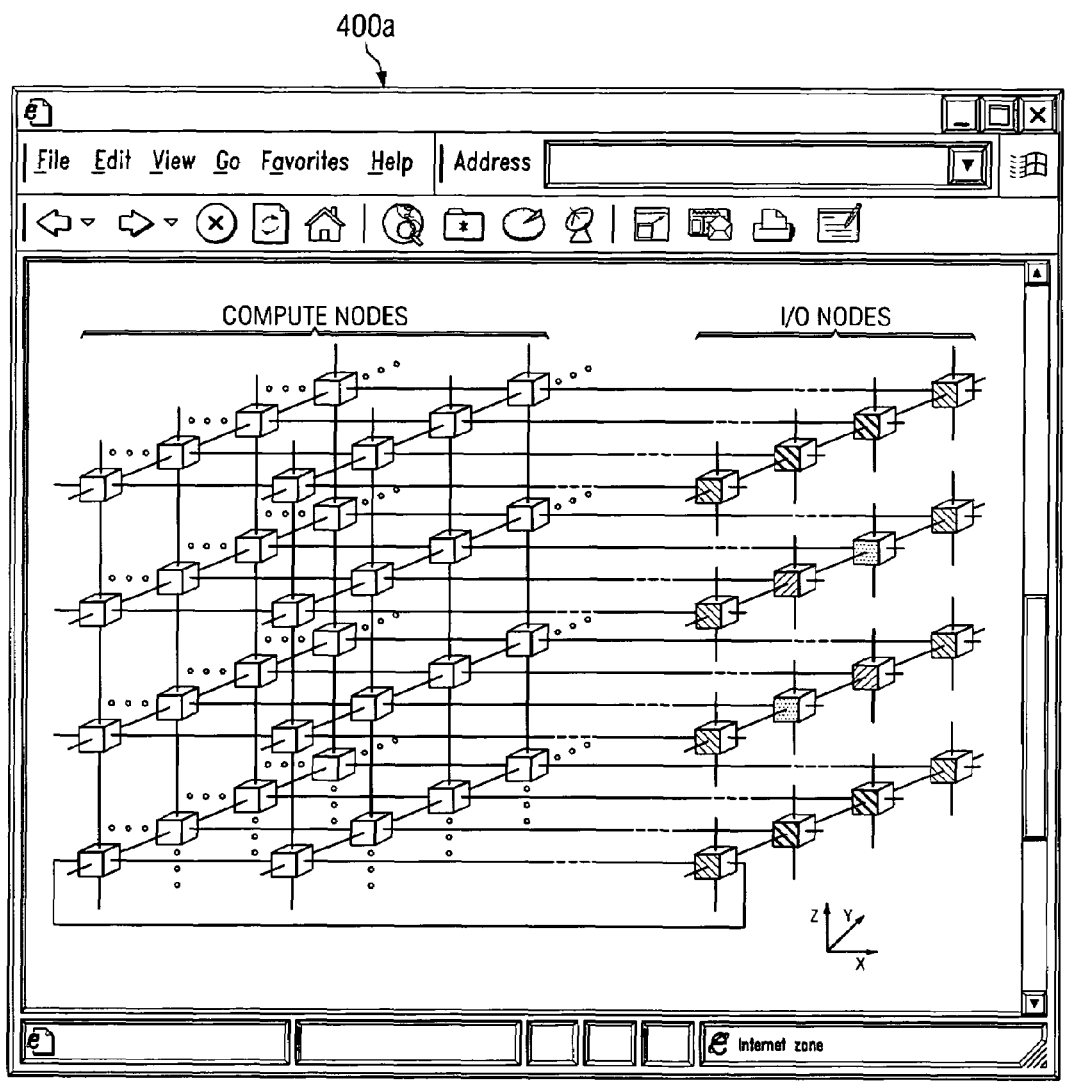
FIGS. 6A-6B illustrate various embodiments of a graphical user interface in accordance with the system of FIG. 1.
Figure 6B:
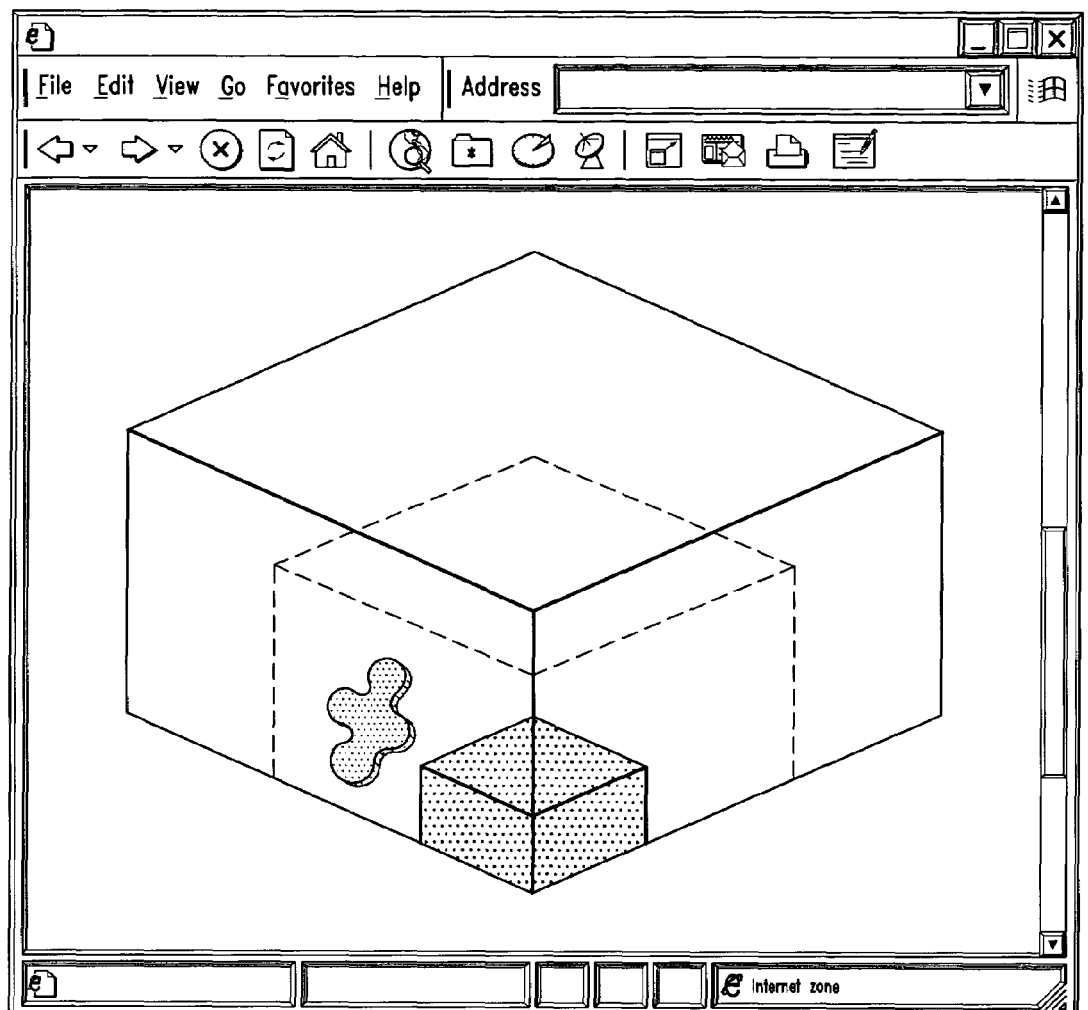

GUI 126 comprises a graphical user interface operable to allow i) the user of client 120 to interface with system 100 to submit one or more jobs 150; and/or ii) the system (or network) administrator using client 120 to interface with system 100 for any suitable supervisory purpose. Generally, GUI 126 provides the user of client 120 with an efficient and user-friendly presentation of data provided by HPC system 100. GUI 126 may comprise a plurality of customizable frames or views having interactive fields, pull-down lists, and buttons operated by the user. In one embodiment, GUI 126 presents a job submission display that presents the various job parameter fields and receives commands from the user of client 120 via one of the input devices. GUI 126 may, alternatively or in combination, present the physical and logical status of nodes 115 to the system administrator, as illustrated in FIGS. 6A-6B, and receive various commands from the administrator. Administrator commands may include marking nodes as (un)available, shutting down nodes for maintenance, rebooting nodes, or any other suitable command. Moreover, it should be understood that the term graphical user interface may be used in the singular or in the plural to describe one or more graphical user interfaces and each of the displays of a particular graphical user interface. Therefore, GUI 126 contemplates any graphical user interface, such as a generic web browser, that processes information in system 100 and efficiently presents the results to the user. Server 102 can accept data from client 120 via the web browser (e.g., Microsoft Internet Explorer or Netscape Navigator) and return the appropriate HTML or XML responses using network 106.

In one aspect of operation, HPC server 102 is first initialized or booted. During this process, cluster management engine 130 determines the existence, state, location, and/or other characteristics of nodes 115 in grid 110. As described above, this may be based on a "heartbeat" communicated upon each node's initialization or upon near immediate polling by management node 105. Next, cluster management engine 130 may dynamically allocate various portions of grid 110 to one or more virtual clusters 220 based on, for example, predetermined policies. In one embodiment, cluster management engine 130 continuously monitors nodes 115 for possible failure and, upon determining that one of the nodes 115 failed, effectively managing the failure using any of a variety of recovery techniques. Cluster management engine 130 may also manage and provide a unique execution environment for each allocated node of virtual cluster 220. The execution environment may consist of the hostname, IP address, operating system, configured services, local and shared file systems, and a set of installed applications and data. The cluster management engine 130 may dynamically add or subtract nodes from virtual cluster 220 according to associated policies and according to inter-cluster policies, such as priority.

When a user logs on to client 120, he may be presented with a job submission screen via GUI 126. Once the user has entered the job parameters and submitted job 150, cluster management engine 130 processes the job submission, the related parameters, and any predetermined policies associated with job 150, the user, or the user group. Cluster management engine 130 then determines the appropriate virtual cluster 220 based, at least in part, on this information. Engine 130 then dynamically allocates a job space 230 within virtual cluster 220 and executes job 150 across the allocated nodes 115 using HPC techniques. Based, at least in part, on the increased I/O performance, HPC server 102 may more quickly complete processing of job 150. Upon completion, cluster management engine communicates results 160 to the user.

Figure 2:
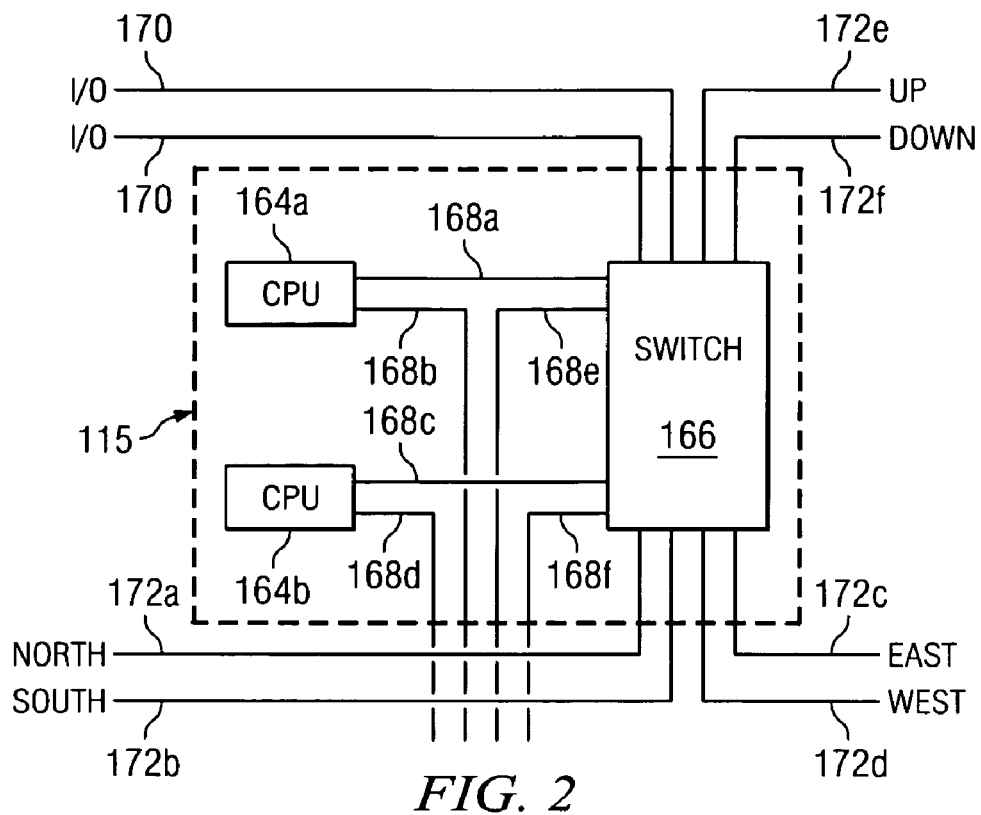
FIG. 2 illustrates an example node in the HPC system illustrated in FIG. 1.

FIG. 2 illustrates an example node (or blade) 115. A node 115 includes any computing device in any orientation for processing all or a portion, such as a thread or process, of one or more jobs 150. As an example and not by way of limitation, a node 115 may include a XEON motherboard, an OPTERON motherboard, or other computing device. Node 115 has an architecture providing an integrated fabric that enables distribution of switching functionality across nodes 115 in grid 110. In particular embodiments, distributing such functionality across nodes 115 in grid 110 may obviate centralized switching in grid 110, which may in turn increase fault tolerance in grid 110 and enable parallel communication among nodes 115 in grid 110.

Node 115 includes two CPUs 164 and a switch (or fabric) 166. Reference to a node 115 may encompass two CPUs 164 and a switch 166, where appropriate. Reference to a node 115 may encompass just a CPU 164, where appropriate. Switch 166 may be an integrated switch. In particular embodiments, switch 166 has twenty-four ports. Two ports on switch 166 may couple node 115 to management node 105 for input and output to and from node 115. In addition, two ports on switch 166 may each couple node 115 to another node 115 along an x axis of grid 110, two ports on switch 166 may each couple node 115 to another node 115 along a y axis of grid 110, and two ports on switch 166 may each couple node 115 to another node 115 along a z axis of grid 110 to facilitate implementation of a 3D mesh, a 3D torus, or other topology in grid 110. Additional ports on switch 166 may couple node 115 to other nodes 115 in grid 110 to facilitate implementation of a multidimensional topology (such as a 4D torus or other nontraditional topology including more than three dimensions) in grid 110. In particular embodiments, one or more ports on switch 166 may couple node 115 to one or more other nodes 115 along one or more diagonal axes of grid 110, which may reduce communication jumps or hops between node 115 and one or more other node 115 relatively distant from node 115. As an example and not by way of limitation, a port on switch 166 may couple node 115 to another node 155 residing along a northeasterly axis of grid 110 several 3D jumps away from node 115. In particular embodiments, switch 166 is an InfiniBand switch. Although a particular switch 166 is illustrated and described, the present invention contemplates any suitable switch 166.

Link 168a couples CPU 164a to switch 166. Link 168b couples CPU 164a to another switch 166 in another node 115, as described below. Link 168c couples CPU 164b to switch 166. Link 168d couples CPU 164b to other switch 166, as described below. Links 168e and 168f couple switch 166 to two other CPUs 164 in other node 115, as further described below. In particular embodiments, a link 168 includes an InfiniBand 4× link capable of communicating approximately one gigabyte per second in each direction. Although particular links 168 are illustrated and described, the present invention contemplates any suitable links 168. Links 170 are I/O links to node 115. A link 170 may include an InfiniBand 4× link capable of communicating approximately one gigabyte per second in each direction. Although particular links 170 are illustrated and described, the present invention contemplates any suitable links 170. Links 172 couple switch 166 to other switches 166 in other nodes 115, as described below. In particular embodiments, a link 172 includes an InfiniBand 12× link capable of communicating approximately three gigabytes per second in each direction. Although particular links 172 are illustrated and described, the present invention contemplates any suitable links 172.

Figure 3:
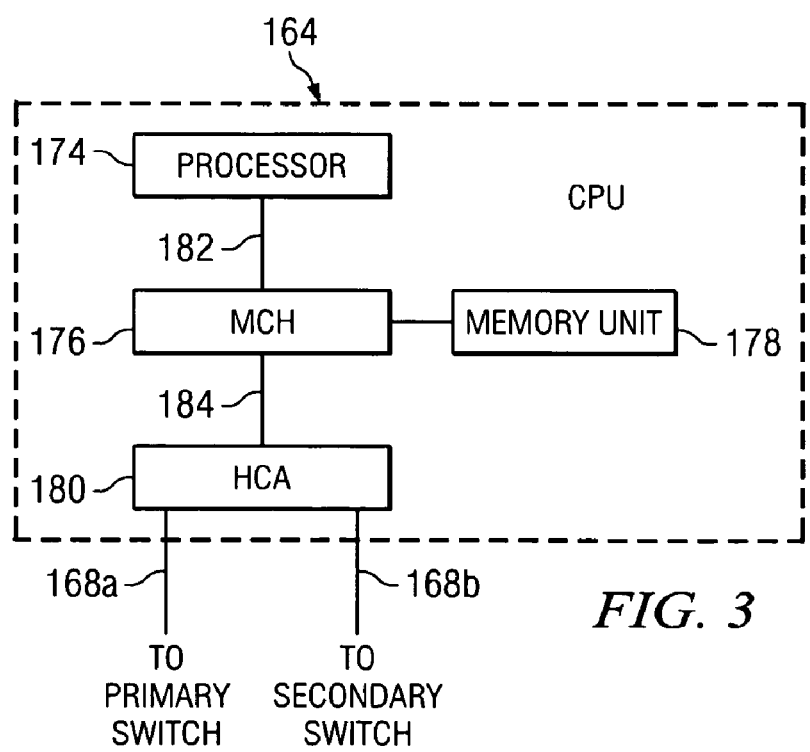
FIG. 3 illustrates an example central processing unit (CPU) in a node.

FIG. 3 illustrates an example CPU 164 in a node 115. Although an example CPU 164 is illustrated and the described, the present invention contemplates any suitable CPU 164. CPU 164 includes a processor 174, a memory controller hub (MCH) 176, a memory unit 178, and a host channel adapter (HCA) 180. Processor 174 includes a hardware, software, or embedded logic component or a combination of two or more such components. In particular embodiments, processor 174 is a NOCONA XEON processor 174 from INTEL. In particular embodiments, processor 174 is an approximately 3.6 gigahertz processor having an approximately 1 megabyte cache and being capable of approximately 7.2 gigaflops per second. In particular embodiments, processor 174 provides HyperThreading. In particular embodiments, processor 174 includes a memory controller providing efficient use of memory bandwidth. Although a particular processor 174 is illustrated and described, the present invention contemplates any suitable processor 174.

Bus 182 couples processor 174 and MCH 176 to each other. In particular embodiments, bus 182 is an approximately 800 MHz front side bus (FSB) capable of communicating approximately 6.4 gigabytes per second. Although a particular bus 182 is illustrated and described, the present invention contemplates any suitable bus 182. MCH 176 includes a hardware, software, or embedded logic component or a combination of two or more such components facilitating communication between processor 174 and one or more other components of HPC system 100, such as memory unit 178. In particular embodiments, MCH 176 is a northbridge for CPU 164 that controls communication between processor 174 and one or more of memory unit 178, bus 182, a Level 2 (L2) cache, and one or more other components of CPU 164. In particular embodiments, MCH 176 is a LINDENHURST E7520 MCH 176. In particular embodiments, Memory unit 178 includes eight gigabytes of random access memory (RAM). In particular embodiments, memory unit 178 includes two double data rate (DDR) memory devices separately coupled to MCH 176. As an example and not by way of limitation, memory unit 178 may include two DDR2-400 memory devices each capable of approximately 3.2 Gigabytes per second per channel. Although a particular memory unit 178 is illustrated and described, the present invention contemplates any suitable memory unit 178.

In particular embodiments, a link couples MCH 176 to an I/O controller hub (ICH) that includes one or more hardware, software, or embedded logic components facilitating I/O between processor 174 and one or more other components of HPC system 100, such as a Basic I/O System (BIOS) coupled to the ICH, a Gigabit Ethernet (GbE) controller or other Ethernet interface coupled to the ICH, or both. In particular embodiments, the ICH is a southbridge for CPU 164 that controls I/O functions of CPU 164. The Ethernet interface coupled to the ICH may facilitate communication between the ICH and a baseboard management controller (BMC) coupled to the Ethernet interface. In particular embodiments, management node 105 or other component of HPC system 100 includes one or more such BMCs. In particular embodiments, a link couples the Ethernet interface to a switch providing access to one or more GbE management ports.

Bus 184 couples MCH 176 and HCA 180 to each other. In particular embodiments, bus 184 is a peripheral component interconnect (PCI) bus 184, such as a PCI-Express 8× bus 184 capable of communicating approximately 4 gigabytes per second. Although a particular bus 184 is illustrated and described, the present invention contemplates any suitable bus 184. HCA 180 includes a hardware, software, or embedded logic component or a combination of two or more such components providing channel-based I/O to CPU 164. In particular embodiments, HCA 180 is a MELLANOX Infini-Band HCA 180. In particular embodiments, HCA 180 provides a bandwidth of approximately 2.65 gigabytes per second, which may allow approximately 1.85 gigabytes per processing element (PE) to switch 166 in node 115 and approximately 800 megabytes per PE to I/O, such as Basic I/O System (BIOS), an Ethernet interface, or other I/O. In particular embodiments, HCA 180 allows a bandwidth at switch 166 to reach approximately 3.7 gigabytes per second for an approximately 13.6 gigaflops per second peak, an I/O rate at switch 166 to reach approximately 50 megabytes per gigaflop for approximately 0.27 bytes per flop, or both. Although a particular HCA 180 is illustrated and described, the present invention contemplates any suitable HCA 180.

Each link 168 couples HCA 180 to a switch 166. Link 168a couples HCA 180 to a first switch 166 that is a primary switch 166 with respect to HCA 180, as described below. In particular embodiments, node 115 including HCA 180 includes first switch 166. Link 168b couples HCA 180 to a second switch 166 that is a secondary switch with respect to HCA 180, as described below. In particular embodiments, a node 115 not including HCA 180 includes second switch 166, as described below.

Figure 4:
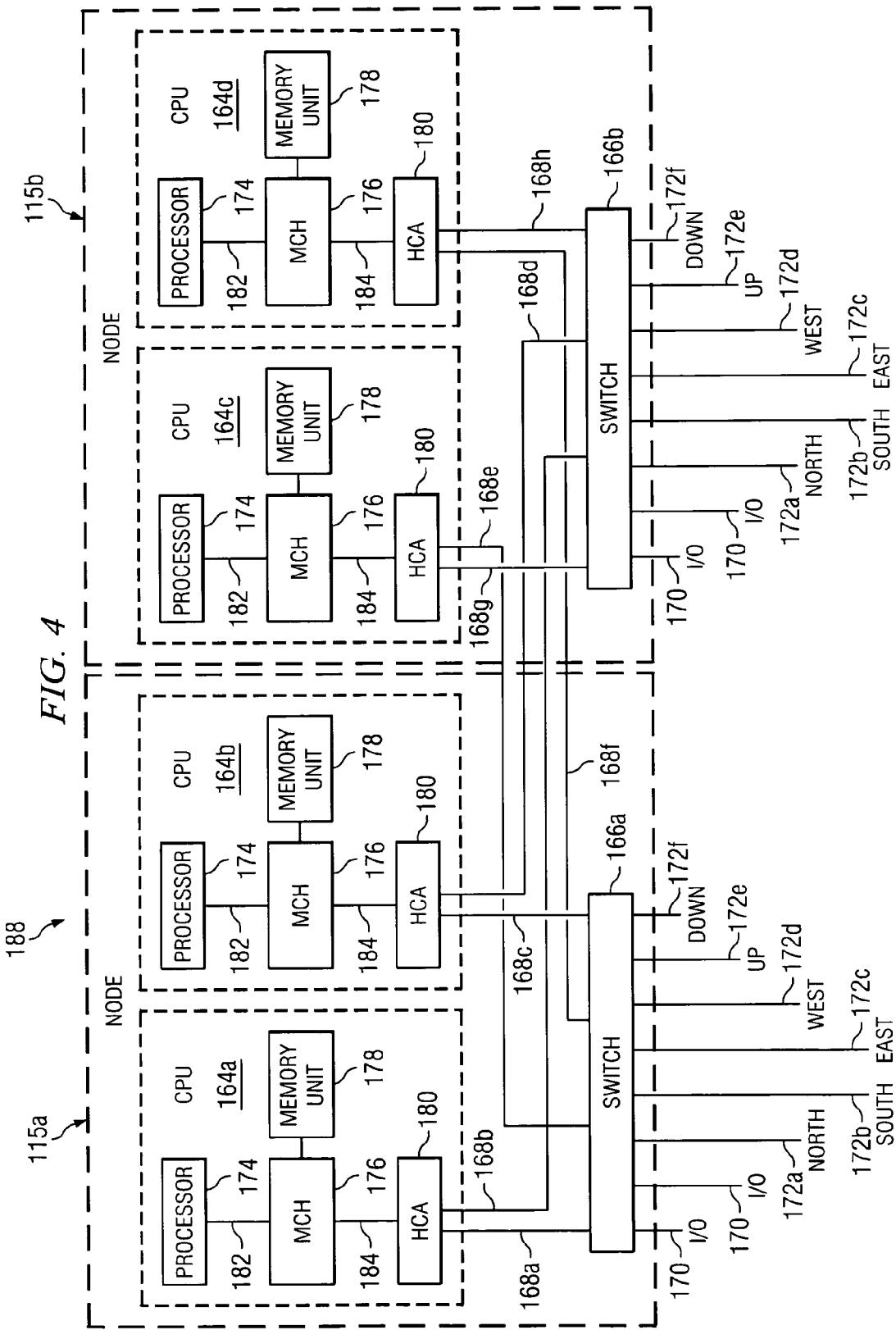
FIG. 4 illustrates an example node pair.

FIG. 4 illustrates an example node pair 186 including two switches 166 and four processors 174. Switches 166 in node pair 186 are redundant with respect to each other, which may increase fault tolerance at node pair 186. If a first switch 166 in node pair 186 is not functioning properly, a second switch 166 in node pair 186 may provide switching for all four CPUs in node pair 186. In node pair 186, switch 166a is a primary switch 166 with respect to CPUs 164a and 164b and a secondary switch 166 with respect to CPUs 164c and 164d. Switch 166b is a primary switch 166 with respect to CPUs 164c and 164d and a secondary switch 166 with respect to CPUs 164a and 164b. If both switches 166a and 116b are functioning properly, switch 166a may provide switching for CPUs 164a and 164b and switch 166b may provide switching for CPUs 164c and 164d. If switch 166a is functioning properly, but switch 166b is not, switch 166a may provide switching for CPUs 164a, 164b, 164c, and 164d. If switch 166b is functioning properly, but switch 166a is not functioning properly, switch 166b may provide switching for CPUs 164a, 164b, 164c, and 164d.

Links 172 couple each node 115 in node pair 186 to six nodes 115 outside node pair 186 in grid 110. As an example and not by way of limitation, link 172a at switch 166a couples node 115a to a first node 115 outside node pair 186 north of node 115a in grid 110, link 172b at switch 166a couples node 115a to a second node 115 outside node pair 186 south of node 115a in grid 110, link 172c at switch 166a couples node 115a to a third node 115 outside node pair 186 east of node 115a in grid 110, link 172d at switch 166a couples node 115a to a fourth node 115 outside node pair 186 west of node 115a in grid 110, link 172e at switch 166a couples node 115a to a fifth node 115 outside node pair 186 above node 115a in grid 110, and link 172f at switch 166a couples node 115a to a sixth node 115 outside node pair 186 below node 115a in grid 110. In particular embodiments, links 172 couple nodes 115a and 115b in node pair 186 to sets of nodes 115 outside node pair 186 that are different from each other. As an example and not by way of limitation, links 172 at switch 166a may couple node 115a to a first set of six nodes 115 outside node pair 186 that includes a first node 115 outside node pair 186, a second node 115 outside node pair 186, a third node 115 outside node pair 186, a fourth node 115 outside node pair 186, a fifth node 115 outside node pair 186, and a sixth node 115 outside node pair 186. Links 172 at switch 166b may couple node 115b to a second set of six nodes 115 outside node pair 186 that includes a seventh node 115 outside node pair 186, an eighth node 115 outside node pair 186, a ninth node 115 outside node pair 186, a tenth node 115 outside node pair 186, an eleventh node 115 outside node pair 186, and a twelfth node 115 outside node pair 186.

In particular embodiments, a link 172 may couple a first node 115 adjacent a first edge of grid 110 to a second node 115 adjacent a second edge of grid 110 opposite the first edge. As an example and not by way of limitation, consider a first node 115 adjacent a left edge of grid 110 and a second node 115 adjacent a right edge of grid 110 opposite the left edge of grid 110. A link 172 may couple first and second nodes 115 to each other such that first node 115 is east of second node 115 and second node 115 is west of first node 115, despite a location of first node 115 relative to a location of second node 115 in grid 110. As another example, consider a first node 115 adjacent a front edge of grid 110 and a second node 115 adjacent a back edge of grid 110 opposite the front edge of grid 110. A link 172 may couple first and second nodes 115 to each other such that first node 115 is south of second node 115 and second node 115 is north of first node 115, despite a location of first node 115 relative to a location of second node 115 in grid 110. As yet another example, consider a first node 115 adjacent a top edge of grid 110 and a second node 115 adjacent a bottom edge of grid 110 opposite the top edge of grid 110. A link 172 may couple first and second nodes 115 to each other such that first node 115 is below second node 115 and second node 115 is above first node 115, despite a location of first node 115 relative to a location of second node 115 in grid 110.

Figure 5A:
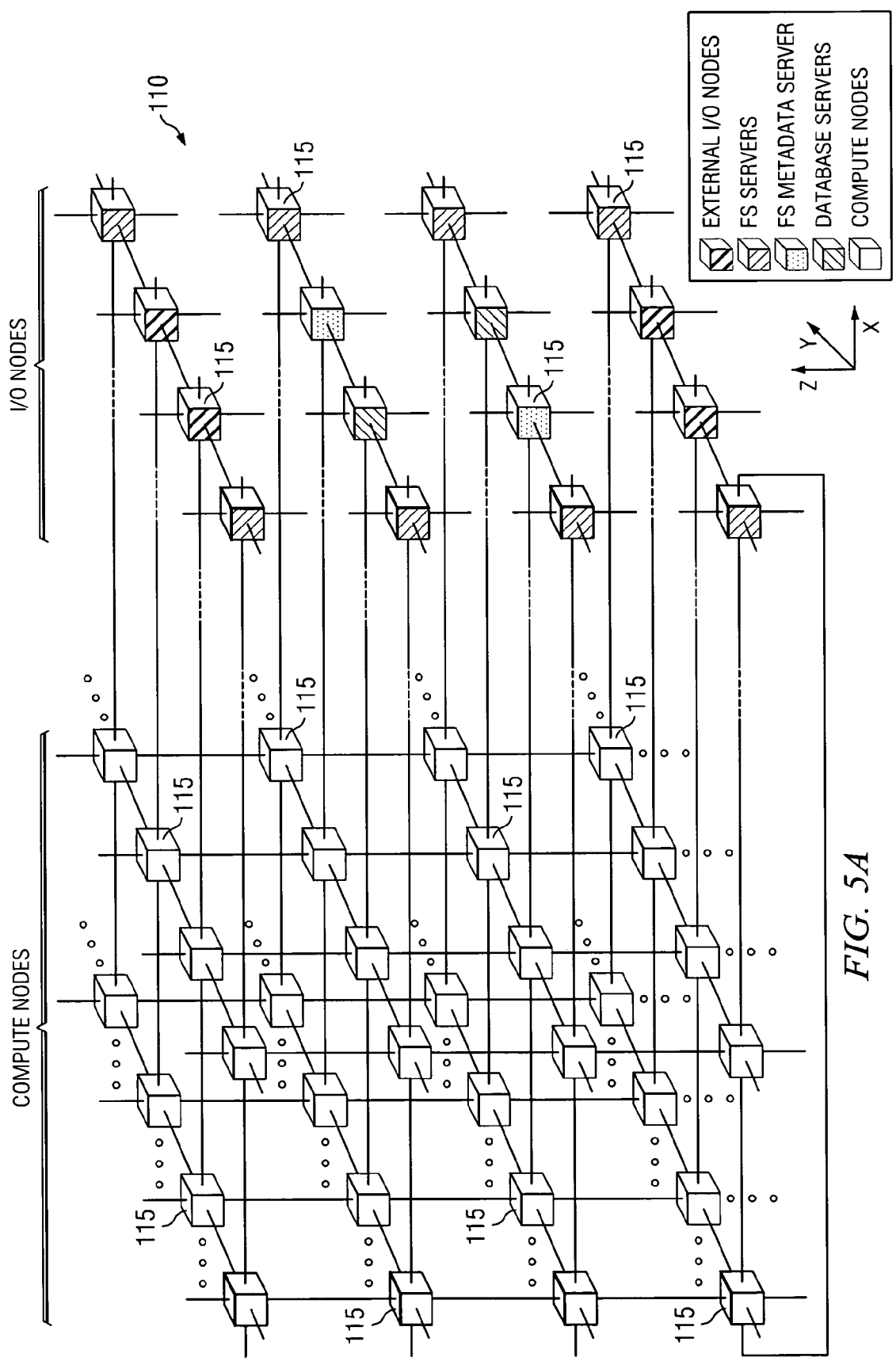
FIGS. 5A-5D illustrate various embodiments of the grid in the system of FIG. 1 and the usage thereof.
Figure 5B:
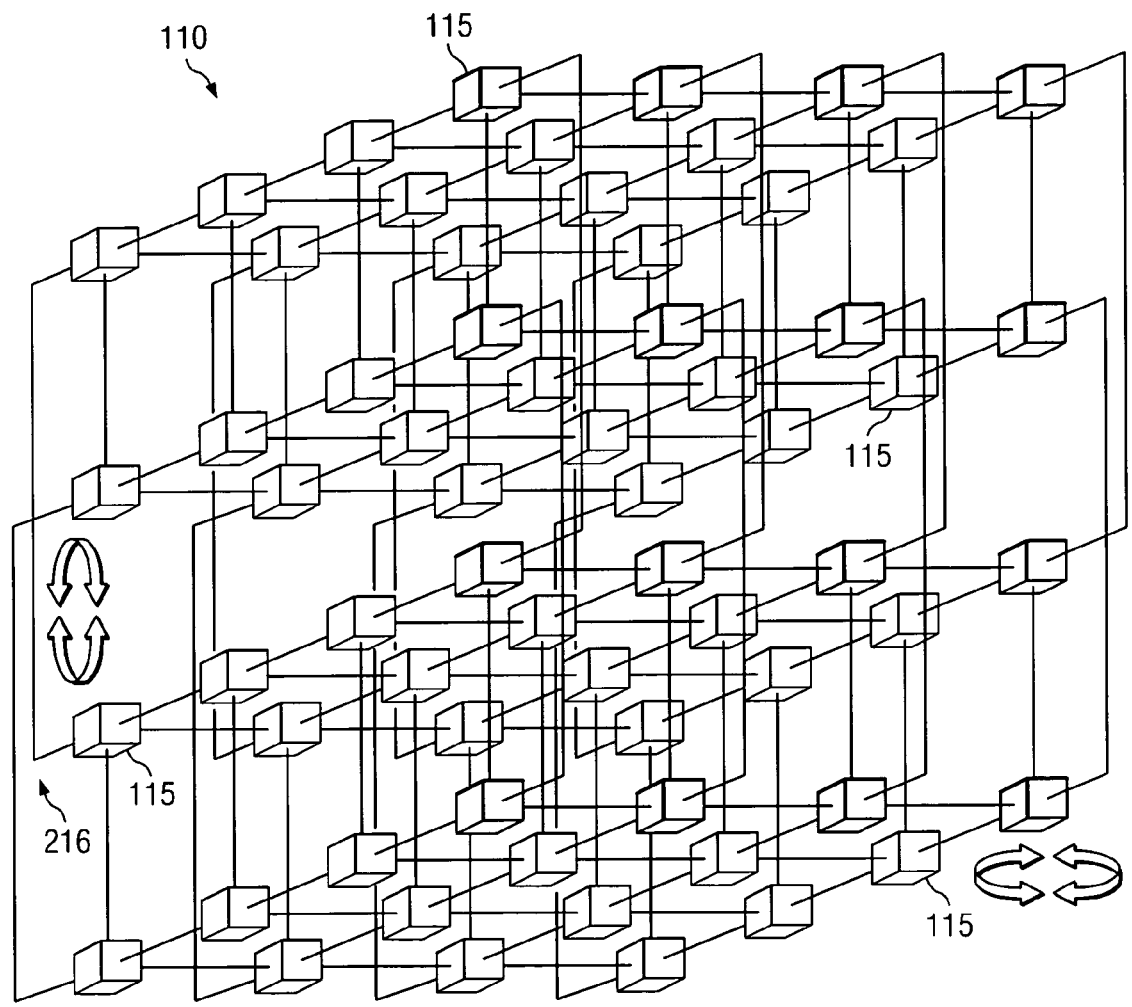

FIGS. 5A-5D illustrate various embodiments of grid 110 in system 100 and the usage or topology thereof. FIG. 5A illustrates one configuration, namely a 3D Torus, of grid 110 using a plurality of node types. For example, the illustrated node types are external I/O node, files system (FS) server, FS metadata server, database server, and compute node. FIG. 5B illustrates an example of "folding" of grid 110. Folding generally allows for one physical edge of grid 110 to connect to a corresponding axial edge, thereby providing a more robust or edgeless topology. In this embodiment, nodes 115 are wrapped around to provide a near seamless topology connect by a node line 216. Node line 216 may be any suitable hardware implementing any communications protocol for interconnecting two or more nodes 115. For example, node line 216 may be copper wire or fiber optic cable implementing Gigabit Ethernet. In particular embodiments, a node line 216 includes one or more links 172, as described above.

Figure 5C:
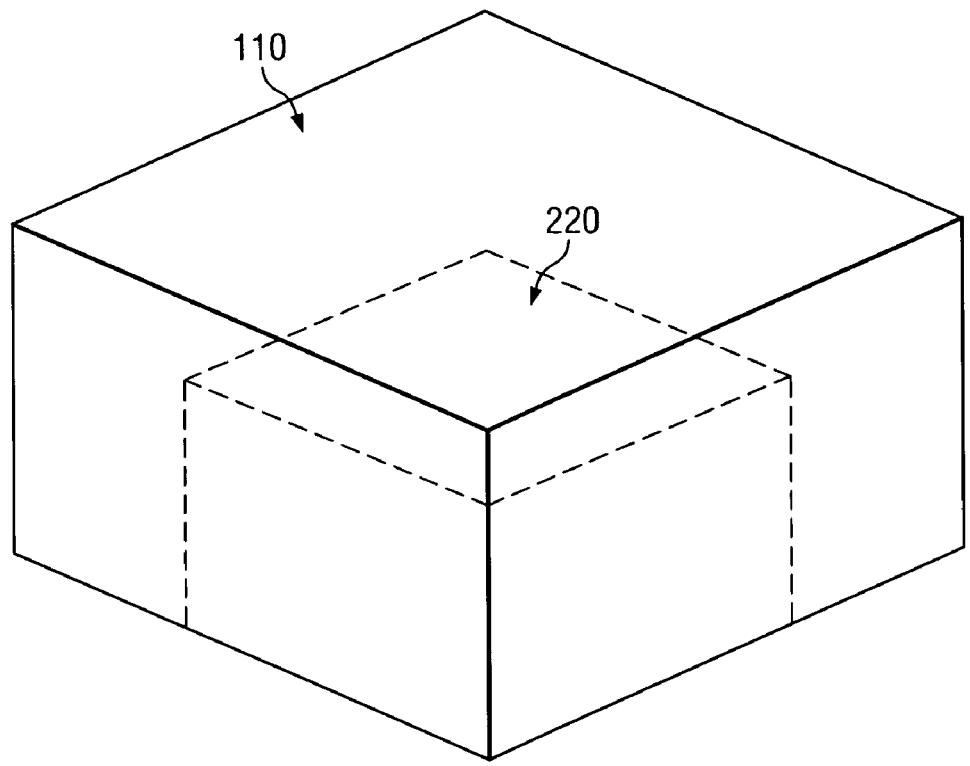

FIG. 5C illustrates grid 110 with one virtual cluster 220 allocated within it. While illustrated with only one virtual cluster 220, there may be any Number (including zero) of virtual clusters 220 in grid 110 without departing from the scope of this disclosure. Virtual cluster 220 is a logical grouping of nodes 115 for processing related jobs 150. For example, virtual cluster 220 may be associated with one research group, a department, a lab, or any other group of users likely to submit similar jobs 150. Virtual cluster 220 may be any shape and include any Number of nodes 115 within grid 110. Indeed, while illustrated virtual cluster 220 includes a plurality of physically neighboring nodes 115, cluster 220 may be a distributed cluster of logically related nodes 115 operable to process job 150.

Virtual cluster 220 may be allocated at any appropriate time. For example, cluster 220 may be allocated upon initialization of system 100 based, for example, on startup parameters or may be dynamically allocated based, for example, on changed server 102 needs. Moreover, virtual cluster 220 may change its shape and size over time to quickly respond to changing requests, demands, and situations. For example, virtual cluster 220 may be dynamically changed to include an automatically allocated first node 115 in response to a failure of a second node 115, previously part of cluster 220. In certain embodiments, clusters 220 may share nodes 115 as processing requires. In particular embodiments, scheduler 515 may allocate one or more virtual clusters 220 to one or more jobs 150 according to a scheduling algorithm, as described below.

Figure 5D:
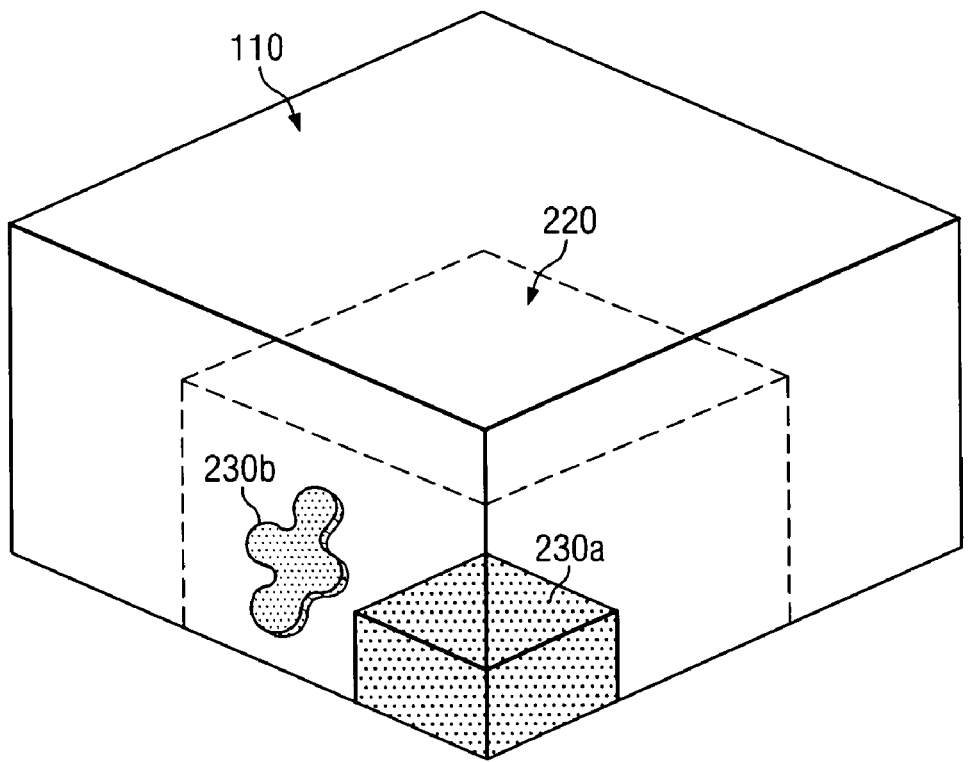

FIG. 5D illustrates various job spaces, 230a and 230b respectively, allocated within example virtual cluster 220. Generally, job space 230 is a set of nodes 115 within virtual cluster 220 dynamically allocated to complete received job 150. Typically, there is one job space 230 per executing job 150 and vice versa, but job spaces 230 may share nodes 115 without departing from the scope of the disclosure. The dimensions of job space 230 may be manually input by the user or administrator or dynamically determined based on job parameters, policies, and/or any other suitable characteristic. In particular embodiments, scheduler 515 may determine one or more dimensions of a job space 230 according to a scheduling algorithm, as described below.

FIGS. 6A-6B illustrate various embodiments of a management graphical user interface 400 in accordance with the system 100. Often, management GUI 400 is presented to client 120 using GUI 126. In general, management GUI 400 presents a variety of management interactive screens or displays to a system administrator and/or a variety of job submission or profile screens to a user. These screens or displays are comprised of graphical elements assembled into various views of collected information. For example, GUI 400 may present a display of the physical health of grid 110 (illustrated in FIG. 6A) or the logical allocation or topology of nodes 115 in grid 110 (illustrated in FIG. 6B).

FIG. 6A illustrates example display 400a. Display 400a may include information presented to the administrator for effectively managing nodes 115. The illustrated embodiment includes a standard web browser with a logical "picture" or screenshot of grid 110. For example, this picture may provide the physical status of grid 110 and the component nodes 115. Each node 115 may be one of any Number of colors, with each color representing various states. For example, a failed node 115 may be red, a utilized or allocated node 115 may be black, and an unallocated node 115 may be shaded. Further, display 400a may allow the administrator to move the pointer over one of the nodes 115 and view the various physical attributes of it. For example, the administrator may be presented with information including "node," "availability," "processor utilization," "memory utilization," "temperature," "physical location," and "address." Of course, these are merely example data fields and any appropriate physical or logical node information may be display for the administrator. Display 400a may also allow the administrator to rotate the view of grid 110 or perform any other suitable function.

FIG. 6B illustrates example display 400b. Display 400b presents a view or picture of the logical state of grid 100. The illustrated embodiment presents the virtual cluster 220 allocated within grid 110. Display 400b further displays two example job spaces 230 allocate within cluster 220 for executing one or more jobs 150. Display 400b may allow the administrator to move the pointer over graphical virtual cluster 220 to view the Number of nodes 115 grouped by various statuses (such as allocated or unallocated). Further, the administrator may move the pointer over one of the job spaces 230 such that suitable job information is presented. For example, the administrator may be able to view the job name, start time, Number of nodes, estimated end time, processor usage, I/O usage, and others.

It will be understood that management GUI 126 (represented above by example displays 400a and 400b, respectively) is for illustration purposes only and may include none, some, or all of the illustrated graphical elements as well as additional management elements not shown.

Figure 7:
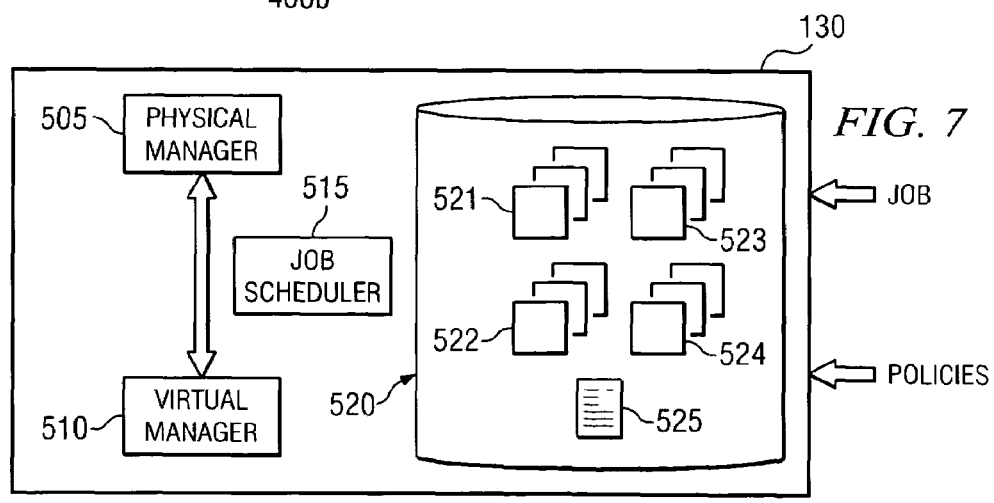
FIG. 7 illustrates one embodiment of the cluster management software in accordance with the system in FIG. 1.

FIG. 7 illustrates one embodiment of cluster management engine 130, in accordance with system 100. In this embodiment, cluster management engine 130 includes a plurality of sub-modules or components: physical manager 505, virtual manager 510, scheduler 515, and local memory or variables 520.

Physical manager 505 is any software, logic, firmware, or other module operable to determine the physical health of various nodes 115 and effectively manage nodes 115 based on this determined health. Physical manager may use this data to efficiently determine and respond to node 115 failures. In one embodiment, physical manager 505 is communicably coupled to a plurality of agents 132, each residing on one node 115. As described above, agents 132 gather and communicate at least physical information to manager 505. Physical manager 505 may be further operable to communicate alerts to a system administrator at client 120 via network 106.

Virtual manager 510 is any software, logic, firmware, or other module operable to manage virtual clusters 220 and the logical state of nodes 115. Generally, virtual manager 510 links a logical representation of node 115 with the physical status of node 115. Based on these links, virtual manager 510 may generate virtual clusters 220 and process various changes to these clusters 220, such as in response to node failure or a (system or user) request for increased HPC processing. Virtual manager 510 may also communicate the status of virtual cluster 220, such as unallocated nodes 115, to scheduler 515 to enable dynamic backfilling of unexecuted, or queued, HPC processes and jobs 150. Virtual manager 510 may further determine the compatibility of job 150 with particular nodes 115 and communicate this information to scheduler 515. In certain embodiments, virtual manager 510 may be an object representing an individual virtual cluster 220.

In particular embodiments, cluster management engine 130 includes scheduler 515. Scheduler 515 includes a hardware, software, or embedded logic component or one or more such components for allocating nodes 115 to jobs 150 according to a scheduling algorithm. In particular embodiments, scheduler 515 is a plug in. In particular embodiments, in response to cluster management engine 130 receiving a job 150, cluster management engine 130 calls scheduler 515 to allocate one or more nodes 515 to job 150. In particular embodiments, when cluster management engine 130 calls scheduler 515 to allocate one or more nodes 515 to a job 150, cluster management engine 130 identifies to scheduler 515 nodes 115 in grid 110 available for allocation to job 150. As an example and not by way of limitation, when cluster management engine 130 calls scheduler 515 to allocate one or more nodes 115 to a job 150, cluster management engine 130 may communicate to scheduler 515 a list of all nodes 115 in grid 110 available for allocation to job 150. In particular embodiments, cluster management engine 130 calls scheduler 515 to allocate one or more nodes 115 to a job 150 only if a Number of nodes 115 available for allocation to job 150 is greater than or equal to a Number of nodes 115 requested for job 150.

As described above, in particular embodiments, grid 110 is a three dimensional torus of switches 166 each coupled to four CPUs 164. Scheduler 515 logically configures grid 110 as a torus of nodes 115. A torus of size [x,y,z] switches 166 provides six possible logical configurations: [4x,y,z], [x,4y,z], [x,y,4z], [2x,2y,z], [2x,y,2z], and [x,2y,2z]. When scheduler 515 allocates one or more nodes 115 to a job 150, scheduler 515 may select a logical configuration best suited to job 150.

Message Passing Interface (MPI) is a standard for communication among processes in a job 150. In particular embodiments, scheduler 515 assigns an MPI Rank to each node 115 allocated to a job 150. For a job 150 including N processes, scheduler 150 assigns a unique integer Rank between 0 and N−1 to each process. To communicate a message to a first process in job 150, a second process in job 150 may specify a Rank of the first process. Similarly, to receive a message from a first process in a job 150, a second process in job 150 may specify a Rank of the first process. Scheduler 150 may also define one or more broadcast groups each facilitating communication of messages from processes in the broadcast group to all other processes in the broadcast group. To receive a message from a first process in a broadcast group, a second process in the broadcast group may specify the broadcast group In particular embodiments, scheduler 515 handles three types of requests: "spatial," "compact," and "any." Reference to a "request" encompasses a job 150, where appropriate, and vice versa, where appropriate. When a user submits a job 150 to HPC server 102, the user may specify a request type. A "spatial" request encompasses a job 150 described spatially. One class of existing MPI applications assumes a spatial relationship among processes in a job 150. Weather models are an example. To process a job 150 including a weather model, HPC server 102 may use a two dimensional grid encompassing longitude and latitude (or a similar coordinate system) to partition the surface of the earth and divides the time period into discrete time steps. Each process of job 150 models the weather for a particular area. At the beginning of each time step, the process exchanges boundary values with each of four other processes neighboring the process and then computes weather for the particular area. To process a job 150 including a weather model, HPC server 102 may use a three dimensional grid encompassing longitude, latitude, and altitude (or a similar coordinate system) instead of a two dimensional grid to partition the surface of the earth.

For an MPI application assuming a spatial relationship among processes in a job 150, a user may request a triplet {Sx,Sy,Sz} of nodes 115 for job 150. If all the dimensions S are greater than one, the request is a three dimensional request. If one of the dimensions S is equal to one, the request is a two dimensional request. If two of the dimensions S are equal to one, the request is a one dimensional request. To allocate nodes 115 to the request, scheduler 150 may map spatial coordinates to MPI Rank as follows: $[x, y, z] \rightarrow x \times Sy \times Sz + y \times Sz + z$. Sx, Sy, and Sz indicate a size of the request, x is between zero and Sx, y is between zero and Sy, and z is between zero and Sz. To allocate nodes 115 to a two dimensional request, scheduler 150 may map spatial coordinates to MPI Rank as follows: $[x, y] \rightarrow x \times Sy + y$. In particular embodiments, to map spatial coordinates to MPI Rank, scheduler 515 first increments along a z axis of grid 110, then increments along a y axis of grid 110, and then increments along an x axis of grid 110. To accommodate an incorrect assumption regarding scheduler 515 mapping spatial coordinates to MPI Rank, e.g., first incrementing along an x axis of grid 110, then incrementing along a y axis of grid 110, and then incrementing along a z axis of grid 110, cluster management engine 30 may present a requested job 150 to scheduler 515 as, e.g., {Sz, Sy, Sx}.

A "compact" request encompasses a job 150 not described spatially. Scheduler 515 may allocate nodes 115 to a compact request to minimize a maximum communication distance (or hop count) between each pair of nodes 115 allocated to the compact request. An "any" request encompasses a job 150 requiring little or no interprocess communication. Scheduler 150 may allocate any set of nodes 115 to satisfy an any request. Such a job 150 provides scheduler 150 an opportunity to fill holes resulting from fragmentation in grid 110.

When a user submits a job 150 to HPC server 102, the user may also specify an aggressive flag on job 150. In particular embodiments, an aggressive flag is a floating-point Number between zero and one indicating a degree of leeway allotted to scheduler 515 for purposes of allocating nodes 115 to job 150. A higher Number gives scheduler 515 more leeway than a lower Number does. If a user submits a spatial request to HPC server 102 and sets an aggressive flag on the spatial request to zero, scheduler 515 schedules job 150 only if nodes 115 are available to accommodate the spatial request. In particular embodiments, if a user submits a spatial request to HPC server 102 and sets an aggressive flag on the spatial request to a Number greater than zero, scheduler 515 tries to accommodate the spatial request, but, if scheduler 515 cannot accommodate the spatial request, schedules job 150 as a compact request. In particular embodiments, a compact request may allow unlimited hop counts between pairs of nodes 115 allocated to the compact request. Scheduler 150 can always accommodate such a request because, as described above, cluster management engine 130 calls scheduler 515 only if a Number of nodes 115 available for allocation is greater than or equal to a Number of nodes 115 requested. In particular embodiments, an aggressive flag on a compact request indicates a limit on hop counts between pairs of nodes 115 allocated to the compact request. In such embodiments, the limit on hop counts may equal $$\frac{1}{1-a},$$

where a is the aggressive flag.

In particular embodiments, when cluster management engine 130 calls scheduler 515 to allocate one or more nodes 115 to a job 150, cluster management engine 130 provides the following input to scheduler 515: a Number of nodes 115 requested; a request type; a size of job 150; an aggressive flag on job 150; a switch-based size of grid 110 (which scheduler 515 later adjusts to determine a node-based size of grid 110); a Number of nodes 115 per switch 166 (which, in particular embodiments, equals four); a Number of nodes 115 available for allocation to job 150; and identification of one or more nodes 115 available for allocation to job 150 (such as, for example, a list of all nodes 115 available for allocation to job 150). In particular embodiments, RequestedNodes indicates the Number of nodes 115 requested, RequestType indicates the request type, RequestedSize (which includes an array) indicates the size of job 150, AggressiveFlag indicates the aggressive flag on job 150, TorusSize (which includes array) indicates the switch-based size of grid 110, NodesPerSwitch indicates the Number of nodes 115 per switch 166, NumFreeNodes indicates the Number of nodes 115 available for allocation to job 150, and FreeNodeList (which includes an array) identifies one or more nodes 115 available for allocation to job 150.

In particular embodiments, when scheduler 515 schedules (or attempts to schedule) a job 150, scheduler 515 provides the following output: identification of nodes 115 allocated to job 150 (such as a list of nodes 115 allocated to job 150); an MPI Rank of each node allocated to job 150; and a return value indicating that (1) scheduler 515 scheduled job 150, (2) scheduler 515 did not schedule job 150, or (3) scheduler 515 can never schedule job 150.

In particular embodiments, to allocate nodes 115 to a job 150, scheduler 515 first initializes variables for scheduling job 150, then schedules job 150 according to the variables, and then converts the schedule (or results) for processing at cluster management engine 130. Three variables—SpatialAllowed, CompactAllowed, and AnyAllowed—indicate allowed types of scheduling. Scheduler 515 may use the following example logic to initialize SpatialAllowed, CompactAllowed, and AnyAllowed:

```
If the NodesRequested = 1
    SpatialAllowed = False
    CompactAllowed = False
    AnyAllowed = True
Else If RequestedType = SPATIAL
    SpatialAllowed = True
    AnyAllowed = False
    If AggressiveFlag > 0
        CompactAllowed = True
    Else
        ComPactAllowed = False
Else If RequestedType = Compact
    SpatialAllowed = False
    CompactAllowed = True
    AnyAllowed = False
Else If RequestedType = Any
    SpatialAllowed = False
    CompactAllowed = False
    AnyAllowed = True
```

In particular embodiments, scheduler 515 orients a switch-based size of grid 110 to indicate larger dimensions of grid 110 before smaller dimensions of grid 110. TorusMap (which includes an array) indicates the switch-based size of grid 110 oriented to indicate larger dimensions of grid 110 before smaller dimensions of grid 110. Scheduler 515 applies TorusMap to all nodes 115 identified in FreeNodeList. InverseTorusMap (which includes an array) is an inverse of TorusMap, and scheduler 515 applies InverseTorusMap to a list of nodes 115 allocated to a job 150 before returning the list to cluster management engine 130 for processing. As an example and not by way of limitation, if cluster management engine 130 communicates a switch-based torus size of 14×16×15 to scheduler 515, scheduler 515 sets TorusMap to {2,0,1}. The switch-based torus size then becomes 16×15×14 and, for a node 155 in FreeNodeList having indices {x,y,z}, the indices of node 155 after scheduler 515 applies TorusMap are {y,z,x}. The InverseTorusMap for the above example is {1,2,0}.

In particular embodiments, NumMapDimensions indicates a Number of dimensions for modification when converting a switch-based torus to a node-based torus. MapDimsions[2] and MapMod[2] provide indices of the dimensions for modification and respective multipliers of the dimensions for modification. Scheduler 515 may multiply one of the dimensions for modification by four or multiply each of two of the dimensions for modification by two. Scheduler 515 determines which multiplication to apply and then modifies a size of the torus, initially described in terms of switches, accordingly. Scheduler 515 determines, according to RequestType, which multiplication to apply.

In particular embodiments, scheduler 515 applies one or more geometric transformations to a request to generate a list of meshes satisfying the request. A mesh includes a box embedded in grid 110. A start point, [Sx, Sy, Sz], and an end point, [Ex, Ey, Ez], define a mesh. A mesh "wraps" in one or more dimensions if the mesh has a start point greater than an end point in the one or more dimensions. As an example and not by way of limitation, a mesh with a start point at [3,7,5] and an end point at [2,9,4] wraps in the x and y dimensions. A point, [x, y, z], in grid 110 resides in a nonwrapping mesh if [Sx≦x≦Ex], [Sy≦y≦Ey], and [Sz≦z≦Ez]. After scheduler 515 generates a list of meshes satisfying the request, scheduler 515 loops through the list until scheduler 515 identifies a mesh that is schedulable with respect to a set of nodes 155 available for allocation to the request. Generally, a three dimensional request tends to result in six meshes satisfying the request, a two dimensional request tends to result in tens of meshes satisfying the request, and a one dimensional request tends to result in hundreds of meshes satisfying the request. In particular embodiments, scheduler 515 sets a node-based torus for a two or three dimensional request to maximize a Number of meshes satisfying the request.

To initialize variables for scheduling (or allocating one or more nodes 115 to) a one dimensional request, scheduler 515 sets a y axis and a z axis of switches 166 in grid 110 to a 2×2 configuration of nodes 115. Scheduler 515 maps job 150 so that a z axis of switches 166 in grid 110 is an unused dimension. Scheduler 515 then folds job 150 along the z axis into the y axis. Therefore, in particular embodiments, the following applies to a one dimensional request:

```
NumMapDimensions = 2
MapDimension[0] = 1
MapDimension[1] = 2
MapMod[0] = 2
MapMod[1] = 2
```

[n] indicate a one dimensional array having an index ranging from 0 to 1−n, where appropriate. As an example and not by way of limitation, a={4,6,2} corresponds to a[0]=4, a[1]=6, and a[2]=2, where appropriate.

In particular embodiments, scheduler 515 may also set a y axis and a z axis of switches 166 in grid 110 to a 2×2 configuration of nodes 115 to initialize variables for scheduling a two dimensional request. In particular embodiments, scheduler 515 folds a two dimensional requests into a third, unused dimension to generate a more compact shape for scheduling. Because many such folds may be possible, scheduler 515 may select a configuration (which may be different from a 2×2 configuration of nodes 115) that generates a greatest Number of such folds. Scheduler 515 may check each of six possible configurations for a two dimensional request and calculate a Number of possible folds for each of the six possible configurations. In particular embodiments, scheduler 515 selects a configuration allowing a greatest Number of possible folds. In particular embodiments, in the event of a tie between two 1×4 configurations, scheduler 515 first selects the 1×4 configuration modifying the z axis and then selects the 1×4 configuration modifying the y axis. In particular embodiments, in the event of a tie between a 1×4 configuration and a 2×2 configuration, scheduler 515 selects the 2×2 configuration. In particular embodiments, in the event of a tie between two or more 2×2 configurations, scheduler 515 first selects the 2×2 configuration modifying the y and z axes, then selects the 2×2 configuration modifying the x and z axes, and then selects the 2×2 configuration modifying the x and y axes. In particular embodiments, scheduler 515 initializes variables for scheduling a three dimensional request as scheduler 515 would initialize variables for scheduling a two dimensional request, except that a three dimensional request allows six orientations (or rotations) that are each unique with respect to each other instead of allowing folds.

In particular embodiments, to initialize variables for scheduling a compact request, scheduler 515 multiples a z axis of the compact request by four to generate a 1×4 configuration. Using a 1×4 configuration to process a compact request facilitates use of all nodes 115 coupled to a switch 166 allocated to the compact request, which in turn reduces fragmentation at switch points in grid 110. In particular embodiments, scheduler 515 similarly initializes variables for scheduling an any request.

A partition is a smallest mesh including all nodes 115 in grid 110 available for scheduling. PartStart[3] indicates a start coordinate of the partition, PartEnd[3] indicates an end coordinate of the partition, PartSize[3] indicates a size of the partition, and PartWraps[3] indicates whether the partition wraps. Scheduler 515 may construct a partition to reduce lengths of searches for nodes 115 satisfying a request. A partition may be much smaller than grid 110. For i=0, 1, and 2, PartStart[i] includes a minimum of all possible i coordinates in FreeMesh (which includes an array) and PartEnd[i] includes a maximum of all possible i coordinates in FreeMesh. PartSize[i]=PartEnd[i]−PartStart[i]+1. If PartSize [i] equals TorusSize[i], PartWraps[i] is True. Scheduler 515 sets NodeInUse (which includes an array) to NODE_NOT_IN_USE for all nodes in FreeMesh and set to NODE_IN_USE for all other nodes.

In particular embodiments, FreeY[i,j,k] contains a Number of free nodes 155 along line {i,j,k} to {i,TorusSize[1]−1, k}. FreeX[i,j,k] includes a Number of free nodes 115 along line {i,j,k} to {TorusSize[0]−1, j, k}. Scheduler 515 uses FreeY [i,j,k] and FreeX[i,j,k] to execute a scan algorithm, as described below. In particular embodiments, scheduler 515 constructs FreeY[i,j,k] and FreeX[i,j,k] only if SpatialAllowed or CompactAllowed is True.

If SpatialAllowed is True, scheduler 515 tries various structures for scheduling a request. A spatial job of size S={Sx, Sy, Sz} has up to six unique orientations: {Sx, Sy, Sz}, {Sx, Sz, Sy}, {Sy, Sx, Sz}, {Sy, Sz, Sx}, {Sz, Sx, Sy}, and {Sz, Sy, Sx}. The six orientations correspond to four unique 90° rotations and two unique 180° rotations that scheduler 515 may apply to a mesh. If any two dimensions are equal to each other, only three unique orientations are available. Scheduler 515 considers all possible orientations when scheduling a mesh. If a job 150 is two dimensional, i.e., one dimension of job 150 equals one, scheduler 515 may fold either of two used dimensions of job 150, i.e., dimensions of job 150 greater than one, into the unused dimension of job 150, i.e., the dimension of job 150 equal to one, in an accordion-like fashion to generate a more compact three dimensional mesh. If scheduler 515 folds a dimension that is not an integral multiple of a length of the fold, a last fold will be shorter than all preceding folds, which will result in a two dimensional mesh concatenated onto a three dimensional mesh. If job 150 is one dimensional, scheduler 515 may fold job 150 into either of two unused dimensions. Scheduler 515 may then fold either of two resulting dimensions into a remaining unused dimension. A resulting shape of the mesh would, generally speaking, be a concatenation of four meshes.

Figure 8:
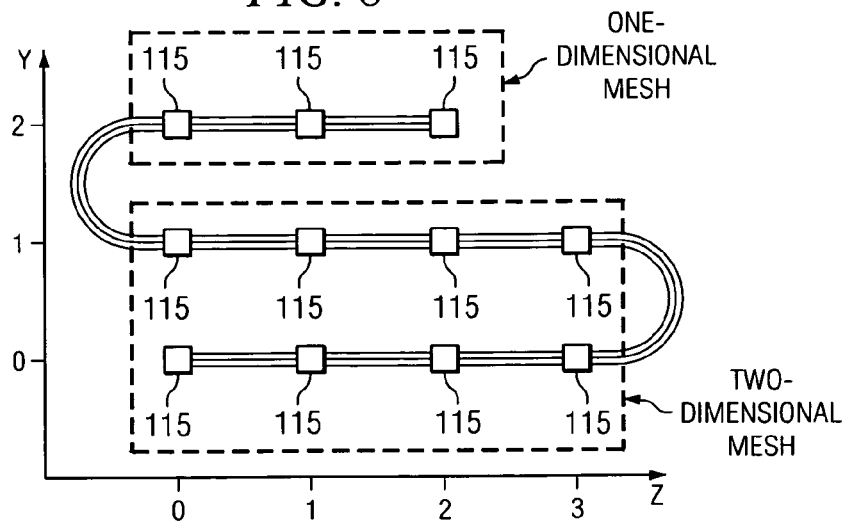
FIG. 8 illustrates an example one dimensional request folded into a y dimension.

FIG. 8 illustrates an example one dimensional request folded into a y dimension. In FIG. 8, scheduler 515 has folded the one dimensional request, {1,1,11}, into the y dimension using a fold length of four to generate a two dimensional mesh, {1,2,4}, and a one dimensional mesh {1,1,3}, concatenated onto the two dimensional mesh. Scheduler 515 may Number a first fold zero, a second fold one, and a third, short fold two. When scheduler 515 assigns an MPI Rank to nodes 115 along a fold, the MPI Rank is incremented as a z value increases along even-Numbered folds and as z values decrease along odd-Numbered folds. As an example and not by way of limitation, the MPI Rank for node 115 at [0,0] may be zero, the MPI Rank for node 115 at [0,1] may be one, the MPI Rank for node 115 at [0,2] may be two, and the MPI Rank for node 115 at [0,3] may be three. The MPI Rank for node 115 at [1,3] maybe four, the MPI Rank for node 115 at [1,2] may be five, and so on. Concatenation starts at z=0, since the fold has an even Number. If scheduler 515 folded the request using an odd Number of complete folds, concatenation would instead start at z=3 and continue inward toward x=0. In particular embodiments, scheduler 515 only considers accordion-like folds. Other types of folds exist. As an example and not by way of limitation, a fold may produce a staircase shape. Scheduler 515 may prohibit certain folds on one dimensional jobs 150. As described above, in particular embodiments, scheduler 515 folds one dimensional jobs 150 twice. A second fold either folds a dimension that scheduler 515 folded first or folds a dimension that scheduler 515 folded into first. In FIG. 8, scheduler 515 has folded a z dimension and folded into a y dimension. If a second fold folds a dimension that scheduler 515 folded first, scheduler 515 may generate up to three concatenations, for a total of four meshes. In particular embodiments, scheduler 515 allows no more than two concatenations. As a result, when scheduler 515 schedules a one dimensional job 150, a second fold is restricted to folding a dimension that scheduler 515 folded into first, unless the first fold did not result in concatenation. If a size of job 150 is an integral multiple of fold length, no concatenation results. In particular embodiments, such a restriction ensures that scheduler 515 allows no more than two concatenations. In particular embodiments, scheduler 515 initially constructs all possible meshes satisfying a request. If the request is one or two dimensional, scheduler 515 constructs each possible accordion-like fold and each possible orientation of each such fold. If the request is three dimensional, scheduler 515 constructs each possible orientation of the request. In particular embodiments, scheduler 515 records each such construction using a list of Try Structures, as described below.

If CompactAllowed is True, scheduler 515 constructs a compact mesh containing a requested Number of nodes 115. Scheduler 515 designates the mesh a best fit and stores the mesh in BestFit (which includes an array). As an example and not by way of limitation, let N be the requested Number of nodes 115 and Q be a cubic root of N truncated to an integer. Scheduler initially sets BestFit to $\{Q, Q, Q\}$. If $N=Q^3$, scheduler 515 is done. Otherwise, scheduler 515 will increment one or more dimensions of BestFit according to a BuildCompactFits function, as described below. Scheduler 515 then constructs all meshes having dimensions greater than or equal to dimensions of BestFit and less than or equal to dimensions of grid 110 and records the meshes using Fit (which includes an array).

Scheduler 515 then removes undesirable meshes from Fit. As described above, in particular embodiments, grid 110 is a three dimensional torus of switches 166 each coupled to four CPUs 164. Scheduler 515 modifies the torus by either a factor of four in one dimension or a factor of two in two dimensions to account for grid 110 including four CPUs 164 per switch 166. To increase a likelihood scheduler 515 will satisfy a request so that, when one CPU 164 at a switch 166 executes a process, all CPUs 164 at switch 166 execute processes, scheduler 515 keeps only meshes having sizes in the one or more modified dimensions that are integral multiples of the multiplication factor. As an example and not by way of limitation, if scheduler 515 multiplied a torus of switches 166 in a y dimension by two and in a z dimension by two, scheduler 515 would keep only meshes in Fit having even y and z dimensions.

Scheduler 515 then sorts remaining meshes in Fit according to maximum hop counts in the remaining meshes. A maximum distance between any two nodes in a mesh of size $\{Sx,Sy,Sz\}$ is $(Sx-1)+(Sy-1)+(Sz-1)$. If two meshes have maximum hop counts identical to each other, scheduler 515 puts the mesh closer to being a cube before the other mesh. As an example and not by way of limitation, $M_1=\{4,6,16\}$ and $M_2=\{8,9,9\}$ have the same maximum distance, but scheduler 515 puts $M_2$ before $M_1$.

Even if scheduler 515 did not remove undesirable meshes from Fit, scheduler 515 would not generate all meshes including at least N nodes 115. As an example and not by way of limitation, if N equaled twenty-seven and BestFit equaled $\{3,3,3\}$, Fit would not include mesh $\{1,1,27\}$. Mesh $\{1,1,27\}$ would not result in a reasonable Number of meshes and would always result in at least one mesh satisfying a request, since Fit would include a mesh equal to grid 110 and cluster management engine 130 calls scheduler 515 only if N is less than or equal to a Number of nodes 115 in grid 110.

Figure 9:
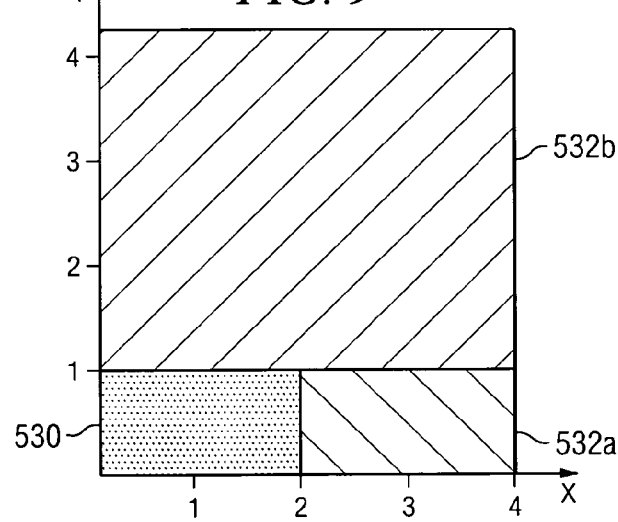
FIG. 9 illustrates two free meshes constructed using a y axis as an inner loop.
Figure 10:
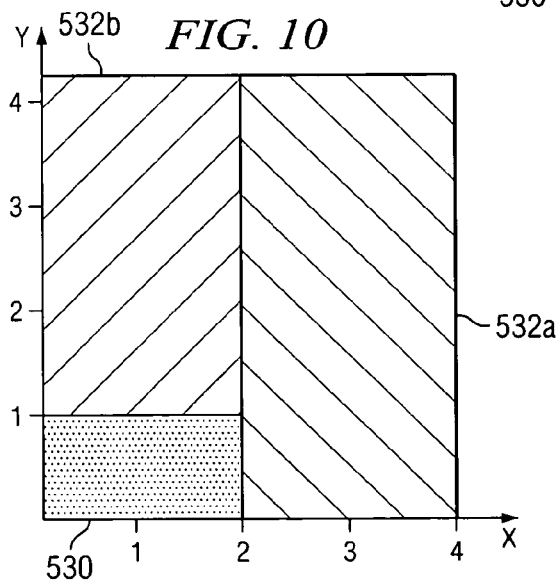
FIG. 10 illustrates two free meshes constructed using an x axis as an inner loop.

If AnyAllowed is true, to construct one or more free meshes, scheduler 515 loops through NodeInUse with an x axis as an outer loop, a y axis next, and a z axis as an inner loop until scheduler 515 identifies a free node 115. A free mesh includes a mesh including only free nodes 115, and a free node 115 includes a node 115 allocatable to a job 150. Scheduler 515 constructs NumFreeMeshes and FreeMesh[NumFreeMeshes]. NumFreeMeshes indicates a Number of free meshes in grid 110, and FreeMesh is a list identifying, for each free mesh in grid 110, one or more free meshes structures in grid 110. As an example and not by way of limitation, indices of node 115 may be $\{i1,j1,k1\}$. Scheduler 515 may increment a z axis until scheduler 515 identifies a nonfree node 115, such as, for example, $\{i1,j1,k2\}$. Scheduler 515 may set FreeMesh.start[2] to k1 and FreeMesh.end[2] to k2−1. FreeMesh.start[2] corresponds to a start value of a free mesh along the z axis, and FreeMesh.end[2] corresponds to an end value of the free mesh. Scheduler 515 may then increment a y axis, starting at j1, to identify a first value, j2, so that line, $\{i1, j2, k1\}$ through $\{i1, j1, k2-1\}$, includes at least one nonfree node. Scheduler 515 then sets FreeMesh.start[1] to j1 and FreeMesh.end[2] to j2−1. Scheduler 515 then increments an x axis, starting at i1, to identify a first value, i2, so that plane, $\{i2, j1, k1\}$ through $\{i2, j2-1, k2-1\}$, includes at least one nonfree node. Scheduler then sets FreeMesh.start[0] to i1 and FreeMesh.end[0] to i2−1. Scheduler 515 repeats the above process scheduler 515 covers all nodes 115 in grid 110. The above process does not result in a unique set of free meshes. Looping in a different order tends to generate a different set of free meshes, but only if two or more free meshes share a boundary with each other. A free mesh entirely surrounded by nodes 115 in is always unique. FIGS. 9 and 10 illustrate a difference between using a y axis as an inner loop and an x axis as an inner loop in a two dimensional case. FIG. 9 illustrates two free meshes constructed using a y axis as an inner loop, and FIG. 10 illustrates two free meshes constructed using an x axis as an inner loop. In FIG. 9, area 530 includes nodes 115 in use, area 532a is a first free mesh, and area 532b is a second free mesh. Similarly, in FIG. 10, area 530 includes nodes 115 in use, area 532a is a first free mesh, and area 532b is a second free mesh.

In particular embodiments, scheduler 515 uses a first scheduling algorithm to schedule spatial requests, a second scheduling algorithm to schedule compact requests, and a third scheduling algorithm to schedule any requests. The first and second scheduling algorithms are similar to each other, but use scan algorithms that are relatively different from each other. If scheduler 515 schedules a job 150, scheduler 515 lists nodes 150 allocated to job 150 in AssignedNodeList according to MPI Rank, i.e., AssignedNodeList[i] has MPI Rank i.

To schedule a spatial request having size $\{Sx,Sy,Sz\}$, scheduler 515 uses a scan algorithm to search for a start point in NodeInUse for the spatial request. The following example logic provides an example description of an example scan algorithm. PartStart is a start point and PartEnd is an end point of a partition and Tx, Ty, and Tz are torus sizes in x, y, and z dimensions, respectively.

```
For x = PartStart[0] to PartEnd[0]
    For y = PartStart[1] to PartEnd[1]
        For z = PartStart[2] to PartEnd[2]
            Hit = True
            For i = x to x+Sx-1
                For j = y to y+Sy-1
                    For k = z to z+Sz-1
                        If (NodeInUse[i mod Tx, j mod
                            Ty, k mod Tz) =
                                NODE_IN_USE
                            Hit = False
                        End If
                    End For
                End For
            End For
            If (Hit = True)
                Return True
            End If
        End For
    End For
End For
Return False
```

In particular embodiments, a scan algorithm applicable to a compact request replaces the above Hit flag with a Count value incremented in an innermost loop as follows:

```
Count = 0
For i = x to x+Sx-1
    For j = y to y+Sy-1
        For k = z to z+Sz-1
            If (NodeInUse[i mod Tx,j mod Ty, k mod Tz) =
                NODE_NOT_IN_USE
                Count = Count + 1
            End If
        End For
    End For
End For
If (Count ≧ RequestedNodes)
    Return True
End If
```

The above logic is relatively inefficient, since scheduler 515 evaluates each point in NodeInUse up to Sx×Sy×Sz times. In the above scan of a compact request, as a z loop increments from, say, z1 to z1+1, i and j inner loops do not change and a k loop changes only at end points. As a result, a two dimensional mesh from {x,y,z1} to {x+Sx, y+Sy−1, z1} is excluded from further calculations and scheduler 515 adds a two dimensional mesh from {x, y, (z1+1)+Sz−1} to {x+Sx−1, y+Sy=1, (z1+1)+Sz−1} to further calculations. i, j, and k inner loops count free nodes 115 in a sequence of two dimensional meshes along a z axis of size {Sx, Sy,1}. A z loop removes one mesh and adds another. At a y loop, a similar effect occurs along a y axis. FreeX and FreeY (which both include arrays) facilitate reducing processing time. In particular embodiments, scheduler 515 uses the following algorithm to scan a compact request:

```
Define an array, zPlane[TorusSize[2]], to store two dimensional
mesh counts.
Compute an end point of x, y, and z loops as follows:
    For i = 0 to 2
        If PartWraps[i] = True, end[i] = PartEnd[i]
        Else end[i] = PartEnd[i] - Size[i]
    Now x will loop from PartStart[0] to End[0] and so on.
x loop
    For each z = PartStart[2] to PartEnd[2], re-compute zPlane for
meshes
    {x,PartStart[1],z} to {x+Sx−1,PartStart[1]+Sy−1,z}
        In particular embodiments, scheduler 515 would use three loop
        here. FreeY used here reduces a Number of loops to two: one
        loop for x and one lop for z. FreeY[x,PartStart[1],z] −
        FreeY[x,PartStart[1]+Sy,2] provides a Number of free nodes 115
        along line {x,PartStart[1],z} to {x,PartStart[1]+Sy−1,z}
        inclusively.
    Set NewX = True for the below y loop.
y loop
    If NewX = True
        Do nothing.
    Else
        Update zPlane
        For each z = PartStart[2] to PartEnd[2],
            Subtract free nodes 115 in line segment from {x,y−1,z} to
            {x+Sx−1,y−1,z} from Zplane[z]
                Use FreeX[x,y−1,z] − FreeX[x+Sx,y−1,z] to avoid
                looping over x
            Add free nodes 115 in line segment from {x,y+Sy−1,z} to
            {x+Sx−1,y+Sy−1,z} to zPlane[z]
                Use FreeX[x,y+Sy−1,z] − FreeX[x+Sx,y+Sy−1,z] to
                avoid looping over x
    Set NewX = False for a next y increment
    Set NewY = True for the below z loop
z loop
    If NewY = True
        Sum zPlane from z = PartStart[2] to z = PartEnd[2] and record
        results in Count
    Else
        Subtract zPlane[z−1] from Count
        Compute zPlane[z+Sz−1], which is a sum of free nodes 115
        in a two dimensional mesh from {x,y,z+Sz−1} to
        {x+sX−1,y+Sy−1,z+Sz−1}. As described above, use FreeX to
        reduce a Number of loops from two to one.
        Add zPlane[z+Sz−1] to Count
    If Count ≧ RequestedNodes, Return True
```

In particular embodiments, scheduler 515 applies one or more of the following modifications to address a partition wrapping in a dimension: (1) if indices in the dimension exceed array bounds, scheduler 515 applies a modulus function to the indices before any array reference; and (2) if the partition wraps in an x dimension or a y dimension, to compute free nodes 115 for a line segment, e.g., from point a to point b, scheduler 515 computes free nodes 115 for two line segments, one from point a to an end of the partition in the x or y dimension and another from a beginning of the partition to point b.

In particular embodiments, a scan algorithm applicable to a spatial request is similar to the above scan algorithm applicable to a compact request. In particular embodiments, differences between a scan algorithm applicable to a spatial request and the above scan algorithm applicable to a compact request include the following: (1) instead of scheduler 515 identifying a point in a mesh having a particular Count, scheduler 515 looks for a point in the mesh at which all nodes 115 are free, which tends to reduce a memory references; and (2) scheduler 515 may need to handle one or more concatenated meshes, since, as described above, scheduler 515 may be dealing with a one dimensional request or a two dimensional request folded to produce a base mesh having up to two additional meshes concatenated onto the base mesh. In particular embodiments, such modifications to the scan algorithm tend to reduce a maximum run time associated with scheduler 515 scheduling a 16×16×16 configuration by one or more orders of magnitude.

To schedule a spatial request, scheduler 515 uses a scheduling algorithm that applies a scan algorithm to each Try structure in a list of Try structures until scheduler 515 identifies a Try Structure that is schedulable. If no Try structures in the list are schedulable and an aggressive flag on the spatial request is zero, scheduler 515 returns to cluster management engine 130 without scheduling the spatial request. Otherwise, scheduler 515 uses a compact scheduling algorithm to try to schedule the spatial request.

In particular embodiments, scheduling a request according to a spatial algorithm involves up to three transformations: two folds and one rotation. Scheduler 515 keeps track of the transformations using the following fields in Try:

Try.rMap is a mapping function for rotation. Try.rMap is an array having three elements that maps indices of a point. As an example and not by way of limitation, Try.rMap={1, 0, 2} means index 0 gets mapped to 1, index 1 gets mapped to 0 and index 2 gets mapped to 2 so that, under the map, {x, y, z}→{y, x, z}.

Try.irMap is an inverse of Try.rMap.

Try.NumFoldMaps indicates a Number of folds producing a Try Structure.

Try.foldLength is an array indicating lengths of folds.

Try.foldFrom is an array indicating an index of a folded dimension. As an example and not by way of limitation, Try.foldFrom[i]=2 indicates that an i fold folded a z axis.

Try.foldTo is an array indicating an index of a dimension folded into.

Try.foldFix is an array indicating an index of a dimension that remained fixed.

In particular embodiments, after scheduler 515 determines that a job 150 is schedulable at a starting point in grid 110 using a Try structure, scheduler 515 assigns MPI Ranks as follows:

Scheduler 515 applies an inverse rotation map to the starting point to map the starting point to a pretransformed mesh. Scheduler 515 constructs folds to leave the starting point of the mesh fixed so that scheduler 515 need not apply an inverse fold.

Scheduler 515 loops through the pretransformed mesh in to generate MPI Rank. As described above, in particular embodiments, an x axis is an outer loop, a y axis is a middle loop, and a z axis is an inner loop.

Scheduler 515 applies the transformations applied to the pretransformed mesh to each point {x, y, z} in the loop according to an order scheduler 515 applied the transformations to the pretransformed mesh, i.e., scheduler 515 folds 0, then folds 1, and then rotates the point to get a point, {x', y', z'}, in the pretransformed mesh. Scheduler 515 then inserts the node, {x', y', z'}, into an end of AssignedNodeList.

In particular embodiments, a compact scheduling algorithm applies a scan algorithm to each mesh in a list of Try structures until the compact scheduling algorithm identifies a Try structure that works. A Number of meshes in the list may be relatively large. As an example and not by way of limitation, for a torus including 16×16×16 nodes 115 and a request for one hundred nodes 115, BestFit={4,4,5}, which results in over two thousand meshes in a Try structures list. Although applying a binary search to the Try structures list may be desirable, a binary search of the Try structures list would not work in particular embodiments. A binary search including condition C would not work unless, (1) if C were true for element i, C were true for all j greater than or equal to i and, (2) if C were false for element i, C were false for all j less than or equal to i. In particular embodiments, a binary search of a Try structures list would not work, since a possibility exists that a scan using, for example, mesh M1 ={4,4,4} would find enough nodes to satisfy a request, while a scan using, for example, mesh M2={2,2,10} would not, despite M2 being above M1 in the Try structures list. In particular embodiments, a binary search of maximum distances works. If scheduler 515 groups meshes in a Try structures list according to maximum distance, then, if scheduler 515 identifies a fit for a mesh in the list having a maximum distance i, for all j greater than or equal to i, at least one mesh in the list having a maximum distance j will also fit. If no mesh in the list having a maximum distance i fits, no mesh in the list having a maximum distance less than or equal to i will fit either. As an example and not by way of limitation, suppose {x,y,z} is a mesh having a maximum distance i that fits. Therefore, {x, y, z+1} has a maximum distance i+1 and, since {x, y, z+1} covers {x, y, z}, {x, y, z+1} also works. Induction applies to all j greater than or equal to i. If no mesh in the list having a maximum distance i works, with respect to any mesh {x, y, z} having a maximum distance i−1, {x, y, z+1} has a maximum distance i and also does not fit. Neither does {x,y,z} since {x,y,z+1} covers {x,y,z}. Accordingly, Scheduler 515 constructs MaxDistance[NumMaxDistances,2] during initialization.

In particular embodiments, a binary search of meshes in Fit does not guarantee a best fit, but provides a reasonably good upper bound on a best fit. In particular embodiments, a binary search of meshes in Fit is efficient, e.g., generating approximately ten scans for approximately one thousand meshes. Scheduler 515 may use an upper bound to run a binary search on maximum lengths or run a linear search downward from the upper bound. In particular embodiments, a linear search downward tends to be more efficient.

Scheduler 515 runs a binary search on Fit and returns HighFit and HighStart[3]. HighFit is an index of Fit satisfying a request, and HighStart is a starting point of a fit in grid 110. An algorithm for running a linear search downward begins with HighFit and HighStart. In particular embodiments, scheduler 515 decrements a maximum distance of a current HighFit mesh. Scheduler 515 then loops through all meshes including the maximum distance until scheduler 515 identifies a mesh satisfying the request. If scheduler 515 identifies a mesh satisfying the request, scheduler 515 sets the mesh to HighFit, decremented the maximum distance again, and repeats the process. If scheduler 515 identifies no such meshes, the algorithm exits and a current HighFit is a best fit. If scheduler 515 cannot identify a fit for a particular maximum distance, then scheduler 515 cannot identify a fit for a shorter maximum distance.

Scheduler 515 loops through a Fit mesh and inserts one or more nodes 115 into an end of AssignedNodeList. An order of the three loops depends on how scheduler 515 mapped a switch-based torus to a node-based torus. If scheduler mapped the switch-based torus using a 4×1 configuration in one dimension, the one dimension is an inner loop. If scheduler 515 mapped the switch-based torus using a 2×2 configuration in two dimensions, the two dimensions are innermost loops.

To schedule an any request, scheduler 515 loops through FreeMesh and fills the any request until scheduler 515 has assigned a requested Number of nodes 115 to the any request Scheduler 515 inserts nodes 115 into AssignedNodeList incrementally as scheduler 515 loops through FreeMesh. In particular embodiments, scheduler 515 loops through FreeMesh as follows:

A z axis is an innermost loop. Scheduler 515 expanded the z axis by a factor of four when scheduler 515 converted a switch-based torus to a node-based torus. Using the z axis as an innermost loop tends to avoid fragmentation of CPUs 164 coupled to a switch 116.

A smaller one of two remaining dimensions in FreeMesh is a middle loop, and a larger one of the two remaining dimensions is an outermost loop.

Scheduler 515 lists selected nodes 115 using node-based coordinates in AssignedNodeList according to MPI Rank. AssignedNodeList[i,0] is a x coordinate of a node 115 of MPI Rank i, AssignedNodeList[i,1] is a y coordinate of node 115 of MPI Rank i, and AssignedNodeList[i,2] is a z coordinate of node 115 of MPI Rank i. FreeNodeList is a list of available nodes 115 passed to scheduler 515 in switch-based coordinates. In particular embodiments, to set an mpiRank field in FreeNodeList, scheduler 515 uses the following example algorithm:

For i=0 to NumFreeNodes−1
        Convert AssignedNodeList[i] to switch-based coordinates and add them to To[4]
        Apply InverseTorusMap to first three elements of To
        For j=0 to NuniFreeNodes−1
            If To[k] =FreeNodeList[j].coordinate[k] for all k=0,1,2,3
            FreeNodeList[j].mpiRank=i
            Exit j loop The following example logic describes particular embodiments of scheduler 515. In particular embodiments, when cluster management engine 130 calls scheduler 515 to schedule a job 150, cluster management engine 130 communicates values for the following input parameters to scheduler 515:

RequestedNodes: Indicates a Number of nodes 115 requested.
RequestType: Indicates a request type. Set to SPATIAL, COMPACT, or ANY.
RequestSize: An array having three elements indicating a request size. Valid only for SPATIAL requests.
AggressiveFlag: A floating-point number between zero and one indicating a degree of leeway allotted to scheduler 515 for purposes of allocating nodes 115 to job 150.
TorusSize: An array having three elements indicating a switch-based size of grid 110.
NodesPerSwitch: A Number of CPUs 164 coupled to each switch 166 in grid 110.
NumFreeNodes: A Number of nodes 115 in FreeNodeList.
FreeNodeList: A list of FreeNode structures indicating switch-based coordinates of nodes 115 available for scheduling.

In particular embodiments, scheduler 515 returns one of the following after scheduler 515 attempts to schedule a job 150:

| | |
|---|---|
| PQS_ASSIGNED: | Indicates scheduler 515 has scheduled job 150. |
| PQS_NO_ASSIGNMENT_AT_SPECIFIED_TIME: | Indicates scheduler 515 has not schedule job 150. |
| PQS_NO_ASSIGNMENT_FOR_JOB_CATEGORY: | Indicates scheduler 515 can never schedule job 150, even if all nodes 115 in grid 110 are available. |

If scheduler 515 schedules job 150, scheduler 515 sets mpiRank fields of FreeNode structures accordingly. In particular embodiments, a wrapper function between cluster management engine 130 and scheduler 515 converts input from cluster management engine 130 to a format that scheduler 515 expects and converts output from scheduler 515 to a format that cluster management engine 130 expects.

In particular embodiments, setSchedulable, which determines whether a job 150 is theoretically schedulable, encompasses the following example logic:

```
If setSchedulable( ) = False
    Return PQS_NO_ASSIGNMENT_FOR_JOB_CATEGORY
End If
If initScheduler( ) = False
    Return PQS_NO_ASSIGNMENT_AT_SPECIFIED_TIME
End If
If RequestedNodes > NumFreeNodes
    ret = False
Else
    ret = scheduleJob( )
End If
If ret = True
    setMpiRank( )
    Return PQS_ASSIGNED
Else
    Return PQS_NO_ASSIGNMENT_AT_SPECIFIED_TIME
End If
```

In particular embodiments, Rank, which scheduler 515 calls to rank job sizes, encompasses the following example logic. Input to Rank includes a one dimensional array, In[3], having three elements. Output from Rank includes a one dimensional array, Rank[3], having three elements indicating, in increasing size, indices of In. In[Rank[0]]≦In[Rank[1]]≦In[Rank[2]]. In particular embodiments, Rank includes a bubble algorithm.

```
Rank[0] = 0
Rank[1] = 1
Rank[2] = 2
For i = 0 to 2
    For j = i+1 to 2
        If In[Rank[j] < In[Rank[i]]
            k = Rank[j]
            Rank[j] = Rank[i]
            Rank[i] = k
        End If
    End For
End For
```

In particular embodiments, setSchedulable, which determines whether a job 150 is theoretically schedulable, encompasses the following example logic:

```
For i = 0 to 2
    If TorusSize[i] ≦ 1
        Return False
End For
If RequestedNodes > TorusSize[0] × TorusSize[1] × TorusSize[2] ×
                    NodesPerSwitch
    Return False
End If
If NodesPerSwitch not equal to four
    Return False;
End If
If RequestType = SPATIAL
    factor[0] = 2
    factor[1] = 2
    Rank(TorusSize, tRank)
    Rank(RequestedSize, jRank)
    NumJobDim = 0
```

```
NumExceed = 0
For i = 0 to 2
    If RequestedSize[i] > 1)
        NumJobDim = NumJobDim + 1
    Else If RequestedSize[i] < 1
        Return False
    End If
    If RequestedSize[jRank[i]] > TorusSize[tRank[i]]
        Exceed[NumExceed] = i
        NumExceed = NumExceed + 1
    End If
End For
If NumExceed = 0
    Return True
Else If NumExceed = 1
    If RequestedSize[jRank[Exceed[0]] ≦ NodesPerSwitch ×
            TorusSize[tRank[Exceed[0]]
        Return True
    End If
    If NumJobDim < 3
        Return True
    End If
    Return False
Else
    If RequestedSize[jRank[Exceed[0]] ≦ factor[0] ×
            TorusSize[tRank[Exceed[0] and
            RequestedSize[jRank[Exceed[1]] ≦ factor[1] ×
            TorusSize[tRank[Exceed[1]]
        Return True
    End If
    If NumJobDim < 3 and (RequestedSize[jRank[Exceed[0]] ≦
            NodesPerSwitch × TorusSize[tRank[Exceed[0]] or
            RequestedSize[jRank[Exceed[1]] ≦ NodesPerSwitch ×
            TorusSize[tRank[Exceed[1]])
        Return True
    End If
    return False
End If
return True
```

In particular embodiments, initScheduler, which sets allowed scheduling types., encompasses the following example logic. If a job 150 requests only one node 115, initScheduler sets an allowed type to Any, regardless of an original request:

```
If RequestedNodes = 1 or RequestType = Any
    AnyAllowed = True
    SpatialAllowed = False
    CompactAllowed = False
Else If RequestType = Compact
    CompactAllowed = True
    AnyAllowed = False
    SpatialAllowed = False
Else If RequestType = Spatial
    SpatialAllowed = True
    AnyAllowed = False
    If AggressiveFlag > 0
        CompactAllowed = True
    Else
        Compact Allowed = False
    End If
End If
factor[0] = 2
factor[1] = 2
Rank(TorusSize, tRank)
TorusMap[0] = tRank[2]
TorusMap[1] = tRank[1]
TorusMap[2] = tRank[0]
InverseTorusMap[tRank[0]] = 2
InverseTorusMap[tRank[1]] = 1
InverseTorusMap[tRank[2]] = 0
If SpatialAllowed = True
    If setTorusForSpatial( ) = False
        Return False
    End If
Else If CompactAllowed = True
    If setTorusForCompact1( ) = False
        Return False
    End If
Else
    If setTorusForAny( ) = False
        Return False
    End If
End If
For i = 0 to NumMapDimensions
    TorusSize[mapDiminsions[i]] = mapMod[i] ×
        TorusSize[mapDiminsions[i]]
End For
SetPartition( )
If SpatialAllowed = True
    buildSpatialTries( )
End If
If compactAllowed = True
    buildCompactFits( )
End If
If AnyAllowed = True
    buildFreeMeshes( )
End If
If SpatialAllowed = True or CompactAllowed = True
    InitScan( )
End If
return True
```

In particular embodiments, setTorusForSpatial, which maps a switch-based torus to a node-based torus for a spatial request, encompasses the following example logic:

```
Rank(RequestedSize, jRank)
NumDim = 0
dNdx = 0
For i = 0 to 2
    If RequestedSize[i] > 1)
        twoD[NumDim] = i
        NumDim = NumDim + 1
    Else
        oneD[dNdx] = i
        dNdx = dNdx + 1
    End If
End For
If NumDim = 1
    Return setTorusFor1D( )
Else If NumDim = 2
    Return setTorusFor2D( )
Else
    Return setTorusFor3D( )
End If
```

In particular embodiments, setTorusFor1D, which multiplies grid 110 by two factors in two largest dimensions of job 150, jRank[2] and jRank[1], encompasses the following example logic:

```
NumMapDiminsions = 2
mapDiminsions[0] = jRank[2]
mapDiminsions[1] = jRank[1]
mapMod[0] = factor[0]
mapMod[1] = factor[0]
For i = 0 to 3
    ntSize[i] = TorusSize[TorusMap[i]]
End For
For i = 0 to 3
    TorusSize[i] = ntSize[i]
End For
```

-continued

```
        For i = 0 to 3
            RequestedSize[i] = OriginalSize[jRank[i]]
            JobMap[jRank[i]] = i
        End For
        Return True
```

In particular embodiments, setTorusFor2D maps a switch-based torus to a node-based torus in one of six ways:

```
1. {T[0], T[1], T[2]} → {T[0], 2 × T[1], 2 × T[2]}
2. {T[0], T[1], T[2]} → {2 × T[0], T[1], 2 × T[2]}
3. {T[0], T[1], T[2]} → {2 × T[0], 2 × T[1], T[2]}
4. {T[0], T[1], T[2]} → {T[0], T[1], 4 × T[2]}
5. {T[0], T[1], T[2]} → {T[0], 4 × T[1], T[2]}
6. {T[0], T[1], T[2]} → {4 × T[0], T[1], T[2]}
```

T is TorusSize. The first three configurations result from scheduler 515 configuring nodes 115 per switch 166 as 2×2 nodes 115. The last three configurations result from scheduler 515 configuring nodes 115 per switch 166 as 1×1 nodes 115. In particular embodiments, setTorusFor2D counts Try structures that scheduler 515 would generate for each map and selects a map that would generate a greatest number of Try structures. In the event of a tie, setTorusFor2D selects a map according to the above order. Scheduler 515 constructs pSize[6,4] to include:

pSizes[i, 0]=size of the partition in the x dimension for configuration i.

pSizes[i, 1]=size of the partition in they dimension for configuration i.

pSizes[i, 2]=size of the partition in the z dimension for configuration i.

pSizes[i, 3]=the Number of tries that would be generated for configuration i.

In particular embodiments, setTorusFor2D encompasses the following example logic:

```
max = -1
maxNdx = -1
For i = 0 to 2
    For j = i+1 to 3
        NumMapDiminsions = 2
        mapDiminsions[0] = (i+j) mod 3
        mapDiminsions[1] = (i+j+1) mod 3
        mapMod[0] = factor[0]
        mapMod[1] = factor[1]
        setTestPartSize(testPartSize).
        pSizes[i + j -1, 2] = testPartSize[2]
        pSizes[i + j -1, 1] = testPartSize[1]
        pSizes[i + j -1, 0] = testPartSize[0]
        pSizes[i + j -1][3] = cnt2DTries(testPartSize, RequestedSize)
            max = pSizes[i + j - 1][3]
            maxNdx = i + j - 1
        End If
    End For
End For
For i = 0 to 3
    NumMapDiminsions = 1
    mapDiminsions[0] = 2 - i
    mapMod[0] = NodesperGrid
    setTestPartSize(testPartSize)
    pSizes[i+3, 2] = testspSize[2]
    pSizes[i+3, 1] = testspSize[1]
    pSizes[i+3, 0] = testspSize[0]
    pSizes[i+3][3] = cnt2DTries(testPartSize, RequestedSize)
    if pSizes[i+3][3] > max
        max = pSizes[i+3][3]
        maxNdx = i+3
    End If
End For
If max ≤ 0
    if CompactAllowed = True
        SpatialAllowed = False
        Return setTorusForCompact( )
    Else
        return False
    End If
Else
    For i = 0 to 2
        ntSize[i] = TorusSize[TorusMap[i]]
    End For
    For i = 0 to 2
        TorusSize[i] = ntSize[i]
    End For
    If maxNdx < 3
        NumMapDimensions = 2
        mapDiminsions[0] = (maxNdx+1) mod 3
        mapDiminsions[1] = (maxNdx+2) mod 3
        mapMod[0] = factor[0]
        mapMod[1] = factor[1]
        RequestedSize[mapDiminsions[0]] = OriginalSize[jRank[1]]
        RequestedSize[mapDiminsions[1]] = OriginalSize[jRank[2]]
        RequestedSize[3 - mapDiminsions[0] - mapDiminsions[1]] =
                                OriginalSize[jRank[0]]
        JobMap[jRank[1]] = mapDiminsions[0]
        JobMap[jRank[2]] = mapDiminsions[1]
        JobMap[jRank[0]] = 3- mapDiminsions[0]- mapDiminsions[1]
    Else
        NumMod = 1
        NumMapDimensions = 1
        mapDiminsions[0] = (5 - maxNdx) mod 3
        mapMod[0] = NodesperGrid
        If mapDiminsions[0] = 2
            i = 1
        Else
            i = 2
        End If
        RequestedSize[mapDiminsions[0]] = OriginalSize[jRank[2]]
        RequestedSize[i] = OriginalSize[jRank[1]]
        RequestedSize[3 - mapDiminsions[0] - i] =
        OriginalSize[jRank[0]]
        JobMap[jRank[2]] = mapDiminsions[0]
        JobMap[jRank[1]] = i
        JobMap[jRank[0]] = 3 - mapDiminsions[0] - i
    End If
End If
Return True
```

In particular embodiments, setTorusFor3D encompasses the following example logic:

```
max = -1
maxNdx = -1
For i = 0 to 2
    For j = i+1 to 2
        NumMapDiminsions = 2
        mapDiminsions[0] = (i+j) mod 3
        mapDiminsions[1] = (i+j+1) mod 3
        mapMod[0] = factor[0]
        mapMod[1] = factor[1]
        setTestPartSize(testPartSize)
        pSizes[i + j - 1, 2] = testPartSize[2]
        pSizes[i + j - 1, 1] = testPartSize[1]
        pSizes[i + j - 1, 0] = testPartSize[0]
        pSizes[i + j - 1, 3] = cnt2DTries(testPartSize, RequestedSize)
        If (pSizes[i + j - 1,3] > max)
            max = pSizes[i + j - 1, 3]
            maxNdx = i + j - 1
        End If
    End For
End For
```

-continued

```
For i = 0 to 2
    NumMapDiminsions = 1
    mapDiminsions[0] = 2 - i
    mapMod[0] = NodesperGrid;
    setTestPartSize(testPartSize)
    pSizes[i+3, 2] = testPartSize[2]
    pSizes[i+3, 1] = testPartSize[1]
    pSizes[i+3, 0] = testPartSize[0]
    pSizes[i+3], 3] = cnt2DTries(testPartSize, RequestedSize
    If pSizes[i+3][3] > max
        max = pSizes[i+3, 3]
        maxNdx = i+3
    End If
End For
If max ≦ 0
    If CompactAllowed = True
        SpatialAllowed = False
        Return setTorusForCompact( )
    Else
        return False
    End If
Else
    For i = 0 to 2
        ntSize[i] = TorusSize[TorusMap[i]]
    End For
    For i = 0 to 2
        TorusSize[i] = ntSize[i]
    End For
    If maxNdx < 3
        NumMod = 2
        mod[0] = (maxNdx+1)mod 3
        mod[1] = (maxNdx+2) mod 3
        NumMapDiminsions = 2
        mapDiminsions[0] = (maxNdx+1) mod 3
        mapDiminsions[1] = (maxNdx+2) mod 3
        mapMod[0] = factor[0]
        mapMod[1] = factor[1]
        RequestedSize[mapDiminsions[0]] = OriginalSize[jRank[1]]
        RequestedSize[mapDiminsions[1]] = OriginalSize[jRank[2]]
        RequestedSize[3 - mapDiminsions[0] - mapDiminsions[1]] =
                    OriginalSize[jRank[0]]
        JobMap[jRank[1]] = mapDiminsions[0]
        JobMap[jRank[2]] = mapDiminsions[1]
        JobMap[jRank[0]] = 3 - mapDiminsions[0] -
            mapDiminsions[1]
    Else
        NumMod = 1
        mod[0] = 2 - (maxNdx - 3)
        NumMapDiminsions = 1
        mapDiminsions[0] = (5 - maxNdx) mod 3
        mapMod[0] = NodesperGrid
        If mapDiminsions[0] = 2
            i = 1
        Else
            i = 2
        End If
        RequestedSize[mapDiminsions[0]] = OriginalSize[jRank[2]]
        RequestedSize[i] = OriginalSize[jRank[1]]
        requestedSize[3 - mapDiminsions[0] - i] =
            originalSize[jRank[0]];
        JobMap[jRank[2]] = mapDiminsions[0]
        JobMap[jRank[1]] = i
        JobMap[jRank[0]] = 3 - mapDiminsions[0] - i
    End If
End If
Return True
```

In particular embodiments, setTorusForCompact, which sets a z dimension of a compact request to a 4×1 configuration, encompasses the following example logic:

```
For i = 0 to 3
    ntSize[i] = TorusSize[tMap[i]]
End For
For i = 0 to 3
    TorusSize[i] = ntSize[i]
End For
NumMapDiminsions = 1
mapDiminsions[0] = 2
mapMod[0] = NodesperGrid
Return True
```

In particular embodiments, setTorusForAny, which sets a z dimension of an any request to a 4×1 configuration, encompasses the following example logic:

```
For i = 0 to 3
    ntSize[i] = TorusSize[tMap[i]]
End For
For i = 0 to 3
    TorusSize[i] = ntSize[i]
End For
NumMapDiminsions = 1
mapDiminsions[0] = 2
mapMod[0] = NodesperGrid
Return True
```

In particular embodiments, setPartition encompasses the following example logic:

```
For i = 0 to TorusSize[0] - 1
    For j = 0 to TorusSize[1] - 1
        For k = 0 to TorusSize[2] - 1
            NodeInUse[i,j,k] = NODE_IN_USE
        End For
    End For
End For
For i = 0 to 2
    PartStart[i] = TorusSize[i]
    PartEnd[i] = 0
End For
For i = 0 to NumFreeNodes - 1
    To[0] = FreeNodes[i].coordinate[TorusMap[0]]
    To[1] = FreeNodes[i].coordinate[TorusMap[1]]
    To[2] = FreeNodes[i].coordinate[TorusMap[2]]
    If NumMapDimensions = 1
        To[MapDimension[0]] = To[MapDimension[0]] ×
                    MapMod[0] + FreeNodes[i].coordinate[3]
    Else
        To[MapDimension[0]] = To[MapDimension[0]] ×
                    MapMod[0] + FreeNodes[i].coordinate[3] /
                    MapMod[1]
        To[MapDimension[1]] = To[MapDimension[1]] ×
                    MapMod[1] + FreeNodes[i].coordinate[3]
                    mod MapMod[1]
    End If
    NodeInUse[To[0]], To[1], To[2]] = NODE_NOT_IN_USE
    For j = 0 to 2
        If To[j] < PartStart[j]
            PartStart]j] = To[j]
        End If
        If To[j] < PartStart[j]
            PartStart]j] = To[j]
        End If
    End For
End For
For i = 0 to 2
    If PartStart[i] = 0 and PartEnd[i] = TorusSize[i] - 1
        PartWraps[i] = True
    Else
        PartWraps[i] = False
    End If
    PartSize[i] = PartEnd[i] - PartStart[i] + 1
End For
```

In particular embodiments, initScan, which constructs FreeY and FreeX, encompasses the following example logic:

```
For i = 0 to TorusSize[0] - 1
    For k = 0 to TorusSize[2] - 1
        Count = 0
        For j = TorusSize[1] - 1 to 0 by -1
            If NodeInUse[i,j,k] = NODE_NOT_IN_USE
                Count = Count + 1
            End If
            FreeY[i,j,k] = Count
        End For
    End For
End For
For j = 0 to TorusSize[1] - 1
    For k = 0 to TorusStSize[2] - 1
        Count = 0
        For i = TorusSize[0] - 1 to 0 by -1
            If NodeInUse[i,j,k] = NODE_NOT_IN_USE
                Count = Count + 1
            End If
            FreeX[i,j,k] = Count
        End For
    End For
End For
```

In particular embodiments, buildSpatialTries, which determines a Number of dimensions in a request, encompasses the following example logic:

```
NumDim = 0
For i = 0 to 2
    If RequestedSize[i] > 1)
        NumDim = NumDim + 1
    End If
End For
If NumDim = 1
    build1DTry( )
Else If NumDim = 2
    build2DTry( )
Else
    for i = 0 to 2
        Try.baseSize[i] RequestedSize[i]
    End For
    Try.NumConcats = 0
    Try.NumFoldMaps = 0
```

```
        NumberOfTries = 0
        build3Dtry(Try, NumberOfTries)
    End If
```

In particular embodiments, build3Dtry, which builds TryList for a three dimensional request and builds Try structures for each fold in a one dimensional request or a two dimensional request, encompasses the following example logic:

```
setOrient(Try, NumOrient, orient)
if NumOrient > 0
    For (i = 0 to NumOrient - 1
        ++NumTries;
        For j = 0 to 2
            TryList[NumberOfTries].baseSize[j] =
                Try.baseSize[orient[i, j]]
        End For
        TryList[NumberOfTries].NumConcats = Try.NumConcats;
        For j = 0 to TryList[NumberOfTries].NumConcats - 1
            For k = 0 to 2
                TryList[NumberOfTries.concatSize[j, k] =
                                Try.concatSize[j,orient[i, k]];
                TryList[NumberOfTries].concatStartNode[j, k] =
                                Try.concatStartNode[j, orient[i, k]];
            End For
        End For
        TryList[NumberOfTries].NumFoldMaps = Try.NumFoldMaps;
        For j = 0 to TryList[NumberOfTries].NumFoldMaps
            TryList[NumberOfTries].foldLength[j] = Try.foldLength[j]
            TryList[NumberOfTries].foldFrom[j] = Try.foldFrom[j]
            TryList[NumberOfTries].foldTo[j] = Try.foldTo[j]
            TryList[NumberOfTries].foldFix[j] = Try.foldFix[j]
        End For
        For k = 0 to 2
            TryList[NumberOfTries].rMap[k] = orient[i, k]
            TryList[NumberOfTries].irMap[orient[i, k]] = ;
        End For
        NumberOfTries = NumberOfTries + 1
```

In particular embodiments, setOrient, which calculates a Number of unique rotations, NumOrient, for a Try structure and an indices map for each rotation, encompasses the following example logic:

```
NumOrient = 0;
If try.NumberOfConcatanations > 0
    For i = 0 to 2
        size[i] = try.baseSize[i];
        For j = 0 to try.NumConcats - 1
            If try.concatStartNode[j, i] ≧ size[i]
                size[i] = Try.concatStartNode[j, i] + Try.concatSize[j, i];
            Else If Try.concatStartNode[j, i] < 0
                size[i] = size[i] - try.concatStartNode[j, i]
            End If
        End For
    End For
    If size[0] ≦ PartSize[0] and size[1] ≦ PartSize[1] andsize[2] ≦ PartSize[2]
        orient[NumOrient, 0] = 0
        orient[NumOrient, 1] = 1
        orient[NumOrient, 1] = 2
        NumOrient = NumOrient + 1
    End If
    If size[0] ≦ PartSize[0] and size[2] ≦ PartSize[1] andsize[1] ≦ PartSize[2]
        orient[NumOrient, 0] = 0
        orient[NumOrient, 1] = 2
        orient[NumOrient, 2] = 1
        NumOrient = NumOrient + 1
    End If
```

-continued

```
        If size[1] ≦ PartSize[0] and size[0] ≦ PartSize[1] andsize[2] ≦ PartSize[2]
            orient[NumOrient, 0] = 1
            orient[NumOrient, 1] = 0
            orient[NumOrient, 2] = 2
            NumOrient = NumOrient + 1
        End If
        If size[1] ≦ PartSize[0] and size[2] ≦ PartSize[1] andsize[0] ≦ PartSize[2]
            orient[NumOrient, 0] = 1
            orient[NumOrient, 1] = 2
            orient[NumOrient, 2] = 0
            NumOrient = NumOrient + 1
        End If
        If size[2] ≦ PartSize[0] and size[0] ≦ PartSize[1] andsize[1] ≦ PartSize[2]
            orient[NumOrient, 0] = 2
            orient[NumOrient, 1] = 0
            orient[NumOrient, 2] = 1
            NumOrient = NumOrient + 1
        End If
        If size[2] ≦ PartSize[0] and size[1] ≦ PartSize[1] andsize[0] ≦ PartSize[2]
            orient[NumOrient, 0] = 2
            orient[NumOrient, 1] = 1
            orient[NumOrient, 2] = 0
            NumOrient = NumOrient + 1
        End If
Else If Try.baseSize[0] = Try.baseSize[1]
    If try.baseSize[0] = try.baseSize[2]
        If Try.baseSize[0] ≦ PartSize[0] and Try.baseSize[1] ≦ PartSize[1] and
                                            Try.baseSize[2] ≦ PartSize[2]
            orient[NumOrient, 0] = 0
            orient[NumOrient, 1] = 1
            orient[NumOrient, 2] = 2
            NumOrient = NumOrient + 1
        End If
    Else
        If Try.baseSize[0] ≦ PartSize[0] and Try.baseSize[1] ≦ PartSize[1] and
                                            Try.baseSize[2] ≦ PartSize[2]
            orient[NumOrient, 0] = 0
            orient[NumOrient, 1] = 1
            orient[NumOrient, 2] = 2
            NumOrient = NumOrient + 1
        End If
        If Try.baseSize[0] ≦ PartSize[0] and Try.baseSize[2] ≦ PartSize[1] and
                                            Try.baseSize[1] ≦ PartSize[2]
            orient[NumOrient, 0] = 0
            orient[NumOrient, 1] = 2
            orient[NumOrient, 2] = 1
            NumOrient = NumOrient + 1
        End If
        If Try.baseSize[2] ≦ PartSize[0] and Try.baseSize[0] ≦ PartSize[1] and
                                            Try.baseSize[1] ≦ PartSize[2]
            orient[NumOrient, 0] = 2
            orient[NumOrient, 1] = 0
            orient[NumOrient, 2] = 1
            NumOrient = NumOrient + 1
        End If
    End if
Else if Try.baseSize[0] = Try.baseSize[2]
    If Try.baseSize[0] ≦ PartSize[0] and Try.baseSize[1] ≦ PartSize[1] and
                                        Try.baseSize[2] ≦ PartSize[2]
        orient[NumOrient, 0] = 0
        orient[NumOrient, 1] = 1
        orient[NumOrient, 2] = 2
        NumOrient = NumOrient + 1
    End If
    If Try.baseSize[0] ≦ PartSize[0] and Try.baseSize[1] ≦ PartSize[2] and
                                        Try.baseSize[1] ≦ PartSize[2]
        orient[NumOrient, 0] = 0
        orient[NumOrient, 1] = 2
        orient[NumOrient, 2] = 1
        NumOrient = NumOrient + 1
    End If
    If Try.baseSize[1] ≦ PartSize[0] and Try.baseSize[0] ≦ PartSize[1] and
                                        Try.baseSize[2] ≦ PartSize[2]
        orient[NumOrient, 0] = 1
        orient[NumOrient, 1] = 0
        orient[NumOrient, 2] = 2
        NumOrient = NumOrient + 1
    End If
Else Tf Try.baseSize[1] = Try≧baseSize[2])
```

```
        If Try.baseSize[0] ≦ PartSize[0] and Try.baseSize[1] ≦ PartSize[1] and
                                Try.baseSize[2] ≦ PartSize[2]
            orient[NumOrient, 0] = 0
            orient[NumOrient, 1] = 1
            orient[NumOrient, 2] = 2
            NumOrient = NumOrient + 1
        End If
        If Try.baseSize[1] ≦ PartSize[0] and Try.baseSize[0] ≦ PartSize[1] and
                                Try.baseSize[2] ≦ PartSize[2]
            orient[NumOrient, 0] = 1
            orient[NumOrient, 1] = 0
            orient[NumOrient, 2] = 2
            NumOrient = NumOrient + 1
        End If
        If Try.baseSize[1] ≦ PartSize[0] and Try.baseSize[2] ≦ PartSize[1] and
                                Try.baseSize[0] ≦ PartSize[2]
            orient[NumOrient, 0] = 1
            orient[NumOrient, 1] = 2
            orient[NumOrient, 2] = 0
            NumOrient = NumOrient + 1
        End If
Else
        If Try.baseSize[0] ≦ PartSize[0] and Try.baseSize[1] ≦ PartSize[1] and
                                Try.baseSize[2] ≦ PartSize[2]
            orient[NumOrient, 0] = 0
            orient[NumOrient, 1] = 1
            orient[NumOrient, 2] = 2
            NumOrient = NumOrient + 1
        End If
        If Try.baseSize[0] ≦ PartSize[0] and Try.baseSize[2] ≦ PartSize[1] and
                                Try.baseSize[1] ≦ PartSize[2]
            orient[NumOrient, 0] = 0
            orient[NumOrient, 1] = 2
            orient[NumOrient, 2] = 1
            NumOrient = NumOrient + 1
        End If
        If Try.baseSize[1] ≦ PartSize[0] and Try.baseSize[0] ≦ PartSize[1] and
                                Try.baseSize[2] ≦ PartSize[2]
            orient[NumOrient, 0] = 1
            orient[NumOrient, 1] = 0
            orient[NumOrient, 2] = 2
            NumOrient = NumOrient + 1
        End If
        If Try.baseSize[1] ≦ PartSize[0] and Try.baseSize[2] ≦ PartSize[1] and
                                Try.baseSize[2] ≦ PartSize[0]
            orient[NumOrient, 0] = 1
            orient[NumOrient, 1] = 2
            orient[NumOrient, 2] = 0
            NumOrient = NumOrient + 1
        End If
        If Try.baseSize[2] ≦ PartSize[0] and Try.baseSize[0] ≦ PartSize[1] and
                                Try.baseSize[2] ≦ PartSize[1]
            orient[NumOrient, 0] = 2
            orient[NumOrient, 1] = 0
            orient[NumOrient, 2] = 1
            NumOrient = NumOrient + 1
        End If
        If Try.baseSize[2] ≦ PartSize[0] and Try.baseSize[1] ≦ PartSize[1] and
                                Try.baseSize[2] ≦ PartSize[0]
            orient[NumOrient, 0] = 2
            orient[NumOrient, 1] = 1
            orient[NumOrient, 2] = 0
            NumOrient = NumOrient + 1
        End If
End If
```

In particular embodiments, build2Dtry encompasses the following example logic:

```
Rank(PartSize, pRank)
build2DFold(PartSize, pRank, RequestedSize, NumFolds, FoldList)
For i = 0 to NumFolds − 1
    d1 = RequestedSize[FoldList[i].fixDimension] +
                FoldList[i].foldLengtht + FoldList[i].NumFolds
    If FoldList[i].remainder not equal 0
        d1 = d1 + 1
    End If
    For j = i + 1 to NumFolds − 1
        D2 = RequestedSize[FoldList[j].fixDimension] +
                FoldList[j].foldLengtht + FoldList[j].NumFolds
        If FoldList[j].remainder not equal 0
```

```
        D2 = d2 + 1
      End If
      If d2 < d1
        TempFold = FoldList[j]
        FoldList[j] = FoldList[i]
        FoldList[i] = tempFold
        d1 = d2
      End If
    End For
  End For
  NumberOfTries = 0
  For i = 0 to NumFolds − 1
    try.baseSize[FoldList[i].fixDimension] =
                    RequestedSize[FoldList[i].fixDimension]
    try.baseSize[FoldList[i].foldDimension = FoldList[i].foldLength
    try.baseSize[FoldList[i].oneDimension] = FoldList[i].NumFolds
    If FoldList[i].remainder not equal 0
      try.NumConcats = 1
      If FoldList[i].NumFolds is odd
        Try.concatStartNode[0, FoldList[i]. foldDimension] =
                    FoldList[i].foldLength − FoldList[i].remainder
      Else
        Try.concatStartNode[0, FoldList[i]. foldDimension] = 0
      End If
      try.concatStartNode[0,FoldList[i]. fixDimension] = 0
      try.concatStartNode[0,FoldList[i]. oneDimension] =
                    FoldList[i].NumFolds
      try.concatSize[0,FoldList[i]. fixDimension] =
        try.baseSize[FoldList[i].
                    fixDimension]
      try.concatSize[0, FoldList[i]. foldDimension] =
        FoldList[i]. remainder
      try.concatSize[0,FoldList[i]. oneDimension] = 1
    Else
      try.NumConcats = 0
    End If
    try.NumFoldMaps = 1
    try.foldLength[0] = FoldList[i].foldLength
    try.foldFrom[0] = FoldList[i].foldDimension
    try.foldTo[0] = FoldList[i]. oneDimension
    try.foldFix[0] = FoldList[i].fixDimension
    build3Dtry(Try, NumberOfTries)
  End For
```

In particular embodiments, build2Dfold, which builds all possible folds of a two dimensional mesh, encompasses the following example logic:

```
j = 0
oneD = −1
For i = 0 to 2
  If size[i] = 1 and oneD = −1
    oneD = i
  Else
    twoD[j] = I
    j = j + 1
  End If
End For
If size[twoD[1]] ≧ size[twoD[0]]
  bigD = twoD[1]
  littleD = twoD[0]
Else
  bigD = twoD[0]
  littleD = twoD[1]
End If
startFoldB = sqrt(size[bigD])
If startFoldB × startFoldB not equal size[bigD] or startFoldB = 1
  StartFoldB = startFoldB + 1
End If
endFoldB = size[bigD] / 2
startFoldL = sqrt(size[littleD])
If startFoldL × startFoldL not equal size[littleD] or startFoldL = 1
  StartFoldL = startFoldL + 1
if size[bigD] not equal size[littleD]
  endFoldL = size[littleD] / 2
```

```
else
  endFoldL = 1
End If
NumFolds = 1
If endFoldB ≧ startFoldB
  NumFolds= NumFolds +(endFoldB − startFoldB+1)
End If
If endFoldL ≧ startFoldL
  NumFolds= NumFolds +(endFoldL − startFoldL+1)
End If
foldIndex = 0;
FoldList[foldIndex].foldLength =size[littleD]
FoldList[foldIndex].NumFolds = 1
FoldList[foldIndex].remainder = 0
FoldList[foldIndex].foldD = littleD
FoldList[foldIndex].fixD = bigD
FoldList[foldIndex].oneD = oneD
```

An array, t, constructed according to the example logic below, is a mesh size of a resulting Try. Scheduler 515 records a Rank of t in an array, tRank.

```
t[littleD] = size[bigD]
t[bigD] = FoldList[foldIndex].foldLength
t[oneD] = FoldList[foldIndex].NumFolds
rank(t, tRank)
hit = False
For i1 = 0 to 2 while hit = False
  If t[tRank[i1]] > PartSize[pRank[i1]]
    hit = True
  End If
If hit = False
  foldIndex = foldIndex + 1
End If
For i = startFoldB to endFoldB
  FoldList[foldIndex].foldLength = i
  FoldList[foldIndex].NumFolds = size[bigD] / i
  FoldList[foldIndex].remainder = size[bigD] mod i
  FoldList[foldIndex].foldD = bigD
  FoldList[foldIndex].fixD = littleD
  FoldList[foldIndex].oneD = oneD
  t[littleD] = size[littleD]
  t[bigD] = FoldList[foldIndex].foldLength
  If (FoldList[foldIndex].remainder not equal 0
    t[oneD] = FoldList[foldIndex].NumFolds + 1
  Else
    t[oneD] = FoldList[foldIndex].NumFolds
  End If
  Rank(t, tRank)
  hit = False
  For i1 = 0 to 2 while hit = False
    If t[tRank[i1]] > PartSize[pRank[i1]]
      hit = True
    End If
  End For
  if hit = False
    foldIndex = foldIndex + 1
  End If
End For
For i = startFoldL to endFoldL
  FoldList[foldIndex].foldLength = i
  FoldList[foldIndex].NumFolds = size[littleD] / i
  FoldList[foldIndex].remainder = size[littleD] mod i
  FoldList[foldIndex].foldD = littleD
  FoldList[foldIndex].fixD = bigD
  FoldList[foldIndex].oneD = oneD
  t[bigD] = size[bigD]
  t[littleD] = FoldList[foldIndex].foldLength
  If FoldList[foldIndex].remainder not equal 0
    t[oneD] = FoldList[foldIndex].NumFolds + 1
  Else
    t[oneD] = FoldList[foldIndex].NumFolds
  End If
  Rank(t, tRank)
  hit = False
```

```
        for i1 = 0 to 2 while hit = False
            If t[tRank[i1]] > PartSize[pRank[i1]]
                hit = True
            End If
        End For
        If hit = False
            FoldIndex = foldIndex + 1
        End If
    End For
```

In particular embodiments, build1Try generates a list of folds of a one dimensional request and, for each fold, calls build2DFold to generate a list of one or more additional folds. build1Try records the list of folds in the OneDFoldList, which encompasses the following example structure:

```
Structure oneDFold
    Fold Structure    oneD
    Fold Structure    twoD[x]
    integer           NumTwoDFolds
    integer           twoDFoldSize[3]
End Structure
```

In particular embodiments, oneD includes a first fold. In particular embodiments, twoD includes a list of folds generated from the first fold. NumTwoDFolds indicates a Number of folds in twoD. In particular embodiments, twoDFoldSize indicates a mesh size passed to build2Dfold. Scheduler 515 generates Try structures for elements of twoD and calls build3Dtry to build all possible rotations of each Try structure. In particular embodiments, build1Try encompasses the following example logic:

```
Rank(PartSize, pRank)
Rank(RequestedSize, jRank[0])
end = sqrt(RequestedSize[jRank[2]])
start = 2
OneDFoldList[0].oneD.foldLength = RequestedSize[jRank[2]]
OneDFoldList[0].oneD.NumFolds = 1
OneDFoldList[0].oneD.remainder = 0
OneDFoldList[0].oneD.foldD = jRank[2]
OneDFoldList[0].oneD.oneD = jRank[1]
OneDFoldList[0].oneD.fixD = jRank[0]
OneDFoldList[0].twoDFoldSize[jRank[2]] = RequestedSize[jRank[2]]
OneDFoldList[0].twoDFoldSize[jRank[1]] = 1
OneDFoldList[0].twoDFoldSize[jRank[0]] = 1
hit = False
For j = 0 to 2 while hit = False
    if RequestedSize[jRank[j]] > PartSize[pRank[j]]
        hit = True
    End If
End For
If hit = False
    build2DFold(PartSize, pRank, RequestedSize, OneDFoldList[0].twoD,
                                    OneDFoldList[0].nTwoDFolds)
    OneDFoldList[0].nTwoDFolds = 1
    Num1DFolds = 1;
Else
    Num1DFolds = 0
End If
gotRemZero = False
For i = start to end
    OneDFoldList[Num1DFolds].oneD.foldLength = i
    OneDFoldList[Num1DFolds].oneD.NumFolds = RequestedSize[jRank[2]] / i
    OneDFoldList[Num1DFolds].oneD.remainder = RequestedSize[jRank[2]]
                                    mod i
    OneDFoldList[Num1DFolds].oneD.foldD = jRank[2]
    (OneDFoldList[Num1DFolds].oneD.oneD = jRank[1]
    OneDFoldList[Num1DFolds].oneD.fixD = jRank[0]
    OneDFoldList[Num1DFolds].twoDFoldSize[jRank[2]] =
                                    OneDFoldList[Num1DFolds].oneD.foldLength
    OneDFoldList[Num1DFolds].twoDFoldSize[jRank[1]] =
        OneDFoldList[Num1DFolds].oneD.NumFolds
    OneDFoldList[Num1DFolds].twoDFoldSize[jRank[0]] = 1
    If OneDFoldList[Num1DFolds].oneD.remainder not equal 0 or gotRemZero =
                                    False
        If OneDFoldList[Num1DFolds].oneD.remainder = 0
            gotRemZero = True
        End If
        build2DFold(PartSize, pRank, RequestedSize,
                                    OneDFoldList[Num1DFolds].twoDFoldSize,
                                    OneDFoldList[Num1DFolds].twoD,
                                    OneDFoldList[Num1DFolds].nTwoDFolds)
        Num1DFolds = Num1DFolds + 1
    End If
End For
NumberOfTries = 0
For i = 0 to Num1DFolds
```

-continued

```
For j = 0 to OneDFoldList[i].nTwoDFolds
    If OneDFoldList[i].oneD.foldD not equal OneDFoldList[i].twoD[j].foldD
                        or OneDFoldList[i].oneD.remainder = 0
        try.baseSize[OneDFoldList[i].twoD[j].fixD] =
                            OneDFoldList[i].twoDFoldSize[OneDFoldList[i].
                            twoD[j].fixD]
        try.baseSize[OneDFoldList[i].twoD[j].foldD] =
                            OneDFoldList[i].twoD[j].foldLength
        try.baseSize[OneDFoldList[i].twoD[j].oneD] =
                            OneDFoldList[i].twoD[j].NumFolds;
        if OneDFoldList[i].twoD[j].remainder not equal 0
            try.NumConcats = 1
            if OneDFoldList[i].twoD[j].NumFolds is odd
                try.concatStartNode[0, OneDFoldList[i].twoD[j].foldD] =
                                OneDFoldList[i].twoD[j].foldLength -
                                OneDFoldList[i].twoD[j].remainder
            Else
                try.concatStartNode[0, OneDFoldList[i].twoD[j].foldD] = 0
            End If
                try.concatStartNode[0, OneDFoldList[i].twoD[j].fixD] = 0
                try.concatStartNode[0, OneDFoldList[i].twoD[j].oneD] =
                                OneDFoldList[i].twoD[j].NumFolds
                try.concatSize[0, OneDFoldList[i].twoD[j].fixD] =
                                try.baseSize[OneDFoldList[i].twoD[j].fixD]
                try.concatSize[0, OneDFoldList[i].twoD[j].foldD] =
                                OneDFoldList[i].twoD[j].remainder
                try.concatSize[0 OneDFoldList[i].twoD[j].oneD] = 1;
        Else
            try.NumConcats = 0
        End If
        If OneDFoldList[i].oneD.remainder not equal 0
            if OneDFoldList[i].oneD.NumFolds is odd
                try.concatStartNode[try.NumConcats,
                                OneDFoldList[i].oneD.foldD] =
                                OneDFoldList[i].oneD.foldLength -
                                OneDFoldList[i].oneD.remainder
            Else
                try.concatStartNode[try.NumConcats,
                                OneDFoldList[i].oneD.foldD] = 0
            End If
            try.concatStartNode[try.NumConcats, OneDFoldList[i].oneD.fixD]
                                = 0
            try.concatStartNode[try.NumConcats,
                                OneDFoldList[i].oneD.oneD] =
                                OneDFoldList[i].oneD.NumFolds
            try.concatSize[try.NumConcats, OneDFoldList[i].oneD.fixD] = 1
            try.concatSize[try.NumConcats, OneDFoldList[i].oneD.foldD] =
                                OneDFoldList[i].oneD.remainder
            try.concatSize[try.NumConcats, OneDFoldList[i].oneD.oneD] = 1
            oneDEnd[0] = try.concatStartNode[try.NumConcats, 0] +
                                try.concatSize[try.NumConcats, 0] - 1
            oneDEnd[1] = try.concatStartNode[try.NumConcats, 1] +
                                try.concatSize[try.NumConcats, 1] - 1
            oneDEnd[2] = try.concatStartNode[try.NumConcats, 2] +
                                try.concatSize[try.NumConcats, 2] - 1
            k = try.concatStartNode[try.NumConcats,
                                OneDFoldList[i].twoD[j].foldD]
            l = oneDEnd[OneDFoldList[i].twoD[j].foldD]
            If OneDFoldList[i].twoD[j].NumFolds is odd
                try.concatStartNode[try.NumConcats,
                                OneDFoldList[i].twoD[j].foldD] =
                                OneDFoldList[i].twoD[j].foldLength - 1 - (k
                                mod OneDFoldList[i].twoD[j].foldLength)
                oneDEnd[OneDFoldList[i].twoD[j].foldD] =
                                OneDFoldList[i].oneD.foldLength - 1 - (l mod
                                OneDFoldList[i].oneD.foldLength)
            Else
                try.concatStartNode[try.NumConcats,
                                OneDFoldList[i].twoD[j].foldD] = k mod
                                OneDFoldList[i].twoD[j].foldLength
                oneDEnd[OneDFoldList[i].twoD[j].foldD] = l mod
                                OneDFoldList[i].oneD.foldLength
            End If
            try.concatStartNode[try.NumConcats,OneDFoldList[i].oneD.oneD]
                                = k / OneDFoldList[i].twoD.foldLength
            oneDEnd[OneDFoldList[i].oneD.oneD] = l/
                                OneDFoldList[i].oneD.foldLength
            try.concatSize[try.NumConcats, 0] = oneDEnd[0] -
                                try.concatStartNode[try.NumConcats, 0] + 1
```

```
                try.concatSize[try.NumConcats, 1] = oneDEnd[1] -
                                    try.concatStartNode[try.NumConcats, 1] + 1
                try.concatSize[try.NumConcats, 2] = oneDEnd[2] -
                                    try.concatStartNode[try.NumConcats, 2] + 1
                    try.NumConcats = try.NumConcats + 1
            End If
            try.NumFoldMaps = 2
            try.foldLength[0] = OneDFoldList[i].oneD.foldLength
            try.foldFrom[0] = OneDFoldList[i].oneD.foldD
            try.foldTo[0] = OneDFoldList[i].oneD.oneD
            try.foldFix[0] = OneDFoldList[i].oneD.fixD
            try.foldLength[1] = OneDFoldList[i].twoD[j].foldLength
            try.foldFrom[1] = OneDFoldList[i].twoD[j].foldD
            try.foldTo[1] = OneDFoldList[i].twoD[j].oneD
            try.foldFix[1] = OneDFoldList[i].twoD[j].fixD
            build3Dtry(Try, NumberOfTries)
        End For
    End For
NumDeleted = 0
For i = 0 to NumberOfTries - 1
    curMax = TryList[i].baseSize[0] + TryList[i].baseSize[1] +
                                    TryList[i].baseSize[2]
    if TryList[i].NumConcats > 0
        curMax = curMax + 1
    End If
    For j = i +1toNumberOfTries - 1
        duplicate = True
        For i1 = 0 to 2 while duplicate = True
            If TryList[j].baseSize[i1] not equal TryList[i].baseSize[i]
                duplicate = False
            End If
        End For
        If duplicate = True and TryList[j].NumConcats = TryList[i].NumConcats)
            For i1 = 0 to TryList[i].NumConcats while duplicate = True
                For j1 = 0 to 2 while duplicate = True
                    If TryList[j].concatStartNode[i1, j1] not equal
                                    TryList[i].concatStartNode[i1, j1]
                        duplicate = False
                    Else If TryList[j].concatSize[i1, j1] not equal
                                    TryList[i].concatSize[i1, j1]
                        duplicate = False
                    End For
                End For
            End If
            If duplicate = True
                For i1 = 0 to 2
                    TryList[j].baseSize[i1] = TorusSize[i1] + 1
                End For
                NumDeleted = NumDeleted + 1
            Else
                nxtMax = TryList[j].baseSize[0] + TryList[j].baseSize[1] +
                                    TryList[j].baseSize[2]
                If TryList[j].NumConcats > 0
                    nxtMax = nxtMax + 1
                End If
                If nxtMax < curMax
                    TempTry = TryList[j]
                    TryList[j] = TryList[i]
                    TryList[i] = tempTry
                    curMax = nxtMax
                End If
            End If
        End For
End For
NumberOfTries = NumberOfTries - NumDeleted
```

In particular embodiments, buildCompactFits, which constructs BestFit[3], encompasses the following example logic:

```
Rank(PartSize,PartRank)
l = QubeRoot(ResuestedNodes)
hit = False
For i = 1 to l+1 while hit = False
    For j = i to l+1 while hit = False
```

```
        For (k = j to l+1 while hit = False
            If i × j × k ≥ RequestedNodes
                t[0] = i
                t[1] = j
                t[2] = k
                hit = True
            End If
```

```
            End For
        End For
    End For
    If t[0] ≦ PartSize[PartRank[0]]
        If t[1] > PartSize[PartRank[1]]
            t[1] = t[1] – 1
            hit = False
            For t[2] = RequestedNodes / (t[0] × t[1]) to PartSize[PartRank[2]]
                    while
                        hit = False
                    If t[0] × t[1] × t[2] ≧ RequestedNodes
                        Hit = True
                    End If
            End For
        End If
    Else
        t[0] = PartSize[PartRank[0]]
        l = sqrt(RequestedNodes / t[0])
        hit = False;
        For j = l to l + 1 while hit = False
            For (k = j to l + 1 while hit = False
                If (t[0] × j × k ≧ RequestedNodes
                    t[1] = j
                    t[2] = k
                    hit = True
                End If
            End For
        End For
        if t[1] > PartSize[PartRank[1]]
            t[1] = PartSize[PartRank[1]]
            t[2] = RequestedNodes / (t[0] × t[1])
            If t[0] × t[1] × t[2] < RequestedNodes
                t[2] = t[2] + 1
            End If
        End If
    End If
    bestFit[pRank[0]] = t[0];
    bestFit[pRank[1]] = t[1];
    bestFit[pRank[2]] = t[2];
    NumberOfFits = 0
    For i = BestFit[0] to PartSize[0]
        For j = BestFit[1] to PartSize[1]
            For k = BestFit[2] to PartSize[2]
                Fit[NumberOfFits,0] = i
                Fit[NumberOfFits,1] = j
                Fit[NumberOfFits,2] = k
                Hit = True
                If (i not equal to PartSize[0]) and(j not equal to PartSize[0]) and (k
                        not equal to PartSize[0])
                    For m = 0 to NumMapDimensions While Hit = True
                        If Fit[NumberOfFits,MapDimension[m]] mod MapMod[m]
                                not equal to 0
                            Hit = False
                        End If
                    End For
                End If
                If Hit = True
                    NumberOfFits = NumberOfFits + 1
                End If
            End For
        End For
    End For
    For i = 0 to NumBerOfFits – 1
        d1 = Fit[i, 0] + Fit[i, 1] + Fit[i, 2]
        For j = i + 1 to NumberOfFits – 1
            d2 = Fit[j, 0] + Fit[j, 1] + Fit[j, 2]
            if d2 < d1
                k = Fit[j, 0]
                Fit[j, 0] = Fit[i, 0]
                Fit[i, 0] = k
                k = Fit[j, 1]
                Fit[j, 1] = Fit[i, 1]
                Fit[i, 1] = k
                k = Fit[j, 1]
                Fit[j, 1] = Fit[i, 1]
                Fit[i, 1] = k
                d1 = d2
            Else If d2 = d1
                Rank(Fit[i], iRank)
                Rank(Fit[j], jRank)
                hit = 0
                For (k = 0 to 2 while hit = 0
                    If Fit[j, jRank[k] > Fit[i, iRank[k]
                        hit = 1
                    Else If Fit[j, jRank[k] < Fit[i, iRank[k]
                        Hit = –1
                End For
                If hit = 1
                    k = Fit[j, 0]
                    Fit[j, 0] = Fit[i, 0]
                    Fit[i, 0] = k
                    k = Fit[j, 1]
                    Fit[j, 1] = Fit[i, 1]
                    Fit[i, 1] = k
                    k = Fit[j, 1]
                    Fit[j, 1] = Fit[i, 1]
                    Fit[i, 1] = k
                    d1 = d2
                End If
            End If
        End For
    End For
    lastMax = 0
    NumMaxDistances = 0
    For i = 0 NumberOfFits – 1
        currentMax = Fit[i, 0] + Fit[i, 1] + Fit[i, 2]
        If currentMax not equal lastMax
            MaxDistance[NumberOfMaxDistance, 0] = i
            MaxDistance[NumberOfMaxDistance, 1] = currentMax
            NumberOfMaxDistance = NumberOfMaxDistance + 1
        End If
    End For
```

In particular embodiments, buildFreeMeshes Function encompasses the following example logic:

```
NumFreeMeshes = 0
For i = partStart[0] to PartEnd[0]
    For j = PartStart[1] to PartEnd[1]
        For k = PartStart[2] to PartEnd[2]
            If NodeInUse[i,j,k] = NODE_NOT_IN_USE
                NodeInUse[i,j,k] = NODE_ON_HOLD
                meshStart[0] = i
                meshStart[1] = j
                meshStart[2] = k
                inMesh = True
                for mz = k + 1 to PartEnd[2] and inMesh = True
                    if NodeInUse[i,j,mz] not equal NODE_NOT_IN_USE
                        inMesh = False
                End If
            End For
            If inMesh = True
                mEnd[2] = mz – 1
            Else
                mEnd[2] = mz – 2
            If PartWraps[2] and meshStart[2] = 0 and meshEnd[2] not equal
                    PartEnd[2]
                inMesh = True;
                For mz = PartEnd[2 to meshEnd[2] by –1 and inMesh = True
                    If NodeInUse[i,j,mz] not equal NODE_NOT_IN_USE
                        inMesh = False
                    End If
                End For
                If inMesh = True
                    mz = mz + 1
                Else
                    mz = mz + 2
                End If
                if mz ≦ PartEnd[2]
                    meshStart[2] = mz;
                    meshEnd[2] =meshEnd[2] + TorusSize[2]
                End If
            End If
            inMesh = True
```

```
For my = j + 1 to PartEnd[1] and inMesh = True
  For mz = meshStart[2 tomeshEnd[2] an inMesh = True
    If NodeInUse[i, my, mz mod TorusSize[2]] not equal
            NODE_NOT_IN_USE
      inMesh = False
    End If
  End For
  If inMesh = True
    meshEnd[1] = my − 1
  Else
    meshEnd[1] = my − 2
  End If
  If PartWraps[1] and meshStart[1] = 0 and meshEnd[1] not
          equal PartEnd[1]
    inMesh = True
    For my = PartEnd[1] to meshEnd[1] by −1 and inMesh =
            True
      For mz = meshStart[2] to meshEnd[2] and inMesh =
              True
        If NodeInUse[i,my,mz mod Torus Size[2] not equal
                NODE_NOT_IN_USE
          inMesh = False
        End If
      End For
    End For
    If inMesh = True
      My = my + 1
    Else
      my = my + 2
    End If
    if my ≦ PartEnd[1]
      meshStart[1] = my
      meshEnd[1] =meshEnd[1] + TorusSize[1]
    End If
  End If
End For
inMesh = True
for mx = i + 1 to PartEnd[0] and inMesh = True
  for my = meshStart[1] to meshEnd[1] and inMesh = True
    for mz = mStart[2] to mEnd[2] and inMesh = True
      If NodeInUse[mx,my  mod  TorusSize[1],mz  mod
              TorusSize[2]]  not  equal
              NODE_NOT_IN_USE
        inMesh = False
      End If
    End For
  End For
End For
If inMesh = True
  meshEnd[0] = mx − 1
Else
  meshEnd[0] = mx − 2
End If
If partWraps[0] and meshStart[0] = 0 and meshEnd[0] not equal
        PartEnd[0]
  inMesh = True
  For mx = partEnd[0] to meshEnd[0] by −1 and inMesh = True
    For my = meshStart[1] to meshEnd[1] and inMesh = True
      For mz = meshStart[2] to meshEnd[2] and inMesh =
              True
        If NodeInUse[mx,my mod TorusSize[1],mz Mod
                TorusSize[2]] not equal
                NODE_NOT_IN_USE
          inMesh = False
        End If
      End For
    End For
  End For
  If inMesh = True
    Mx = mx + 1
  Else
    Mx = mx + 2
  End If
  If mx ≦ PartEnd[0]
    meshStart[0] = mx
    meshEnd[0] = meshEnd[0] + TorusSize[0]
  End If
End If
FreeMesh[NumFreeMeshes].Start[0] = meshStart[0]
FreeMesh[NumFreeMeshes].Start[1] = meshStart[1]
FreeMesh[NumFreeMeshes].Start[2] = meshStart[2]
FreeMesh[NumFreeMeshes].end[0] = meshEnd[0]
FreeMesh[NumFreeMeshes].end[1] = meshEnd[1]
FreeMesh[NumFreeMeshes].end[2] = meshEnd[2]
FreeMesh[NumFreeMeshes].NumNodes = (meshEnd[0] −
                meshStart[0] + 1) × (meshEnd[1] −
                meshStart[1] + 1) × (meshEnd[2] −
                meshStart[2] + 1)
For mx = meshStart[0] to meshEnd[0]
  mx1 = mx mod TorusSize[0]
  For my = meshStart[1] to meshEnd[1]
    my1 = my mod TorusSize[1]
    For mz = meshStart[2] to meshEnd[2]
      mz1 = mz mod TorusSize[2]
      NodeInUse[mx1], my1], mz1] = NODE_ON_HOLD
    End For
  End For
End For
For i = 0 to 2
  FreeMesh[NumFreeMeshes].Rank[i] = 2 − l;
End For
For l = 0 to 2
  For m = l+1 to 3
    l1 = FreeMesh[NumFreeMeshes].Rank[l]
    m1 = FreeMesh[NumFreeMeshes].Rank[m]
    If meshEnd[m1] − meshStart[m1] <meshEnd[l1] −
            meshStart[l1]
      FreeMesh[NumFreeMeshes].Rank[l] = m1
      FreeMeshRank[m] = l1
    End If
  End For
End For
NumFreeMeshes = NumFreeMeshes + 1
      End If
    End For
  End For
End For
For i = partStart[0] to PartEnd[0]
  For j =PartStart[1] to PartEnd[1]
    For k = PartStart[2] to PartEnd[2]
      If NodeInUse[i,j,k] = NODE_ON_HOLD
        NodeInUse[i,j,k] = NODE_NOT_IN_USE
      End If
    End For
  End For
End For
For i = 0 to NumFreeMeshes − 1
  For j = i + 1 to NumFreeMeshes − 1
    hit = False
    if FreeMesh[j].NumNodes < freeMesh[i].NumNodes
      hit = True;
    Else If FreeMesh[j].NumNodes = freeMesh[i].NumNodes
      hit = True
      For l = 0 to 2 while hit = True
        If FreeMesh[j].Rank[l] > freeMesh[i].Rank[l])
          Hit = False
        End If
      End For
    End If
    If hit = True
      TempMesh = FreeMesh[j]
      FreeMesh[j] = FreeMesh[i]
      FreeMesh[i] = TempMesh
    End If
  End For
End For
```

In particular embodiments, Schedule Job, which returns True if scheduler 515 successfully schedules a job 150, encompasses the following example logic:

```
If SpatialAllowed = True
  If scheduleSpatial( ) = True
    return True
```

```
            Else If CompactAllowed = True
                return scheduleCompact( )
            End If
        Else If CompactAllowed = True
            return scheduleCompact( )
        Else
            Return scheduleAny( )
        End If
```

In particular embodiments, scheduleSpatial encompasses the following example logic:

```
        GotFit = False
        For i = 0 to NumberOfTries – 1 while GotFit = False
            If scanSpatial(TryList[i],Start) = True
                GotFit = True
                setSpatialNodeInUse(Try, Start)
            End If
        End For
        Return GotFit
```

In particular embodiments, setSpatiaNodeInUse, which builds AssignedNodeList, encompasses the following example logic:

```
NodeIndex = 0
For (cNode[0] = 0 to OriginalSize[0] – 1
    For cNode[1] = 0 to OriginalSize[1] – 1
        For cNode[2] = 0 to OriginalSize[2] – 1
            For i = 0 to 2
                jcNode[jobMap[i]] = cNode[i]
            End For
            If Try.NumFoldMaps = 1
                mNode[0, Try.foldFix[0]] =jcNode[Try.foldFix[0]]
                mNode[0, Try.foldTo[0]] =jcNode[Try.foldFrom[0]] /
                        Try.foldLength[0]
                If mNode[0, Try.foldTo[0]] is odd
                    mNode[0, Try.foldFrom[0]] = Try.foldLength[0] – 1 –
                        (jcNode[Try.foldFrom[0]] mod
                        Try.foldLength[0])
                Else
                    mNode[0, Try.foldFrom[0]] = jcNode[Try.foldFrom[0]] mod
                        Try.foldLength[0]
                End If
                For i = 0 to 2
                    node[i] = mNode[0, Try.rMap[l]]
                End for
            Else
                mNode[0, Try.foldFix[0]] =jcNode[Try.foldFix[0]]
                mNode[0,Try.foldTo[0]] = jcNode[Tyr.foldFrom[0]] /
                        Try → foldLnt[0]
                If mNode[0, Try.foldTo[0]] is odd
                    mNode[0, Try.foldFrom[0]] = Try.foldLength[0] – 1 –
                        (jcNode[Try.foldFrom[0]] mod
                        Try.foldLength[0])
                Else
                    mNode[0, Try.foldFrom[0]] = jcNode[Try.foldFrom[0]] mod
                        Try.foldLength[0]
                End If
                mNode[1, Try.foldFix[1]] =mNode[0, Try.foldFix[1]]
                mNode[1, Try.foldTo[1]] = mNode[0, Try.foldFrom[1]] /
                        Try.foldLength[1]
                If mNode[1, Try.foldTo[1]] is odd
                    mNode[1, Try.foldFrom[1]] = Try.foldLength[1] – 1 –
                        (mNode[0, Try.foldFrom[1]] mod
                        Try.foldLength[1])
                Else
                    mNode[1, Try.foldFrom[1]] = mNode[0, Try.foldFrom[1]]
                        modTry → foldLnt[1]
                For i = 0 to 2
                    node[i] = mNode[1, Try.rMap[i]]
                End For
            End If
            For i = 0 to 2
                Node[i] = node[i] mod TorusSize[i]
            End For
            NodeInUse[node[0], node[1], node[2]] = NODE_IN_USE
            AssignedNodeList[NodeIndex, 0] = node[0]
            AssignedNodeList[NodeIndex, 1] = node[2]
            AssignedNodeList[NodeIndex, 2] = node[2]
            NodeIndex = NodeIndex + 1
        End For
    End For
End For
```

In particular embodiments, scheduleSpatial encompasses the following example

```
For i = 0 to 2
  If PartWraps[i]
    End[i] =PartEnd[i]
  Else
    End[i] = PartEnd[i] – Try.baseSize[i] + 1
  End If
End For
zPlaneCnt = Try.baseSize[0] × Try.baseSize[1];
For i = PartStart[0] to End[0]
  newX = True
  For (n = PartStart[2] to PartEnd[2]
    zPlane[n] = 0
  End For
  For l = i to i+try.baseSize[0]
    For n = PartStart[2] to PartEnd[2]
      l1 = l mod TorusSize[0]
      m1 = PartStart[1]
      m2 = (m1 + Try.baseSize[1]) mod TorusSize[1]
      If PartStart[1] + Try.baseSize[1] ≦ PartEnd[1]
        ZPlane[n] = zPlane[n] + FreeY[l1,m1,n] – FreeY[l1,m2,n]
      Else
        ZPlane[n] = zPlane[n]+ FreeY[i1,m1,n]
      End If
    End For
  End For
  For j = PartStart[1] to End[1]
    if newX = False
      l1 = i mod TorusSize[0]
      l2 = (i + Try.baseSize[0]) mod TorusSize[0]
      m1 = (j – 1) mod TorusSize[1]
      if PartWraps[0] = False or i+try.baseSize[0]) PartEnd[0]
        For n = PartStart[2] to PartEnd[2]
          If i+Try.baseSize[0] ≦ PartEnd[0]
            zPlane[n] = zPlane[n] – (FreeX[l1,m1,n] –
              FreeX[l2,m1,n])
          Else
            zPlane[n] = zPlane[n] – FreeX[l1,m1,n]
          End If
        End For
      Else
        For n = PartStart[2] to PartEnd[2]
          zPlane[n] = zPlane[n] – (FreeX[l1,m1,n]+ (FreeX[0,m1,n] –
            FreeX[l2,m1,n]))
        End For
      End If
      l1 = i mod TorusSize[0]
      l2 = (i + Try.baseSize[0]) mod TorusSize[0]
      m1 = (j + Try.baseSize[1]) mod TorusSize[1]
      If PartWraps[0] = False or i+try.baseSize[0]) ≦ PartEnd[0]
        For n = PartStart[2] to PartEnd[2]
          If i + Try.baseSize[0] ≦ PartEnd[0]
            ZPlane[n] = zPlane[n] + FreeX[l1,m1,n] – FreeX[l1,m2,n]
          Else
            ZPlane[n] = zPlane[n] + FreeX[l1,m1,n]
          End If
        End For
      Else
        For n = PartStart[2] to PartEnd[2]
          ZPlane[n] = zPlane[n] + FreeX[l1,m1,n]) + FreeX[0,m2,n]) –
            FreeX[l1,m2,n]
        End For
      End If
    Else
      newX = False;
      k = PartStart[2];
      while k ≦ End[2])
      hit = True;
      For n = k; to k + Try.baseSize[2] – 1 while hit = True
        If zPlane[n mod TorusSize[2]] not equal zPlaneCnt
          hit = False;
        End If
      End For
      if hit = True
        Start[0] = i;
        Start[1] = j;
        Start[2] = k;
```

-continued

```
        For cNdx = 0 to try.NumConcats – 1 while hit = True
          For m = 0 to 2 while hit = True
            cStart[m] = Start[m] + Try.concatStartNode[cNdx, m]
            cEnd[m] = cStart[m] + Try.concatSize[cNdx, m] – 1;
            if (cEnd[m] ≧ TorusSize[m] && PartWraps[m] = False
              hit = False;
          End For
          For l = cStart[0] to cEnd[0] while hit = True
            For m = cStart[1] to cEnd[1] while hit = True
              For n = cStart[2] to cEnd[2] while hit = True
                l1 = l mod TorusSize[0]
                m1 =m mod TorusSize[1]
                n1 =n mod TorusSize[2]
                If NodeInUse[l1,m1,n1] not equal
                    NODE_NOT_IN_USE
                  hit = False;
                End If
              End For
            End For
          End For
        End For
        If hit = True
          Return True;
        Else
          K = k + 1
        End If
      Else
        k = n + 1
      End If
    End For
  End For
Return False
```

In particular embodiments, scheduleCompactFunction, which runs a binary search on Fit, encompasses the following example logic:

```
HighFit = NumberOfFits – 1
For i = 0 to 2
  HighStart[i] = PartStart[i]
End For
LowFit = –1
While True
  CurrentFit = LowFit + (HighFit – LowFit) / 2
  If scanCompact(NumberOfNodes, Fit[CurrentFit], HighStart) = True
    HighFit = CurrentFit
  Else
    LowFit = CurrentFit
  End If
  If HighFit = LowFit + 1
    Return
  End If
End While
Hit = False
For i = 0 to NumMaxDistances – 1 While Hit = False
  If HighFit ≧ MaxDistance[i,0]
    HigMaxDistance = i
    Hit = True
  End If
End For
Hit = True
For i = HighMaxDistance – 1 to 0 by –1
  StartFit = MaxDistance[i,0]
  If i =NumMaxDistance – 1
    EndFit = NumberOfFits – 1
  Else
    EndFit = MaxDistance[i+1,0] – 1
  End If
  Hit = False
  For j = StartFit to EndFit While Hit = False
    If scanCompact(NumberOfNodes, Fit[j], HighStart)= True
      HighFit = j
      HighMaxDistance = I
      Hit = True
    End If
```

-continued

```
    End For
  End For
  setCompactNodeInUse(Fit(HighFit), HighStart)
```

In particular embodiments, setComPactNodeInUse encompasses the following example logic:

```
node = 0
For i = 0 to 2
  if Start[i] ≥ TorustSize[i]
    Start[i] = Start[i] mod TorusSize[i]
    End[i] = Start[i] + Size[i] – 1
  End If
End For
If NumMapDiminsions = 1
  If MapDiminsion[0] = 0
    order[0] = 1
    order[1] = 2
    order[2] = 0
  Else If MapDiminsion[0] = 1
    order[0] = 0
    order[1] = 2
    order[2] = 1
  Else
    order[0] = 0
    order[1] = 1
    order[2] = 2
  End If
Else
  order[0] = 3 – MapDiminsion[0] – MapDiminsion[1]
  order[1] = MapDiminsion[0]
  order[2] = MapDiminsion[1]
End If
count = 0
For i = Start[order[0]] to end[order[0]] and count < RequestedNodes
  index[order[0]] = i mod TorusSize[order[0]]
  For j = Start[order[1]] to end[order[1]] and count < RequestedNodes
    index[order[1]] = j mod TorusSize[order[1]]
    For k = Start[order[2]] to end[order[2]] and count < RequestedNodes
      index[order[2]] = k mod TorusSize[order[2]]
      If NodeInUse[index[0], index[1], index[2]] =
          NODE_NOT_IN_USE
        NodeInUse[index[0], index[1], index[2]] = NODE_IN_USE
        AssignedNodeList[node, order[0] = index[order[0]]
        AssignedNodeList[node, order[1] = index[order[2]]
        AssignedNodeList[node, order[2] = index[order[2]]
        node = node + 1
      End If
    End For
  End For
End For
```

In particular embodiments, ScanCompact encompasses the following example logic:

```
For i = 0 to 2
  If PartWraps[i] =True
    end[i] =PartEnd[i]
  Else
    end[i] = PartEnd[i] – Start[i] + 1
  End If
For i = PartStar[0] to end[0]
  newX = True
  For n = 0 to TorusSize[2]
    ZPlane[n] = 0
  End For
  for (l = i to i + size[0]
    for (n = pStart[2]; n ≤ pEnd[2]; n++)
      l1 = l mod TorusSize[0];
      m1 = PartStart[1]
      m2 = (PartStart[1] + size[1]) mod TorusSize[1]
      If PartStart[1]+size[1] ≤ PartEnd[1])
        ZPlane[n] = zPlane[n] +FreeY[l1,m1,n] – FreeY[l1,m2,n]
      Else
        ZPlane[n] = zPlane[n] +FreeY[l1,m1,n]
      End If
    End For
  End For
  For j = PartStart[1] to End[1]
    newY = True
    If newX = False
      l1 = i
      l2 = (i + size[0]) mod TorusSize[0]
      m1 = j – 1
      If PartWraps[0] = False or i+Start[0] ≤ PartEnd[0]
        For n = PartStart[2] to PartEnd[2]
          If i+size[0] ≤ PartEnd[0]
            ZPlane[n] = zPlane[n] – (FreeX [l1,m1,n] –
                        FreeX[l2,m1,n])
          else
            zPlane[n] = zPlane[n] – FreeX [l1,m1,n]
          End If
        End For
      Else
        For n = PartStart[2] to PartEnd[2]
          zPlane[n] = zPlane[n] – (FreeX [l1,m1,n] +
                      (FreeX[0,m1,n] – FreeX [l2,m1,n]))
        End For
      End If
      l1 = i
      l2 = (i + Start[0]) mod TorusSize[0]
      m1 = (j + size[1] – 1) mod TorusSize[1]
      If PartWraps[0] = False or i + Start[0]) ≤ PartEnd[0]
        For n = PartStart[2] to PartEnd[2]
          If (i + Start[0] ≤ PartEnd[0])
            ZPlane[n] = zPlane[n] + (FreeX[l1,m1,n] –
                        FreeX[l1,m2,n]
          Else
            ZPlane[n] = zPlane[n] + FreeX[l1,m1,n]
          End If
        End For
      Else
        For n = PartStart[2] to PartEnd[2]
          ZPlane[n] = zPlane[n] + (FreeX[l1,m1,n] +
                      (FreeX[0,m1,n] – FreeX[l1,m2,n]))
        End For
      End If
    Else
      newX = False
    End If
    For k = PartStart[2] to end[2]
      if newY = True
        newY = False
        count = 0;
        For n = k to k + size[2]
          count = count + zPlane[n mod TorusSize[2]]
        End For
      Else
        count = count – zPlane[k – 1]
        k1 = (k + size[2] – 1) mod TorusSize[2]
        zPlane[k1] = 0
        l1 = i
        l2 = (i + size[0]) mod TorusSize[0]
        If PartWraps[0] = False or i + size[0]) ≤ PartEnd[0]
          For m = j to j + size[1]
            m1 = m mod TorusSize[1]
            If i + size[0] ≤ PartEnd[0]
              ZPlane[k1] = zPlane[k1] + (FreeX[l1,m1,k1] –
                          FreeX[l2,m1,k1])
            Else
              ZPlane[k1] = zPlane[k1] + FreeX[l1,m1,k1]
            End For
          Else
            For m = j to j + size[1]
              ZPlane[k1] = zPlane[k1] + FreeX[l1,m1,k1] +
                          (FreeX[0,m1,k1] – FreeX[l2,m1,k1])
            End For
          End If
          count= count + zPlane[k1]
        End If
```

-continued

```
        If count ≧ NumberOf Nodes
            Start[0] = i
            Start[1] = j
            Start[2] = k
            return True
        End If
      End For
    End For
  End For
End For
return False
```

In particular embodiments, scheduleAny encompasses the following logic:

```
Node = 0
Remainder = RequestedNodes
For m = 0 to NumFreeMeshes while Remainder > 0
  If FreeMesh[m].Rank[0] = 2
    iNdx = FreeMesh[m].Rank[2]
    jNdx = FreeMesh[m].Rank[1]
  Else If FreeMesh[m].Rank[1] = 2
    iNdx = FreeMesh[m].Rank[2]
    jNdx = FreeMesh[m].Rank[0]
  Else
    iNdx = FreeMesh[m].Rank[1]
    jNdx = FreeMesh[m].Rank[0]
  End If
  For i = FreeMesh[m].Start[iNdx] toFreeMesh[m].end[iNdx]
                      while Remainder > 0
    For j = FreeMesh[m].Start[jNdx] to FreeMesh[m].end[jNdx] while
                      Remainder > 0
      For k = FreeMesh[m].Start[2] to FreeMesh[m].end[2]
                      while Remainder > 0
        i1 = i mod TorusSize[iNdx]
        j1 = j mod TorusSize[iMod]
        k1 = k mod TorusSize[2]
        If iNdx = 0
          NodeInUse[i1,j1,k1] = NODE_IN_USE
        Else
          NodeInUse[j1,i1,k1] = NODE_IN_USE
        End If
        AssignedNodeList[Node].[iNdx] = i1
        AssignedNodeList[Node].[jNdx] = j1
        AssignedNodeList[Node, 2] = k1
        Node = Node + 1
      End For
    End For
  End For
End For
```

In particular embodiments, setMpiRank encompasses the following logic:

```
For node = 0 to RequestedNodes − 1
  to[0] = AssignedNodeList[node, 0]
  to[1] = AssignedNodeList[node, 1]
  to[2] = AssignedNodeList[node, 2]
  If NumMapDiminsions = 1
    to[MapDiminsion[0]] = AssignedNodeList[node,
                      MapDimension[0]] / MapMod[0]
    to[3] = AssignedNodeList[node, MapDiminsion[0]] mod MapMod[0]
  Else
    to[MapDiminsion[0]] = AssignedNodeList[node, MapDiminsion[0]] /
                      MapMod[0]
    to[MapDiminsion[1]] = AssignedNodeList[node, MapDiminsion[1]] /
                      MapMod[1]
    to[3] = (AssignedNodeList[node, MapDiminsion[0]] mod
                      MapMod[0]) × MapMod[1] +
    AssignedNodeList[node, MapDiminsion[1]] mod MapMod[1]
  End If
```

-continued

```
  hit = False
  for (node1 = 0 to NumFreeNodes − 1 while hit = False
    If to[0] = FreeNodeList[node1].coordinate[0] and
       to[1] = FreeNodeList[node1].coordinate[1] and
       to[2] = FreeNodeList[node1].coordinate[2] and
       to[3] = FreeNodeList[node1].coordinate[3]
       FreeNodeList[node1].mpiRank = node
       Hit = True
    End If
  End For
End For
```

In particular embodiments, scheduler 515 uses the following example structures, which are defined as follows, to allocate nodes 115 to jobs 150. As described above, cluster management engine 130 communicates a list of FreeNode structures to scheduler 515 along with a job 150. The list includes all nodes 115 available for scheduling. In the list, switch-based coordinates identify available nodes 115 in the list. If scheduler 515 schedules job 150, scheduler 515 sets mpiRank before returning.

```
          Structure FreeNode
            integer    coordinate[4]
            integer    mpiRank
          End Structure
```

In particular embodiments, scheduler 515 uses a Fold Structure to record how scheduler 515 folds one dimensional and two dimensional spatial requests.

```
          Structure Fold
            integer    foldLength
            integer    numFolds
            integer    remainder
            integer    foldDimension
            integer    fixDdimension
            integer    oneDimension
          End Structure
```

In particular embodiments, scheduler 515 uses a Try structure to store information on meshes used for scheduling a spatial job 150. A Try structure includes information on a base mesh and up to two concatenated meshes.

```
          Structure Try
            integer    baseSize[3]
            integer    numConcats
            integer    concatSize[2,3]
            integer    concatStartNode[2,3]
            integer    rMap[3]
            integer    irMap[3]
            integer    numFoldMaps
            integer    foldLength[2]
            integer    foldFrom[2]
            integer    foldTo[2]
            integer    foldFix[2]
          End Structure
```

In particular embodiments, scheduler 515 uses a FreeMesh structure to store information on meshes in grid 110 available for scheduling. Scheduler 515 uses FreeMesh to schedule "any" requests.

```
Structure FreeMesh
    integer    start[3]
    integer    end[3]
    integer    size[3]
    integer    rank[3]
    integer    numberOfNodes
End Structure
```

In particular embodiments, scheduler 515 uses the following example variables, which are defined as follows, to allocate nodes 115 to jobs 150.

RequestedNodes: a number of nodes requested for a job 150.

RequestType: a type of job request: SPATIAL, COMPACT, or ANY.

OriginalSize[3]: if RequestType=SPATIAL, a size of a job 150.

AggressiveFlag: a floating-point number between zero and one indicating a degree of leeway allotted to scheduler 515 for purposes of allocating nodes 115 to a job 150.

JobMap[3]: if RequestType=SPATIAL, a mapping of indices of OriginalSize to an order more suitable to scheduler 515.

RequestedSize[3]: if RequestType=SPATIAL, size of a job 150 after scheduler 515 has applied JobMap.

TorusSize[3]: size of grid 110 in terms of CPUs 164.

NodesPerSwitch: number of nodes 115 per switch 166.

NumFreeNodes: number of nodes 115 available for scheduling.

FreeNodeList[NumFreeNodes]: list of nodes 115 available for scheduling passed to scheduler 515.

SpatialAllowed: set to True if spatial scheduling allowed.

CompactAllowed: set to True if compact scheduling allowed.

AnyAllowed: set to True if any scheduling allowed.

TorusMap[3]: a mapping of indices from a switch-based torus to an order more suitable to scheduler 515.

InverseTorusMap[3]: an inverse of TorusMap; applied to all output nodes 115 before returning to cluster management engine 130.

NumMapDimesions: number of dimensions modified when going from a switch-based torus to a node base torus; possible values are one and two.

MapDimensions[2]: indices of dimensions modified when going from a switch-based torus to the node base torus.

MapMod[2]: multipliers used when going from a switch-based torus to a node-based torus; possible values are MapMod[0]=4 for NumMapDimesions=1 and MapMod[0]=2 and MapMode[1]=2 for NumMapDimesions=2.

PartSize[3]: size of a partition.

PartStart[3]: start coordinate of a partition.

PartEnd[3]: end coordinate of a partition.

PartWraps[3]: PartWraps[i]=True if a partition wraps in dimension i.

NodeInUse[TorusSize[0],TorusSize[1],TorusSize[2]]: NodeInUse[i,j,k] indicates a state of a node 115; possible values include NODE_IN_USE (node 115 assigned to another job 150), NODE_NOT_IN_USE (node 115 available), and NODE_ON_HOLD (a temporary state used when assigning nodes 115 to a job 150).

FreeY[TorusSize[0],TorusSize[1],TorusSize[2]]: FreeY[i,j,k] indicates a number of free nodes 115 in line {i,j,k} through {i,TorusSize[1]–1,k} inclusively. A scan routine uses FreeY.

FreeX[TorusSize[0],TorusSize[1],TorusSize[2]]: FreeX[i,j,k] indicates a number of free nodes in the line {i,j,k} through {TorusSize[0]–1,j,k} inclusively. A scan routine uses FreeX.

NumberOfTries: a number of Try structures constructed for a spatial request.

TryList[NumberOfTries]: a list of Try structures for a spatial request.

NumberOfFits: a number of meshes constructed for a compact request.

Fit[NumberOfFits,3]: a list of meshes constructed for a compact request.
  Fit[i,0]=size of mesh i in an x dimension.
  Fit[i,1]=size of mesh i in ay dimension.
  Fit[i,2]=size of mesh i in a z dimension.

NumMaxDistances: a number of unique maximum distances in Fit.

MaxDistance[NumMaxDistances,2]: a list of unique maximum distances in Fit. For any $0 \leq i \leq$ NumMaxDistances, MaxDistance[i,0]=index into Fit of a first mesh with maximum distance=MaxDistance[I,1].

NumFreeMeshes: a number of free meshes in grid 110. A free mesh is a mesh including only free nodes 115.

FreeMesh[NumFreeMeshes]: an array of FreeMesh structures.

AssignedNodeList[RequestedNodes,3]: a list of nodes 115 assigned to a job 115 in MPI rank order.

Cluster management engine 130, such as through scheduler 515, may be further operable to perform efficient check-pointing. Restart dumps typically comprise over seventy-five percent of data written to disk. This I/O is often done so that processing is not lost to a platform failure. Based on this, a file system's I/O can be segregated into two portions: productive I/O and defensive I/O. Productive I/O is the writing of data that the user calls for to do science such as, for example, visualization dumps, traces of key physics variables over time, and others. Defensive I/O is performed to manage a large simulation run over a substantial period of time. Accordingly, increased I/O bandwidth greatly reduces the time and risk involved in check-pointing.

Returning to engine 130, local memory 520 comprises logical descriptions (or data structures) of a plurality of features of system 100. Local memory 520 may be stored in any physical or logical data storage operable to be defined, processed, or retrieved by compatible code. For example, local memory 520 may comprise one or more eXtensible Markup Language (XML) tables or documents. The various elements may be described in terms of SQL statements or scripts, Virtual Storage Access Method (VSAM) files, flat files, binary data files, Btrieve files, database files, or comma-separated-value (CSV) files. It will be understood that each element may comprise a variable, table, or any other suitable data structure. Local memory 520 may also comprise a plurality of tables or files stored on one server 102 or across a plurality of servers or nodes. Moreover, while illustrated as residing inside engine 130, some or all of local memory 520 may be internal or external without departing from the scope of this disclosure.

Illustrated local memory 520 includes physical list 521, virtual list 522, group file 523, policy table 524, and job queue 525. But, while not illustrated, local memory 520 may include other data structures, including a job table and audit log, without departing from the scope of this disclosure. Returning to the illustrated structures, physical list 521 is operable to store identifying and physical management information about node 115. Physical list 521 may be a multidimensional data structure that includes at least one record per node 115. For example, the physical record may include fields such as "node," "availability," "processor utilization," "memory utilization," "temperature," "physical location," "address," "boot images," and others. It will be understood that each record may include none, some, or all of the example fields. In one embodiment, the physical record may provide a foreign key to another table, such as, for example, virtual list 522.

Virtual list 522 is operable to store logical or virtual management information about node 115. Virtual list 522 may be a multidimensional data structure that includes at least one record per node 115. For example, the virtual record may include fields such as "node," "availability," "job," "virtual cluster," "secondary node," "logical location," "compatibility," and others. It will be understood that each record may include none, some, or all of the example fields. In one embodiment, the virtual record may include a link to another table such as, for example, group file 523.

Group file 523 comprises one or more tables or records operable to store user group and security information, such as access control lists (or ACLs). For example, each group record may include a list of available services, nodes 115, or jobs for a user. Each logical group may be associated with a business group or unit, a department, a project, a security group, or any other collection of one or more users that are able to submit jobs 150 or administer at least part of system 100. Based on this information, cluster management engine 130 may determine if the user submitting job 150 is a valid user and, if so, the optimum parameters for job execution. Further, group table 523 may associate each user group with a virtual cluster 220 or with one or more physical nodes 115, such as nodes residing within a particular group's domain. This allows each group to have an individual processing space without competing for resources. However, as described above, the shape and size of virtual cluster 220 may be dynamic and may change according to needs, time, or any other parameter.

Policy table 524 includes one or more policies. It will be understood that policy table 524 and policy 524 may be used interchangeably as appropriate. Policy 524 generally stores processing and management information about jobs 150 and/or virtual clusters 220. For example, policies 524 may include any Number of parameters or variables including problem size, problem run time, timeslots, preemption, users' allocated share of node 115 or virtual cluster 220, and such.

Job queue 525 represents one or more streams of jobs 150 awaiting execution. Generally, queue 525 comprises any suitable data structure, such as a bubble array, database table, or pointer array, for storing any Number (including zero) of jobs 150 or reference thereto. There may be one queue 525 associated with grid 110 or a plurality of queues 525, with each queue 525 associated with one of the unique virtual clusters 220 within grid 110.

In one aspect of operation, cluster management engine 130 receives job 150, made up of N tasks which cooperatively solve a problem by performing calculations and exchanging information. Cluster management engine 130 allocates N nodes 115 and assigns each of the N tasks to one particular node 115 using any suitable technique, thereby allowing the problem to be solved efficiently. For example, cluster management engine 130 may utilize job parameters, such as job task placement strategy, supplied by the user. Regardless, cluster management engine 130 attempts to exploit the architecture of server 102, which in turn provides the quicker turnaround for the user and likely improves the overall throughput for system 100.

In one embodiment, cluster management engine 130 then selects and allocates nodes 115 according to any of the following example topologies:

Specified 2D (x,y) or 3D (x,y,z)—Nodes 115 are allocated and tasks may be ordered in the specified dimensions, thereby preserving efficient neighbor to neighbor communication. The specified topology manages a variety of jobs 150 where it is desirable that the physical communication topology match the problem topology allowing the cooperating tasks of job 150 to communicate frequently with neighbor tasks. For example, a request of 8 tasks in a 2×2×2 dimension (2, 2, 2) will be allocated in a cube. For best-fit purposes, 2D allocations can be "folded" into 3 dimensions, while preserving efficient neighbor to neighbor communications. Cluster management engine 130 may be free to allocate the specified dimensional shape in any orientation. For example, a 2×2×8 box may be allocated within the available physical nodes vertically or horizontally Best Fit Cube—cluster management engine 130 allocates N nodes 115 in a cubic volume. This topology efficiently handles jobs 150 allowing cooperating tasks to exchange data with any other tasks by minimizing the distance between any two nodes 115.

Best Fit Sphere—cluster management engine 130 allocates N nodes 115 in a spherical volume. For example, the first task may be placed in the center node 115 of the sphere with the rest of the tasks placed on nodes 115 surrounding the center node 115. It will be understood that the placement order of the remaining tasks is not typically critical. This topology may minimize the distance between the first task and all other tasks. This efficiently handles a large class of problems where tasks 2-N communicate with the first task, but not with each other.

Random-cluster management engine 130 allocates N nodes 115 with reduced consideration for where nodes 115 are logically or physically located. In one embodiment, this topology encourages aggressive use of grid 110 for backfilling purposes, with little impact to other jobs 150.

It will be understood that the prior topologies and accompanying description are for illustration purposes only and may not depict actual topologies used or techniques for allocating such topologies.

Cluster management engine 130 may utilize a placement weight, stored as a job 150 parameter or policy 524 parameter. In one embodiment, the placement weight is a modifier value between 0 and 1, which represents how aggressively cluster management engine 130 should attempt to place nodes 115 according to the requested task (or process) placement strategy. In this example, a value of 0 represents placing nodes 115 only if the optimum strategy (or dimensions) is possible and a value of 1 represents placing nodes 115 immediately, as long as there are enough free or otherwise available nodes 115 to handle the request. Typically, the placement weight does not override administrative policies 524 such as resource reservation, in order to prevent starvation of large jobs 150 and preserve the job throughput of HPC system 100.

The preceding illustration and accompanying description provide an exemplary modular diagram for engine 130 implementing logical schemes for managing nodes 115 and jobs 150. However, this figure is merely illustrative and system 100 contemplates using any suitable combination and arrangement of logical elements for implementing these and other algorithms. Thus, these software modules may include any suitable combination and arrangement of elements for effectively managing nodes 115 and jobs 150. Moreover, the operations of the various illustrated modules may be combined and/or separated as appropriate.

Figure 11:
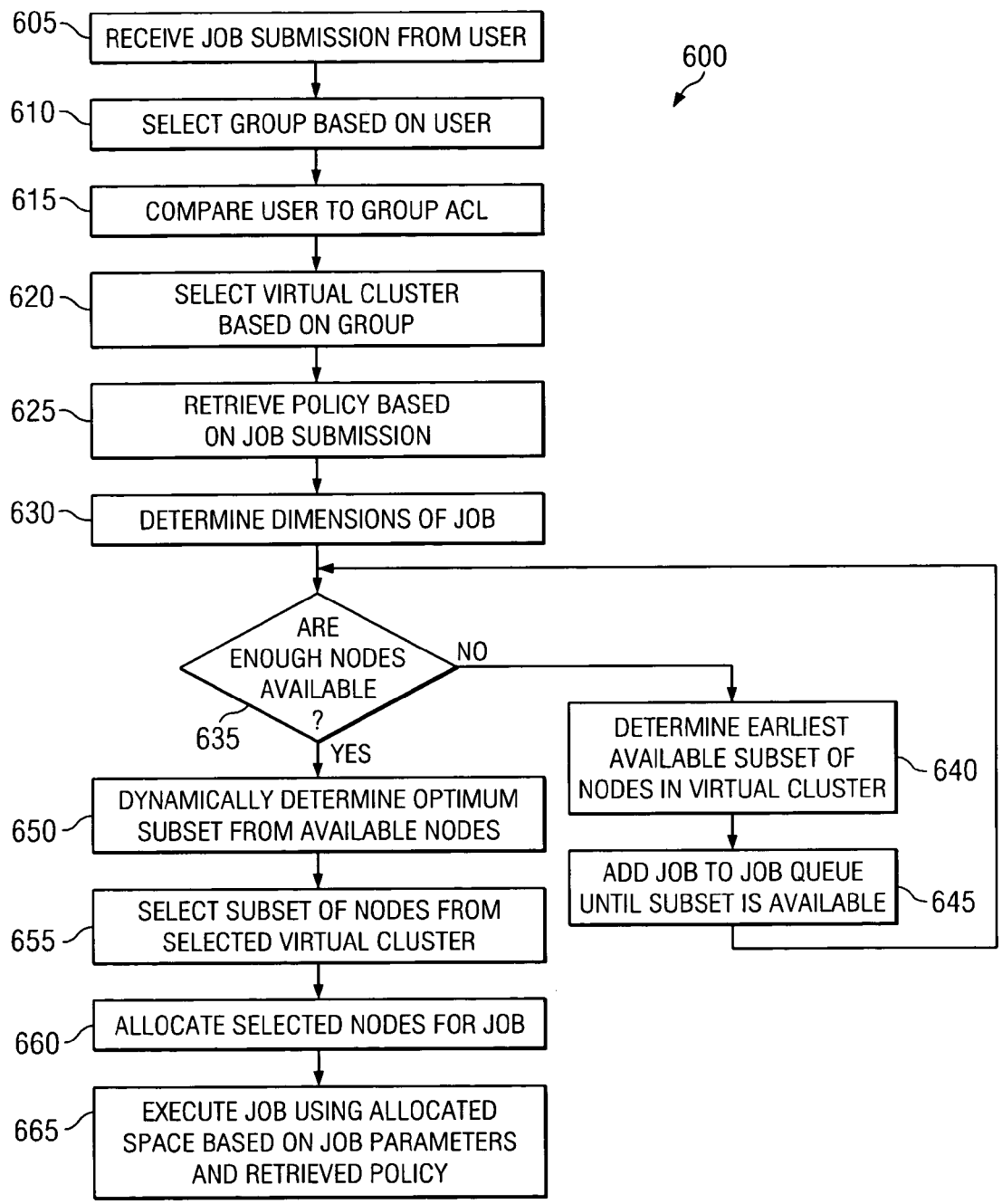
FIG. 11 is a flowchart illustrating a method for submitting a batch job in accordance with the high-performance computing system of FIG. 1.

FIG. 11 is a flowchart illustrating an example method 600 for dynamically processing a job submission in accordance with one embodiment of the present disclosure. Generally, FIG. 11 describes method 600, which receives a batch job submission, dynamically allocates nodes 115 into a job space 230 based on the job parameters and associated policies 524, and executes job 150 using the allocated space. The following description focuses on the operation of cluster management module 130 in performing method 600. But system 100 contemplates using any appropriate combination and arrangement of logical elements implementing some or all of the described functionality, so long as the functionality remains appropriate.

Method 600 begins at step 605, where HPC server 102 receives job submission 150 from a user. As described above, in one embodiment the user may submit job 150 using client 120. In another embodiment, the user may submit job 150 directly using HPC server 102. Next, at step 610, cluster management engine 130 selects group 523 based upon the user. Once the user is verified, cluster management engine 130 compares the user to the group access control list (ACL) at step 615. But it will be understood that cluster management engine 130 may use any appropriate security technique to verify the user. Based upon determined group 523, cluster management engine 130 determines if the user has access to the requested service. Based on the requested service and hostname, cluster management engine 130 selects virtual cluster 220 at step 620. Typically, virtual cluster 220 may be identified and allocated prior to the submission of job 150. But, in the event virtual cluster 220 has not been established, cluster management engine 130 may automatically allocate virtual cluster 220 using any of the techniques described above. Next, at step 625, cluster management engine 130 retrieves policy 524 based on the submission of job 150. In one embodiment, cluster management engine 130 may determine the appropriate policy 524 associated with the user, job 150, or any other appropriate criteria. Cluster management engine 130 then determines or otherwise calculates the dimensions of job 150 at step 630. It will be understood that the appropriate dimensions may include length, width, height, or any other appropriate parameter or characteristic. As described above, these dimensions are used to determine the appropriate job space 230 (or subset of nodes 115) within virtual cluster 220. After the initial parameters have been established, cluster management 130 attempts to execute job 150 on HPC server 102 in steps 635 through 665.

At decisional step 635, cluster management engine 130 determines if there are enough available nodes to allocate the desired job space 230, using the parameters already established. If there are not enough nodes 115, then cluster management engine 130 determines the earliest available subset 230 of nodes 115 in virtual cluster 220 at step 640. Then, cluster management engine 130 adds job 150 to job queue 125 until the subset 230 is available at step 645. Processing then returns to decisional step 635. Once there are enough nodes 115 available, then cluster management engine 130 dynamically determines the optimum subset 230 from available nodes 115 at step 650. It will be understood that the optimum subset 230 may be determined using any appropriate criteria, including fastest processing time, most reliable nodes 115, physical or virtual locations, or first available nodes 115. At step 655, cluster management engine 130 selects the determined subset 230 from the selected virtual cluster 220. Next, at step 660, cluster management engine 130 allocates the selected nodes 115 for job 150 using the selected subset 230.

According to one embodiment, cluster management engine 130 may change the status of nodes 115 in virtual node list 522 from "unallocated" to "allocated". Once subset 230 has been appropriately allocated, cluster management engine 130 executes job 150 at step 665 using the allocated space based on the job parameters, retrieved policy 524, and any other suitable parameters. At any appropriate time, cluster management engine 130 may communicate or otherwise present job results 160 to the user. For example, results 160 may be formatted and presented to the user via GUI 126.

FIG. 12 is a flowchart illustrating an example method 700 for dynamically backfilling a virtual cluster 220 in grid 110 in accordance with one embodiment of the present disclosure. At a high level, method 700 describes determining available space in virtual cluster 220, determining the optimum job 150 that is compatible with the space, and executing the determined job 150 in the available space. The following description will focus on the operation of cluster management module 130 in performing this method. But, as with the previous flowchart, system 100 contemplates using any appropriate combination and arrangement of logical elements implementing some or all of the described functionality.

Method 700 begins at step 705, where cluster management engine 130 sorts job queue 525. In the illustrated embodiment, cluster management engine 130 sorts the queue 525 based on the priority of jobs 150 stored in the queue 525. But it will be understood that cluster management engine 130 may sort queue 525 using any suitable characteristic such that the appropriate or optimal job 150 will be executed. Next, at step 710, cluster management engine 130 determines the Number of available nodes 115 in one of the virtual clusters 220. Of course, cluster management engine 130 may also determine the Number of available nodes 115 in grid 110 or in any one or more of virtual clusters 220. At step 715, cluster management engine 130 selects first job 150 from sorted job queue 525. Next, cluster management engine 130 dynamically determines the optimum shape (or other dimensions) of selected job 150 at 720. Once the optimum shape or dimension of selected job 150 is determined, then cluster management engine 130 determines if it can backfill job 150 in the appropriate virtual cluster 220 in steps 725 through 745.

At decisional step 725, cluster management engine 130 determines if there are enough nodes 115 available for the selected job 150. If there are enough available nodes 115, then at step 730 cluster management engine 130 dynamically allocates nodes 115 for the selected job 150 using any appropriate technique. For example, cluster management engine 130 may use the techniques describes in FIG. 6. Next, at step 735, cluster management engine 130 recalculates the Number of available nodes in virtual cluster 220. At step 740, cluster management engine 130 executes job 150 on allocated nodes 115. Once job 150 has been executed (or if there were not enough nodes 115 for selected job 150), then cluster management engine 130 selects the next job 150 in the sorted job queue 525 at step 745 and processing returns to step 720. It will be understood that while illustrated as a loop, cluster management engine 130 may initiate, execute, and terminate the techniques illustrated in method 700 at any appropriate time.

FIG. 13 is a flowchart illustrating an example method 800 for dynamically managing failure of a node 115 in grid 110 in accordance with one embodiment of the present disclosure. At a high level, method 800 describes determining that node 115 failed, automatically performing job recovery and management, and replacing the failed node 115 with a secondary node 115. The following description will focus on the operation of cluster management module 130 in performing this method. But, as with the previous flowcharts, system 100 contemplates using any appropriate combination and arrangement of logical elements implementing some or all of the described functionality.

Method 800 begins at step 805, where cluster management engine 130 determines that node 115 has failed. As described above, cluster management engine 130 may determine that node 115 has failed using any suitable technique. For example, cluster management engine 130 may pull nodes 115 (or agents 132) at various times and may determine that node 115 has failed based upon the lack of a response from node 115. In another example, agent 132 existing on node 115 may communicate a "heartbeat" and the lack of this "heartbeat" may indicate node 115 failure. Next, at step 810, cluster management engine 130 removes the failed node 115 from virtual cluster 220. In one embodiment, cluster management engine 130 may change the status of node 115 in virtual list 522 from "allocated" to "failed". Cluster management engine 130 then determines if a job 150 is associated with failed node 115 at decisional step 815. If there is no job 150 associated with node 115, then processing ends. As described above, before processing ends, cluster management engine 130 may communicate an error message to an administrator, automatically determine a replacement node 115, or any other suitable processing. If there is a job 150 associated with the failed node 115, then the cluster management engine 130 determines other nodes 115 associated with the job 150 at step 820. Next, at step 825, cluster management engine 130 kills job 150 on all appropriate nodes 115. For example, cluster management engine 130 may execute a kill job command or use any other appropriate technique to end job 150. Next, at step 830, cluster management engine 130 de-allocates nodes 115 using virtual list 522. For example, cluster management engine 130 may change the status of nodes 115 in virtual list 522 from "allocated" to "available". Once the job has been terminated and all appropriate nodes 115 de-allocated, then cluster management engine 130 attempts to re-execute the job 150 using available nodes 115 in steps 835 through 850.

At step 835, cluster management engine 130 retrieves policy 524 and parameters for the killed job 150 at step 835. Cluster management engine 130 then determines the optimum subset 230 of nodes 115 in virtual cluster 220, at step 840, based on the retrieved policy 524 and the job parameters. Once the subset 230 of nodes 115 has been determined, then cluster management engine 130 dynamically allocates the subset 230 of nodes 115 at step 845. For example, cluster management engine 130 may change the status of nodes 115 in virtual list 522 from "unallocated" to "allocated". It will be understood that this subset of nodes 115 may be different from the original subset of nodes that job 150 was executing on. For example, cluster management engine 130 may determine that a different subset of nodes is optimal because of the node failure that prompted this execution. In another example, cluster management engine 130 may have determined that a secondary node 115 was operable to replace the failed node 115 and the new subset 230 is substantially similar to the old job space 230. Once the allocated subset 230 has been determined and allocated, then cluster management engine 130 executes job 150 at step 850.

The preceding flowcharts and accompanying description illustrate exemplary methods 600, 700, and 800. In short, system 100 contemplates using any suitable technique for performing these and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-readable medium encoded with a logic for scheduling in a high-performance computer (HPC) system, the logic encoded in the computer-readable medium being executed to:

receive a call from a management engine operable to manage a cluster of nodes in the HPC system, the call specifying a request comprising a job for scheduling comprising one or more processes for execution at one or more nodes in the cluster, the call further specifying a number of nodes for executing the job;

determine whether the request is spatial, compact, or nonspatial and noncompact, the request being spatial if the job assumes spatial relationships between nodes executing the job, the request being compact if the job assumes proximity between nodes executing the job, the request being nonspatial and noncompact if the job assumes no spatial relationships or proximity between nodes executing the job;

if the request is spatial:

generate one or more spatial combinations of nodes in the cluster accommodating the number of nodes specified in the call and further accommodating the assumed spatial relationships between nodes executing the job; and select one of the spatial combinations that is schedulable according to a list of nodes in the cluster available for scheduling;

if the request is compact:

generate one or more compact combinations of nodes in the cluster accommodating the number of nodes specified in the call; and select one of the compact combinations that is schedulable according to the list of nodes in the cluster available for scheduling and that is more compact than other compact combinations that are schedulable according to the list of nodes in the cluster available for scheduling;

if the request is nonspatial and noncompact:

identify one or more nodes schedulable according to the list of nodes in the cluster available for scheduling; and generate a nonspatial and noncompact combination of nodes in the cluster accommodating the number of nodes specified in the call, the nonspatial and noncompact combination comprising one or more of the one or more identified nodes that are schedulable according to the list of nodes in the cluster available for scheduling; and communicate a return to the management engine identifying one or more nodes in the selected spatial, compact, or nonspatial and noncompact combination of nodes in the cluster for executing the job.

2. The logic of claim 1, wherein the call further specifies:

whether the request is spatial, compact, or nonspatial and noncompact;

if the request is spatial, a size of the job;

an aggressive flag indicating a degree of leeway for scheduling the job;

a size of the cluster in terms of a number of switches in the cluster;

a number of nodes coupled to each switch in the cluster;

a number of nodes available for scheduling: and the list of nodes in the cluster available for scheduling.

3. The logic of claim 1, wherein the return to the management engine further identifies a Message Passing Interface (MPI) rank of each node in the selected spatial, compact, or nonspatial and noncompact combination of nodes.

4. The logic of claim 1, operable, if the request is spatial and three dimensional, to rotate a mesh accommodating the number of nodes specified in the call and further accommodating the assumed spatial relationships between nodes executing processes in the job to one of six orientations to generate one of the spatial combinations.

5. The logic of claim 1, operable, if the request is spatial and two dimensional, to fold an unused dimension of the job to generate a mesh accommodating the number of nodes specified in the call from the management engine and rotate the mesh to one of six orientations to generate one of the spatial combinations.

6. The logic of claim 1, operable, if the request is spatial and one dimensional, to fold two unused dimensions of the job to generate a mesh accommodating the number of nodes specified in the call from the management engine and rotate the mesh to one of six orientations to generate one of the spatial combinations.

7. The logic of claim 1, operable to use a scan algorithm that searches for a start point for the job in the cluster of nodes to select one of the spatial combinations that is schedulable according to a list of nodes in the cluster available for scheduling.

8. The logic of claim 1, operable, to generate one or more compact combinations of nodes in the cluster accommodating the number of nodes specified in the call from the management engine, to:

generate a first compact combination of nodes in the cluster accommodating the number of nodes specified in the call from the management engine;

generate one or more second compact combinations of nodes in the cluster accommodating the number of nodes specified in the call from the management engine, each second compact combination being less compact than the first compact combination; and sort the first and second compact combinations according to compactness for selection of one of the first and second compact combinations.

9. The logic of claim 1, operable, to generate a nonspatial and noncompact combination of nodes in the cluster accommodating the number of nodes specified in the call from the management engine, to:

make a first loop through the cluster with respect to a first dimension of the cluster until a first node unavailable for scheduling according to the list of nodes in the cluster available for scheduling is reached;

make a second loop through the cluster with respect to a second dimension of the cluster until a second node unavailable for scheduling according to the list of nodes in the cluster available for scheduling is reached; and make a third loop through the cluster with respect to a third dimension of the cluster until a third node unavailable for scheduling according to the list of nodes in the cluster available for scheduling is reached.

10. The logic of claim 9, further operable to repeat the first loop, the second loop, and the third loop to cover all the nodes in the cluster.

11. The logic of claim 1, further operable to:

determine whether the cluster comprises enough nodes to accommodate the number of nodes for executing the one or more processes in the job specified in the call from the management engine; and if the cluster comprises less than enough nodes to accommodate the number of nodes for executing the one or more processes in the job specified in the call from the management engine, indicate to the management engine that the job is unschedulable.

12. The logic of claim 1, wherein the logic is stateless.

13. The logic of claim 1, wherein a node is a central processing unit (CPU) coupled to two switches.

14. The logic of claim 1, wherein the logic is a plug in of the management engine.

15. The logic of claim 1, wherein the cluster of nodes is a three dimensional torus.

16. The logic of claim 1, wherein processes of the job communicate with each other using Message Passing Interface (MPI) when executed.

17. The logic of claim 1:

wherein the call from the management engine further specifies an aggressive flag indicating a degree of leeway allotted for selecting a spatial combination, a compact combination, or a nonspatial and noncompact combination of nodes in the cluster for executing the one or more processes in the job;

the logic being operable to select a spatial combination, a compact combination, or a nonspatial and noncompact combination of nodes in the cluster for executing the one or more processes in the job according to the aggressive flag specified in the call from the management engine.

18. A method for scheduling in a high-performance computing (HPC) system, the method comprising:

receiving a call from a management engine operable to manage a cluster of nodes in the HPC system, the call specifying a request comprising a job for scheduling comprising one or more processes for execution at one or more nodes in the cluster, the call further specifying a number of nodes for executing the job;

determining whether the request is spatial, compact, or nonspatial and noncompact, the request being spatial if the job assumes spatial relationships between nodes executing the job, the request being compact if the job assumes proximity between nodes executing the job, the request being nonspatial and noncompact if the job assumes no spatial relationships or proximity between nodes executing the job;

if the request is spatial:

generating one or more spatial combinations of nodes in the cluster accommodating the number of nodes specified in the call and further accommodating the assumed spatial relationships between nodes executing the job; and selecting one of the spatial combinations that is schedulable according to a list of nodes in the cluster available for scheduling;

if the request is compact:

generating one or more compact combinations of nodes in the cluster accommodating the number of nodes specified in the call; and selecting one of the compact combinations that is schedulable according to the list of nodes in the cluster available for scheduling and that is more compact than other compact combinations that are schedulable according to the list of nodes in the cluster available for scheduling;

if the request is nonspatial and noncompact:
identifying one or more nodes schedulable according to the list of nodes in the cluster available for scheduling; and
generating a nonspatial and noncompact combination of nodes in the cluster accommodating the number of nodes specified in the call, the
nonspatial and noncompact combination comprising one or more of the one or more identified nodes that are schedulable according to the list of nodes in the cluster available for scheduling; and
communicating a return to the management engine identifying one or more nodes in the selected spatial, compact, or nonspatial and noncompact combination of nodes in the cluster for executing the job.

19. The method of claim 18, wherein the call further specifies:
whether the request is spatial, compact, or nonspatial and noncompact;
if the request is spatial, a size of the job;
an aggressive flag indicating a degree of leeway for scheduling the job;
a size of the cluster in terms of a number of switches in the cluster;
a number of nodes coupled to each switch in the cluster;
a number of nodes available for scheduling: and
the list of nodes in the cluster available for scheduling.

20. The method of claim 18, wherein the return to the management engine further identifies a Message Passing Interface (MPI) rank of each node in the selected spatial, compact, or nonspatial and noncompact combination of nodes.

21. The method of claim 18, wherein, if the request is spatial and three dimensional, generating one of the spatial combinations comprises rotating a mesh accommodating the number of nodes specified in the call and further accommodating the assumed spatial relationships between nodes executing processes in the job to one of six orientations.

22. The method of claim 18, wherein, if the request is spatial and two dimensional, generating one of the spatial combinations comprises folding an unused dimension of the job to generate a mesh accommodating the number of nodes specified in the call from the management engine and rotating the mesh to one of six orientations.

23. The method of claim 18, wherein, if the request is spatial and one dimensional, generating one of the spatial combinations comprises folding two unused dimensions of the job to generate a mesh accommodating the number of nodes specified in the call from the management engine and rotating the mesh to one of six orientations.

24. The method of claim 18, comprising using a scan algorithm that searches for a start point for the job in the cluster of nodes to select one of the spatial combinations that is schedulable according to a list of nodes in the cluster available for scheduling.

25. The method of claim 18, wherein generating one or more compact combinations of nodes in the cluster accommodating the number of nodes specified in the call from the management engine comprises:
generating a first compact combination of nodes in the cluster accommodating the number of nodes specified in the call from the management engine;
generating one or more second compact combinations of nodes in the cluster accommodating the number of nodes specified in the call from the management engine, each second compact combination being less compact than the first compact combination; and
sorting the first and second compact combinations according to compactness for selection of one of the first and second compact combinations.

26. The method of claim 18, wherein- generating a nonspatial and noncompact combination of nodes in the cluster accommodating the number of nodes specified in the call from the management engine comprises
making a first loop through the cluster with respect to a first dimension of the cluster until a first node unavailable for scheduling according to the list of nodes in the cluster available for scheduling is reached;
making a second loop through the cluster with respect to a second dimension of the cluster until a second node unavailable for scheduling according to the list of nodes in the cluster available for scheduling is reached; and
making a third loop through the cluster with respect to a third dimension of the cluster until a third node unavailable for scheduling according to the list of nodes in the cluster available for scheduling is reached.

27. The logic of cliam 9, further comprising repeating the first loop, the second loop, and the third loop to cover all the nodes in the cluster.

28. The method of claim 18, further comprising:
determining whether the cluster comprises enough nodes to accommodate the number of nodes for executing the one or more processes in the job specified in the call from the management engine; and
if the cluster comprises less than enough nodes to accommodate the number of nodes for executing the one or more processes in the job specified in the call from the management engine, indicating to the management engine that the job is unschedulable.

29. The method of claim 18, executed according to stateless logic.

30. The method of claim 18, wherein a node is a central processing unit (CPU) coupled to two switches.

31. The method of claim 18, executed at a plug in of the management engine.

32. The method of claim 18, wherein the cluster of nodes is a three dimensional torus.

33. The method of claim 18, wherein processes of the job communicate with each other using Message Passing Interface (MPI) when executed.

34. The method of claim 18:
wherein the call from the management engine further specifies an aggressive flag indicating a degree of leeway allotted for selecting a spatial combination, a compact combination, or a nonspatial and noncompact combination of nodes in the cluster for executing the one or more processes in the job;
the method comprising selecting a spatial combination, a compact combination, or a nonspatial and noncompact combination of nodes in the cluster for executing the one or more processes in the job according to the aggressive flag specified in the call from the management engine.

35. A system for scheduling in a high-performance computing (HPC) system, the system for scheduling in the HPC system comprising:
means for receiving a call from a management engine operable to manage a cluster of nodes in the HPC system, the call specifying a request comprising a job for scheduling, the job comprising one or more processes for execution at one or more nodes in the cluster, the call further specifying a number of nodes for executing the job;
means for determining whether the request is spatial, compact, or nonspatial and noncompact, the request being spatial if the job assumes spatial relationships between nodes executing the job, the request being compact if the job assumes proximity between nodes executing the job, the request being nonspatial and noncompact if the job assumes no spatial relationships or proximity between nodes executing the job;

means for, if the request is spatial:
- generating one or more spatial combinations of nodes in the cluster accommodating the number of nodes specified in the call and further accommodating the assumed spatial relationships between nodes executing processes in the job; and
- selecting one of the spatial combinations that is schedulable according to a list of nodes in the cluster available for scheduling;

means for, if the request is compact:
- generating one or more compact combinations of nodes in the cluster accommodating the number of nodes specified in the call; and
- selecting one of the compact combinations that is schedulable according to the list of nodes in the cluster available for scheduling and that is more compact than other compact combinations that are schedulable according to the list of nodes in the cluster available for scheduling;

means for, if the request is nonspatial and noncompact:
- identifying one or more nodes schedulable according to the list of nodes in the cluster available for scheduling; and
- generating a nonspatial and noncompact combination of nodes in the cluster accommodating the number of nodes specified in the call, the nonspatial and noncompact combination comprising one or more of the one or more identified nodes that are schedulable according to the list of nodes in the cluster available for scheduling; and means for communicating a return to the management engine identifying one or more nodes in the selected spatial, compact, or nonspatial and noncompact combination of nodes in the cluster for executing the job.

* * * * *

UNITED STATES PATENT AND TRADEMARK OFFICE
CERTIFICATE OF CORRECTION

PATENT NO. : 7,433,931 B2
APPLICATION NO. : 10/991598
DATED : October 7, 2008
INVENTOR(S) : Anthony N. Richoux It is certified that error appears in the above-identified patent and that said Letters Patent is hereby corrected as shown below:

Title Page, Page 2:
Line 43, after "Parallel and" delete "Distributerd" and insert -- Distributed --.

Column 2:
Line 67, delete "FIGURE" and insert -- Fig. 1 --.

Column 18:
Line 53, after "into" delete "they" and insert -- the y --.

Column 21:
Line 51, delete "y+Sy =1" and insert -- y+Sy -1 --.

Column 23:
Line 41, after "outer loop" delete "ay" and insert -- a y --.

Column 25:
Line 14, after "j=0 to" delete "NuniFreeNodes" and insert -- NumFreeNodes --.

Column 29:
Line 33, after "partition in" delete "they" and insert -- the y --.
Line 51, after "PartSize)" delete ".".
Line 54, after "pSizes[$i + j - 1$][3] = cnt2DTries(testPartSize, RequestedSize)" insert new line and insert -- If pSizes[$i + j - 1$][3] > max --.

Column 42:
Line 5, after "twoD" delete "[x]" and insert -- [×] --.

Column 52:
Line 39, after "jcNode" delete "Tyr" and insert -- Try --.

Column 53:
Line 1, after "embodiments" delete "ScheduleSpatial" and insert -- ScanSpatial --.
Line 2, after "example" insert -- logic --.
Line 21, after "Zplane[n]," delete "+ FreeY[l1,$m$l,$n$]" and insert -- + FreeY[$l$1,$m$1,$n$] --.

UNITED STATES PATENT AND TRADEMARK OFFICE
CERTIFICATE OF CORRECTION

PATENT NO. : 7,433,931 B2
APPLICATION NO. : 10/991598
DATED : October 7, 2008
INVENTOR(S) : Anthony N. Richoux It is certified that error appears in the above-identified patent and that said Letters Patent is hereby corrected as shown below:

Column 60:
Line 14, after "in" delete "ay" and insert -- a y --.
Line 20, after "≦i" delete "≦" and insert -- < --.

Signed and Sealed this

Thirtieth Day of June, 2009

JOHN DOLL
*Acting Director of the United States Patent and Trademark Office*